(12) United States Patent
Steiner et al.

(10) Patent No.: US 8,265,100 B2
(45) Date of Patent: Sep. 11, 2012

(54) SAFE START-UP OF A NETWORK

(76) Inventors: Wilfried Steiner, Vienna (AT); Harald Angelow, Vienna (AT); Guenther Bauer, Vienna (AT); Brendan Hall, Eden Prairie, MN (US)

( * ) Notice: Subject to any disclaimer, the term of this patent is extended or adjusted under 35 U.S.C. 154(b) by 694 days.

(21) Appl. No.: 11/993,995

(22) PCT Filed: Jun. 28, 2006

(86) PCT No.: PCT/AT2006/000268
§ 371 (c)(1),
(2), (4) Date: Nov. 10, 2008

(87) PCT Pub. No.: WO2007/000007
PCT Pub. Date: Jan. 4, 2007

(65) Prior Publication Data
US 2009/0122812 A1 May 14, 2009

(30) Foreign Application Priority Data
Jun. 28, 2005 (EP) .................................... 05450115

(51) Int. Cl.
*H04J 3/06* (2006.01)
(52) U.S. Cl. ...................................................... 370/503
(58) Field of Classification Search ................. 370/230, 370/235, 503, 338, 507, 324, 350; 709/222, 709/203, 219
See application file for complete search history.

(56) References Cited

U.S. PATENT DOCUMENTS 7,586,953 B2 * 9/2009 Forest et al. .................. 370/503
7,698,395 B2 * 4/2010 Hall et al. ..................... 709/222

OTHER PUBLICATIONS

Hoyme et al., "Safebus™", IEEE Aerospace and Electronic Systems Magazine, 8(3):34-39, 1993.
Bauer et al., "The Central Guardian Approach to Enforce Fault Isolation in the Time-Triggered Architecture", ISADS 2003, Pisa, Italy, pp. 37-44.

(Continued)

*Primary Examiner* — Chi Pham
*Assistant Examiner* — Alexander Boakye
(74) *Attorney, Agent, or Firm* — RatnerPrestia

(57) ABSTRACT

A method for start-up of a network, including a number of nodes, which are connected via channels. The nodes exchange information in the form of messages via the channels. The transition phase of a synchronizing node from its initial phase to a synchronized phase is separated in a first integration phase and a second subsequent cold-start phase. A synchronizing node in the integration phase listens to messages being sent from nodes in the synchronized phase and only reacts to an integration message (i-frame) if the integration message is a valid message. Furthermore, a synchronizing node, wherein integration of the synchronizing node to a set of already synchronized nodes was not successful after a specifiable period, changes into the cold-start phase, in which a cold-start procedure of the node is extracted, wherein in the cold-start phase the node does not react to integration messages of a node in the synchronized phase.

12 Claims, 24 Drawing Sheets

OTHER PUBLICATIONS

Bauer et al., "Byzantine Fault Containment in TTP/C", Proceedings of 2002 Intl. Workshop on Real-Time LANS in the Internet Age, Jun. 2002, pp. 13-16.
Dutertre et al., "Modeling and Verification of a Fault-Tolerant Real-Time Startup Protocol Using Calendar Automata", 2004.
Dijkstra, "Self-stabilizing Systems in Spite of Distributed Control", Communications of the ACM, Nov. 1974, vol. 17, No. 11, pp. 643-644.
Driscoll et al., "Byzantine Fault Tolerance, from Theory to Reality", SAFECOMP 2003, LNCS 2788, pp. 235-248, 2003.
Broy, "Interactive and Reactive Systems: States, Observations, Experiments, Input, Output, Nondeterminism, Compositionality and all that", Foundation of Computer Science: Potential-Theory-Cognition, May 30, 1997, pp. 279-286.
Bernardeschi et al., "Model checking fault tolerant systems", Software Testing, Verification and Reliability, 2002: 12:251-275.
Bozga et al., "Kronos: A Model-Checking Tool for Real-Time Systems", Proceedings $10^{th}$ Intl. Conference on Computer Aided Verification, Vancouver, vol. 1427, 1998, pp. 546-550.
Arora et al., "Detectors and Correctors: A Theory of Fault-Tolerance Components", Intl. Conference on Distributed Computing Systems, May 1998, pp. 436-443.
Ademaj et al., "Evaluation of Fault Handling of the Time-Triggered Architecture with Bus and Star Topology", 2003 Intl. Conference on Dependable Systems and Networks, p. 123.
Kopetz, "The Time-Triggered Model of Computation", Proceedings of $19^{th}$ IEEE Real-Time System Symposium, 1998, pp. 168-177.
Kopetz, "Real-Time Systems Design Principles for Distributed Embedded Applications", Kluwer Academic Publishers 1997.
Kopetz, "On the Fault Hypothesis for a Safety-Critical Real-Time System", Research Report Mar. 2006.
Heiner et al., "Time-Triggered Architecture for Safety-Related Distributed Real-Time Systems in Transportation Systems", Proc. $28^{th}$ Annual International Symposium on Fault-Tolerant Computing, FTCS-28, IEEE Computer Society Press, pp. 402-407, Jun. 1998.
Holzmann, "The Model Checker Spin", IEEE Transactions on Software Engineering, vol. 23, No. 5, May 1997, pp. 279-295.
"Formal Methods Roadmap: PVS, ICS, and SAL" SRI International Technical Report SRI-CSL-03-05, Nov. 2003, Updated Jan. and Oct. 2004.
Kopetz et al., "Specification of the TTP/A-Protocol V2.00", Smart Transducers Adopted Specification, Sep. 2002.
Jones et al., "Revised Version of DSoS Conceptual Model-Supplementary Annexes", Report Preparation Date: Oct. 2001, pp. i-35.
Miner et al., "A Unified Fault-Tolerance Protocol", FORMATS/FTRTFT 2004, LNCS 3253, pp. 167-182, Springer-Verlag, 2004.
Lonn, "Initial Synchronization of TDMA Communication in Distributed Real-Time Systems", Intl. Conference on Distributed Computing Systems, 1999, pp. 370-379.
Lonn et al., "Formal Verification of a TDMA Protocol Start-Up Mechanism", 1997 Pacific Rim Intl. Symposium on Fault-Tolerant Systems, p. 235.
Kopetz et al., "Compositional Design of RT Systems: A Conceptual Basis for Specification of Linking Interfaces", Proceedings of the Sixth IEEE Symposium on Object-Oriented Real-Time Distributed Computing (ISORC '03).
Pfeifer, "Formal Verification of the TTP Group Membership Algorithm", Proc. of FORTE XIII/PSTV XX, pp. 3-18, Pisa, Italy, Oct. 2000.
Morris et al., "Fault Tolerance Tradeoffs in Moving from Decentralized to Centralized Embedded Systems", Preprint: *Fault Tolerance Tradeoffs in Moving from Decentralized to Centralized Embedded Systems*, DSN 2004.
Berwanger et al., "FlexRay—The Communication System for Advanced Automotive Control Systems", Copyright © 2000 Society of Automotive Engineers, Inc.
Pfeifer et al., "Formal Verification for Time-Triggered Clock Synchronization", Proceedings of $7^{th}$ IFIP Intl. Working Conference on Dependable Computing for Critical Applications, 1999, pp. 207-226.
Rushby, "Formal Verification of Transmission Window Timing for the Time-Triggered Architecture", SRI International, Mar. 2001.
Pfeifer et al., "Modular Formal Analysis of the Central Guardian in the Time-Triggered Architecture", Proc of the $23^{rd}$ Intl. Conf. on Computer Safety, Reliability and Security, SAFECOMP 2004. Springer LNCS, vol. 3219, pp. 240-253, Sep. 2004.
Rushby, "An Overview of Formal Verification for the Time-Triggered Architecture", presented at FTRTFT '02, Oldenburg, Germany, Sep. 2002. Springer-Verlag LNCS vol. 2469, pp. 83-105.
Rushby, "Systematic Formal Verification for Fault-Tolerant Time-Triggered Algorithms", IEEE Transactions on Software Engineering, vol. 25, No. 5, Sep./Oct. 1999, pp. 651-660.
Steiner et al., "The Transition from Asynchronous to Synchronous System Operation: An Approach for Distributed Fault-Tolerant Systems", Research Report 26/2001.
Sivencrona et al., "A Membership Agreement Algorithm Detecting and Tolerating Asymmetric Timing Faults", DBLP Conference 2004, pp. 63-72.
Temple, "Avoiding the Babbling-Idiot Failure in a Time-Triggered Communication System", Symposium on Fault-Tolerant Computing, 1998, pp. 218-227.
Wellheuser, "Metastability Performance of Clocked FIFOS", Copyright © 1996, Texas Instruments, Inc.
Bauer et al., "An Investigation of Membership and Clique Avoidance in TTP/C", Proceedings $19^{th}$ IEEE Symposium on Reliable Distributed Systems, 2000, pp. 118-124.
Chandra et al., "The Weakest Failure Detector for Solving Consensus", Journal of the ACM, vol. 43, No. 4, Jul. 1996, pp. 685-722.
Larsen et al., "UPPAAL in a nutshell", Int. J STTT (1997) 1: 134-152.
Powell, "Failure Mode Assumptions and Assumption Coverage", 0731-3071/92 IEEE 1992, pp. 386-395.
Yokogawa et al., "Automatic Verification of Fault Tolerance Using Model Checking", 0-7695-1414-6/01, 2001, IEEE, pp. 95-102.
Arora et al., "Distributed Reset", IEEE Transactions on Computers, vol. 43, No. 9, Sep. 1994, pp. 1026-1038.
Jensen, "A Neglected/Ignored Research Topic in Real-Time Systems: Timeliness in Mesosynchronous Real-Time Distributed Systems", Proceedings of the $7^{th}$ IEEE Intl. Symposium on Object-Oriented Real-Time Distributed Computing (ISORC '04).
Lamport et al., "The Byzantine Generals Problem", ACM Transactions on Programming Languages and Systems, vol. 4, No. 3, Jul. 1982, pp. 382-401.
Minzer, "Broadband ISDN and Asynchronous Transfer Mode (ATM)", IEEE Communications Magazine, Sep. 1989, pp. 17-24, cont'd. p. 57.
Normand, "Single Event Upset at Ground Level", IEEE Transactions on Nuclear Science, vol. 43, No. 6, Dec. 1996, pp. 2742-2750.
Alur et al., "A Theory of Timed Automata", Preliminary versions of this paper appear in the Proceedings of the $17^{th}$ Intl. Colloquium on Automata, Languages, and Programming (1990), and in the Proceedings of the REX workshop "Real-time: theory in practice" (1991).
Bauer, "A Centralized Approach for Avoiding the Babbling-Idiot Failure in the Time-Triggered Architecture", ICDSN Jun. 2000.
Cristian et al., "The Timed Asynchronous Distributed System Model", IEEE Transactions on Parallel and Distributed Systems, 1999, p. 642.
Ekwall et al., "Token-based Atomic Broadcast using Unreliable Failure Detectors", Proceedings of the $23^{rd}$ IEEE Intl. Symposium on Reliable Distributed Systems (SRDS '04).
Hoare, "An Axiomatic Basis for Computer Programming", Communications of the ACM, vol. 12, No. 10, Oct. 1969, pp. 576-583.
Hadzilacos et al., "A Modular Approach to Fault-Tolerant Broadcasts and Related Problems", published Cornell University, May 1994.
Kopetz et al., "Integration of Internal and External Clock Synchronization by the Combination of Clock-State and Clock-Rate Correction in Fault-Tolerant Distributed Systems", Proceedings of the $25^{th}$ IEEE Intl. Real-Time Systems Symposium (RTSS 2004).
Kopetz, "The Time-Triggered Architecture", Proceedings of the IEEE Special Issue on Modeling and Design of Embedded Software, Oct. 2002.
Kopetz et al., "Temporal composability", Computing & Control Engineering Journal, Aug. 2002, pp. 156-162.
Liang et al., "A Modified Leaky Bucket Policing Mechanism", 0-7803-4314-X/98, IEEE 1998, pp. 345-348.

Latronico et al., "Quantifying the Reliability of Proven SPIDER Group Membership Service Guarantees", Proceedings of 2004 Intl. Conference on Dependable Systems and Networks (DSN '04).

O'Gorman, "The Effect of Cosmic Rays on the Soft Error Rate of a DRAM at Ground Level", IEEE Transactions on Electron Devices, vol. 41, No. 4, Apr. 1994, pp. 553-557.

Pease et al., "Reaching Agreement in the Presence of Faults", Journal of the Association for Computing Machinery, vol. 27, No. 2, Apr. 1980, pp. 228-234.

Rodriguez et al., "Wrapping Real-time Systems from Temporal Logic Specifications", EDCC 2002, LNCS 2485, pp. 253-270.

Steiner et al., "Multiple Failure Correction in the Time-Triggered Architecture", Proceedings of the 9$^{th}$ IEEE Intl. Workshop on Object-Oriented Real-Time Dependable Systems (WORDS '03).

Verissimo et al., "The Timely Computing Base Model and Architecture", IEEE Transactions on Computers, vol. 51, No. 8, Aug. 2002, pp. 916-930.

Courtney, "Draft Circulation-Draft 1 of Project Paper 664: Aircraft Data Networks, Part 7—Deterministic Networks", Aeronautical Radio, Inc., Airlines Electronic Engineering Committee May 23, 2003.

Avizienis et al., "Basic Concepts and Taxonomy of Dependable and Secure Computing", IEEE Transactions on Dependable and Secure Computing, vol. 1, No. 1, Jan.-Mar. 2004, pp. 11-33.

Chandra, "Unreliable Failure Detectors for Reliable Distributed Systems", Journal of the ACM, vol. 43, No. 2, Mar. 1996, pp. 225-267.

Claesson et al., "An Efficient TDMA Start-Up and Restart Synchronization Approach for Distributed Embedded Systems", IEEE Transactions on Parallel and Distributed Systems, vol. 15, No. 8, Aug. 2004, pp. 725-739.

"Alternative Use of BNC Connectors and Manchester-Encoded Signaling Methods for Single-Channel Bus Physical Layer Entities", Supplement to Token-Passing Bus Access Method and Physical Layer Specifications, IEEE Std. 802.4h-1997.

Lamport et al., "Synchronizing Clocks in the Presence of Faults", Journal of the Association for Computing Machinery, vol. 32, No. 1, Jan. 1985, pp. 52-78.

Schneider, "Self-Stablization", ACM Computing Surveys, vol. 25, No. 1, Mar. 1993.

Barborak et al., "The Consensus Problem in Fault-Tolerant Computing", ACM Computing Surveys, vol. 25, No. 2, Jun. 1993, pp. 171-220.

Kleeman et al., "Metastable Behavior in Digital Systems", IEEE Design & Test of Computers, Dec. 1987, pp. 4-19.

"Carrier Sense Multiple Access with Collision Detection (CSMA/CD) Access Method and Physical Layer Specifications", IEEE Standards 802.3-1985.

Steiner et al., "Model Checking a Fault-Tolerant Startup Algorithm: From Design Exploration to Exhaustive Fault Simulation," 2004 International Conference on Dependable Systems and Networks, Florence, Italy Jun. 28-Jul. 1 2004, Piscataway, NJ USA, IEEE Jun. 28, 2004, pp. 171-180.

* cited by examiner

| Transition | Trigger | Local State | | Send | |
|---|---|---|---|---|---|
| | | $t$ | $IFC.[A,B]$ | Hub | TTP |
| (1)→(2) | init complete | $2*\tau^{round}$ | [0,0] | - | - |
| (2)→(2) | cs received | $\tau^{round}$ | [0,0] | - | - |
| (2)→(3) | i received [a,b] | $\tau^{round}-1$ | [a,b] | - | - |
| (2)→(5) | $t==0$ | $\tau^{long-startup}$ | [0,0] | - | - |
| (3)→(4) | $t==0, IFC < min$ | $\tau^{slot}$ | [0,0] | - | - |
| (3)→(9) | $t==0, IFC \geq min$ | 0 | [min, min] | - | - |
| (4)→(2) | $t==0$ | $\tau^{round}$ | [0,0] | - | - |
| (5)→(2) | i received | $\tau^{round}$ | [0,0] | - | - |
| (5)→(6) | cs received [a,b] | $\tau^{round}$ | [a,b] | - | - |
| (5)→(7) | $t==0$ | $\tau^{round}$ | [1,1] | - | cs |
| (6)→(2) | $t==0, IFC < min$ | $\tau^{round}$ | [0,0] | - | - |
| (6)→(6) | next slot | - | $[A+a, B+b]$ | sync | - |
| (6)→(6) | send slot | - | $[A+a, B+b]$ | sync | ack |
| (6)→(8) | $t==0, IFC \geq min$ | 0 | [min, min] | - | - |
| (7)→(2) | $t==0, IFC < min$ | $\tau^{round}$ | [0,0] | - | - |
| (7)→(7) | next slot | - | $[A+a, B+b]$ | sync | - |
| (7)→(8) | $t==0, IFC \geq min$ | 0 | [min, min] | - | - |
| (8)→(2) | $t==0, IFC < min-1$ | $\tau^{round}$ | [0,0] | - | - |
| (8)→(8) | next slot | - | $[A+a, B+b]$ | sync | - |
| (8)→(8) | send slot | - | $[A+a, B+b]$ | sync | i |
| (8)→(9) | $t==0, IFC \geq min-1$ | $\kappa^{unstable}$ | [min, min] | - | - |
| (9)→(2) | $t==0$ | $\tau^{round}$ | [0,0] | - | - |
| (9)→(9) | next slot | - | $[A+a, B+b]$ | sync | - |
| (9)→(9) | send slot, $IFC \geq min$ | - | [0,0] | sync | i |

Fig. 16

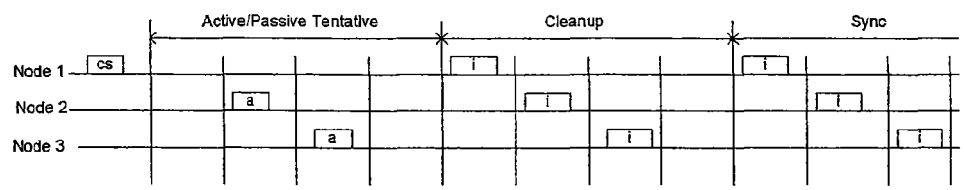

Fig. 17

| | |
|---|---|
| 1 | INITIALIZATION: |
| 2 | $\forall i : enable_i^{in} = TRUE$ |
| 3 | $\forall i : timer_i^{blocked} = 0$ |
| 4 | $timer^{activity} = 0, timer^{silence} = 0$ |
| 5 | $idle = TRUE$ |
| 6 | BEGIN Activity Detected |
| 7 | if $active_i$ and $(timer_i^{blocked} == 0)$ then { |
| 8 | $\forall j, j \neq i : enable_j^{in} = FALSE$ |
| 9 | $idle = FALSE$ |
| 10 | $timer^{activity} = \tau_i^{TP}$ |
| 11 | $timer_i^{blocked} = \tau^{round}$ |
| 12 | } |
| 13 | END |
| 14 | BEGIN $timer^{activity}$ elapsed |
| 15 | $\forall i : enable_i^{in} = FALSE$ |
| 16 | $timer^{silence} = \tau^{silence}$ |
| 17 | END |
| 18 | BEGIN $timer^{silence}$ elapsed |
| 19 | $idle = TRUE$ |
| 20 | $\forall j, timer_j^{blocked} == 0 : enable_j^{in} = TRUE$ |
| 21 | END |
| 22 | BEGIN $timer_i^{blocked}$ elapsed |
| 23 | if $idle$ then $enable_i^{in} = TRUE$ |
| 24 | END |

Fig. 23

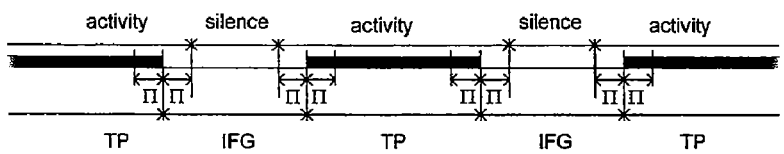

Fig. 24

| 1 | INITIALIZATION: |
|---|---|
| 2 | Execute Startup Algorithm |
| 3 | BEGIN $timer^{activity}$ elapsed |
| 4 | $\forall i : enable_i^{in} = FALSE$ |
| 5 | $timer^{silence} = \tau^{silence}$ |
| 6 | $sender = next(*sender\_list)$ |
| 7 | END |
| 8 | BEGIN $timer^{silence}$ elapsed |
| 9 | $enable_{sender}^{in} = TRUE$ |
| 10 | $timer^{activity} = \tau_{sender}^{TP} + 2 * \Pi$ |
| 11 | END |

Fig. 25

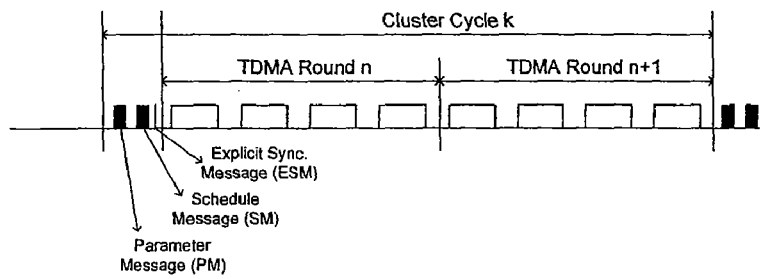
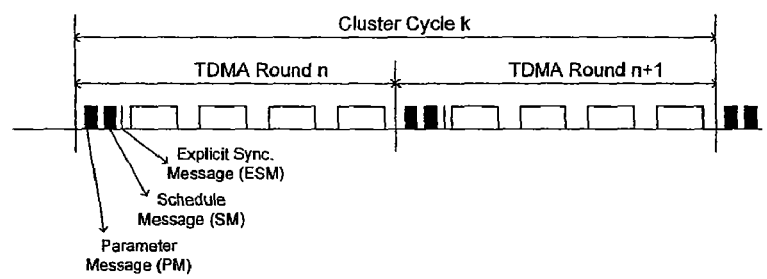
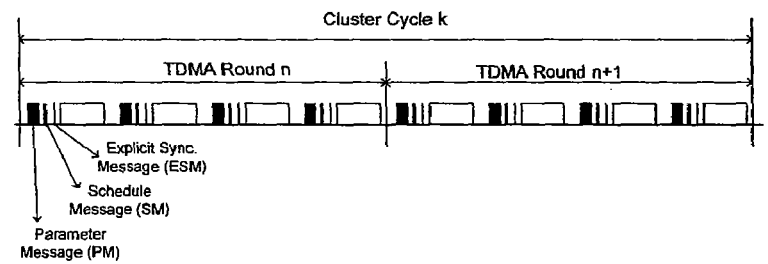
Fig. 26
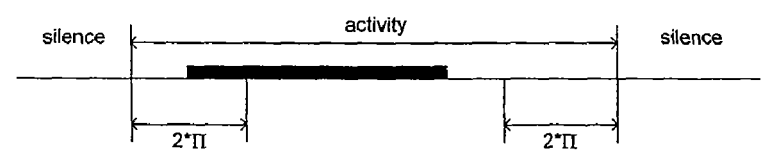
Fig. 27

| 1 | INITIALIZATION: |
|---|---|
| 2 | Execute Startup Algorithm |
| 3 | BEGIN $timer^{activity}$ elapsed |
| 4 | $\forall i : switch_i^{in} = FALSE$ |
| 5 | $timer^{silence} = 2 * \Pi$ |
| 6 | $sender = next(*sender\_list)$ |
| 7 | END |
| 8 | BEGIN $timer^{silence}$ elapsed |
| 9 | $enable_{sender}^{in} = TRUE$ |
| 10 | $timer^{activity} = \tau_{sender}^{TP} + 2 * \Pi$ |
| 11 | $timer^{startwindow} = 2 * \Pi$ |
| 12 | END |
| 13 | BEGIN $timer^{startwindow}$ elapsed |
| 14 | if $\neg active_{sender}$ then $\forall i : enable_i^{in} = FALSE$ |
| 15 | END |

Fig. 28

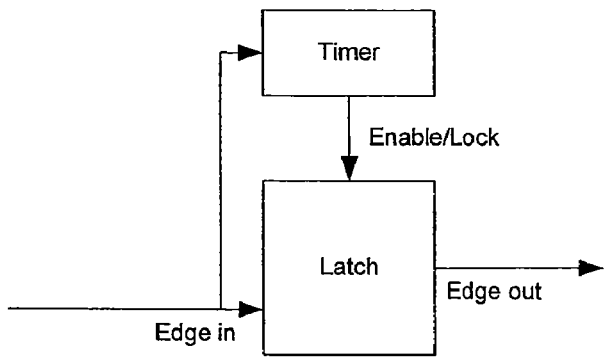

Fig. 29

```
1   INITIALIZATION:
2       ∀i : enable_i^{out} = FALSE
3       ∀i : enable_i^{in} = TRUE
4       values = 0
5
6   BEGIN active_j == TRUE
7       enable_j^{in} = FALSE  /* Phase 1 */
8       values = values + 1
9       if values == κ^{clock-sync} then {  /* Phase 2 */
10          timer^{silence} = offset^{activity}  /* Phase 3 */
11          ∀i : enable_i^{in} = FALSE  /* Stop */
12          ∀i : enable_i^{out} = TRUE
13      }
14  END
```

Fig. 32

```
1   INITIALIZATION:
2       ∀i : enable_i^{out} = FALSE
3       ∀i : enable_i^{in} = TRUE
4       values = 0
5       timer^{clock-sync} = 0
6       pool = empty
7
8   BEGIN active_j == TRUE
9       if values == 0 then {
10          timer^{clock-sync} = offset^{activity} }
11      enable_j^{in} = FALSE  /* Phase 1 */
12      values = values + 1
13      pool = add_pool(timer^{clock-sync})
14      if values == κ^{clock-sync} then {  /* Phase 2 */
15          d^{corr.} = mFTA(pool)
16          timer^{silence} = d^{corr.}  /* Phase 3 */
17          ∀i : enable_i^{in} = FALSE  /* Stop */
18          ∀i : enable_i^{out} = TRUE
19      }
20  END
```

Fig. 33

```
1   INITIALIZATION:
2     ∀i : enable_i^{out} = FALSE
3     ∀i : enable_i^{in} = TRUE
4     values = 0
5     pool = empty
6   BEGIN active_j == TRUE
7     enable_j^{in} = FALSE
8     values = values + 1
9     pool = add_pool(message.sender_list)
10    if values == κ^{integration} then {
11       *sender_list = majority_vote(pool)
12       sender = first(*sender_list)
13       ∀i : enable_i^{in} = FALSE
14       ∀i : enable_i^{out} = TRUE
15    }
16  END
```

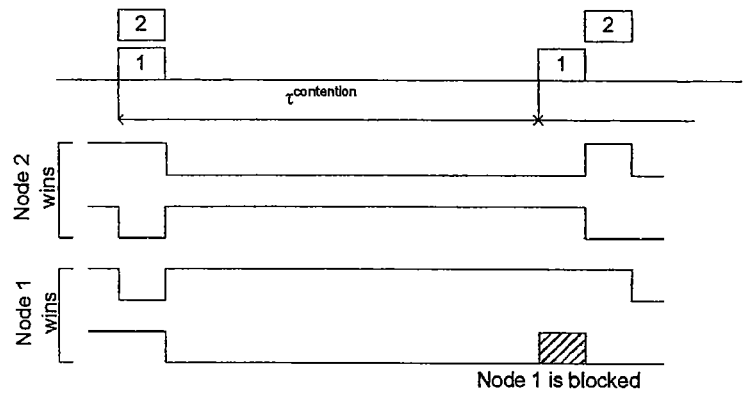
Fig. 37
| Classes | Algorithms |
|---|---|
| Access Control | Slot Control |
| Message Analysis | Regular Protocol Messages |
| Filtering | Semantic, Byzantine |
| Clock Synchronization | Implicit Semantic-Full Synchronization |
| Integration | Interlink Integration |
| Coldstart | Precise Protection |
| Configuration Download | Direct Off-Line |
Fig. 38
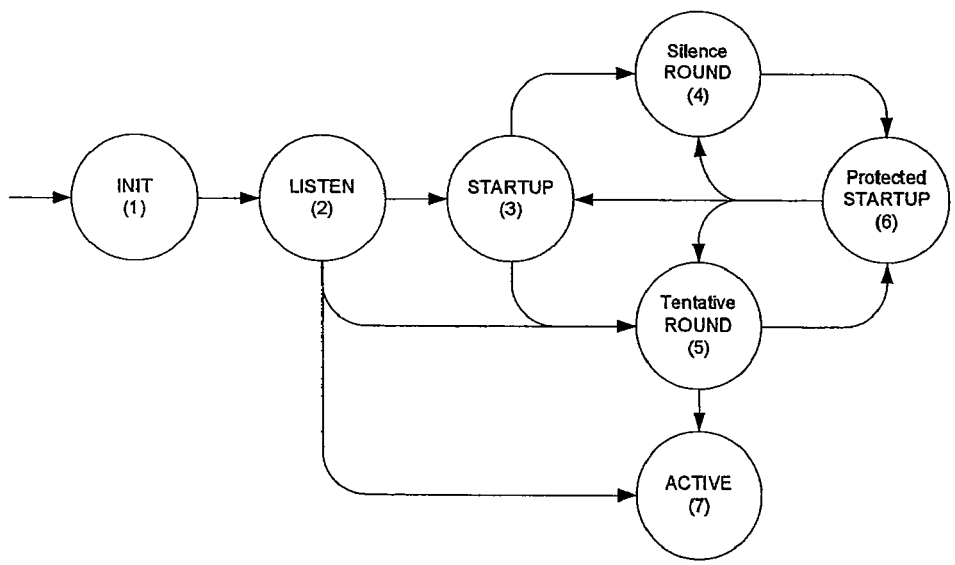
Fig. 39

| Classes | Algorithms |
|---|---|
| Access Control | Slot Control |
| Message Analysis | Sync Messages |
| Filtering | Temporal, Byzantine |
| Clock Synchronization | Explicit Semantic-Full Parallel Synchronization |
| Integration | Explicit Semantic-Full Parallel Integration |
| Coldstart | Approximate Protection |
| Configuration Download | On-Line, Core System |

Fig. 40

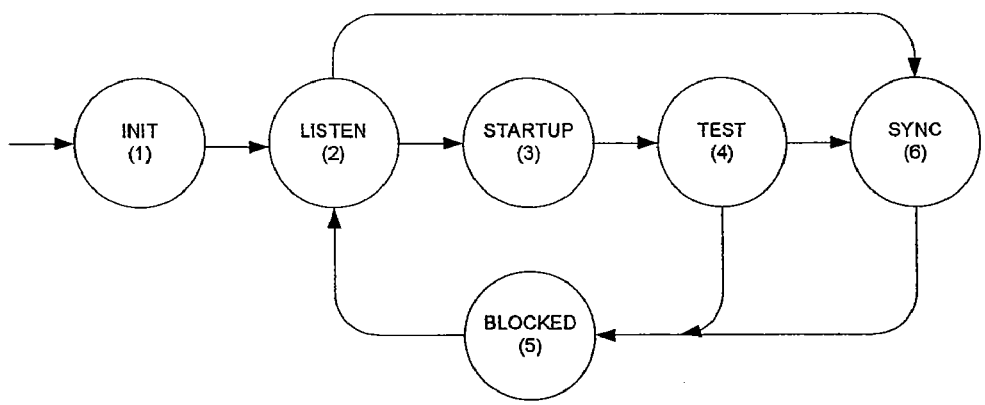

Fig. 41

| chA \ chB | quiet | cs_frame (good) | i_frame (good) | noise | cs_frame (bad) | i_frame (bad) |
|---|---|---|---|---|---|---|
| quiet | 1 | 2 | 3 | 4 | 5 | 6 |
| cs_frame (good) | 2 | 2 | 3 | 4 | 5 | 6 |
| i_frame (good) | 3 | 3 | 3 | 4 | 5 | 6 |
| noise | 4 | 4 | 4 | 4 | 5 | 6 |
| cs_frame (bad) | 5 | 5 | 5 | 5 | 5 | 6 |
| i_frame (bad) | 6 | 6 | 6 | 6 | 6 | 6 |

Fig. 42

| $\delta_{fault}$ | safety | liveness | timeliness |
|---|---|---|---|
| 1 | 44.11 | 196.05 | 77.14 |
| 3 | 166.34 | 892.15 | 615.03 |
| 5 | 251.12 | 1324.54 | 921.92 |

Fig. 43

| nodes | $\delta_{init}$ | $|\mathcal{S}_{sup}|$ | $\delta_{fault}$ | $\tau^{wcsup}$ | $|\mathcal{S}_{f.n.}|$ |
|---|---|---|---|---|---|
| 3 | 24 | $3.3 * 10^5$ | 6 | 16 | $8 * 10^{24}$ |
| 4 | 32 | $3.3 * 10^7$ | 6 | 23 | $6 * 10^{35}$ |
| 5 | 40 | $4.1 * 10^9$ | 6 | 30 | $4.9 * 10^{46}$ |

Fig. 44

| nodes # | feedback | eval. | cpu time (sec) | BDD # |
|---|---|---|---|---|
| 3 | on | true | 62.45 | 248 |
| 4 | on | true | 259.53 | 316 |
| 5 | on | true | 920.74 | 422 |

(a)

| nodes # | feedback | eval. | cpu time (sec) | BDD # |
|---|---|---|---|---|
| 3 | on | true | 228.03 | 250 |
| 4 | on | true | 1242.73 | 318 |
| 5 | on | true | 41264.08 | 424 |

(b)

| nodes # | feedback | wcsup (slots) | eval. | cpu time (sec) | BDD # |
|---|---|---|---|---|---|
| 3 | on | 16 | true | 47.81 | 268 |
| 4 | on | 23 | true | 907.61 | 336 |
| 5 | on | 30 | true | 4480.90 | 442 |

(c)

| nodes # | eval. | cpu time (sec) | BDD # |
|---|---|---|---|
| 3 | true | 56.65 | 272 |
| 4 | true | 82.95 | 348 |
| 5 | true | 4289.77 | 462 |

| S.2 state names | SAL state names |
|---|---|
| Init(1) | `init` |
| I-frame Detection(2) | `virgin` |
| Confirmation(3) | `passive` |
| Relax(4) | `relax` |
| Collision Resolving(5) | `cs_coll` |
| Active Tentative(6) | `cs_ack, cs_ack_send` |
| Passive Tentative(7) | `cs_integrate` |
| Cleanup(8), Sync(9) | `sync, sync_send` |

Fig. 46

| coldstarters ID | faulty ID | *Safety* eval. | cpu time (sec) | BDD # | *Majority* eval. | cpu time (sec) | BDD # |
|---|---|---|---|---|---|---|---|
| 1,4 | 1 | true | 563.74 | 460 | true | 1626.14 | 668 |
| 1,4 | 2 | true | 228.66 | 460 | true | 292.89 | 668 |
| 1,4 | 3 | true | 204.94 | 460 | true | 285.38 | 668 |
| 1,4 | 4 | true | 589.38 | 460 | true | 2179.93 | 668 |
| 1,3,4 | 1 | true | 1124.58 | 488 | true | 2033.63 | 668 |
| 1,3,4 | 2 | true | 266.1 | 488 | true | 92.65 | 668 |
| 1,3,4 | 3 | true | 801.63 | 488 | true | 2813.5 | 668 |
| 1,3,4 | 4 | true | 1124.58 | 488 | true | 4597.34 | 668 |
| 1,2,3,4 | 1 | true | 2742.71 | 516 | true | 4269.69 | 668 |
| 1,2,3,4 | 2 | true | 2544.68 | 516 | true | 9701.46 | 668 |
| 1,2,3,4 | 3 | true | 2619.06 | 516 | true | 10781.99 | 668 |
| 1,2,3,4 | 4 | true | 6099.04 | 516 | - | TO | 668 |

(a)

| coldstarters ID | faulty ID | wcsup (slots) | eval. | cpu time (sec) | BDD # |
|---|---|---|---|---|---|
| 1,4 | 1 | 93 | true | 1617.86 | 668 |
| 1,4 | 4 | 80 | true | 1314.61 | 470 |
| 1,3,4 | 1 | 155 | true | 1565.13 | 498 |
| 1,3,4 | 3 | 111 | true | 2172.89 | 498 |
| 1,3,4 | 4 | 118 | true | 7638.99 | 498 |
| 1,2,3,4 | 1 | $\leq 140$ | true | 3584.98 | 526 |
| 1,2,3,4 | 2 | $\leq 135$ | true | 3989.78 | 526 |
| 1,2,3,4 | 3 | $\leq 145$ | true | 4249.32 | 526 |
| 1,2,3,4 | 4 | $\leq 132$ | true | 14061.24 | 526 |

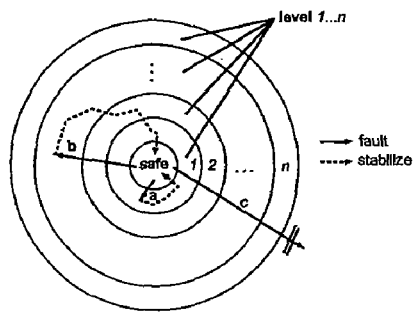
Fig. 48
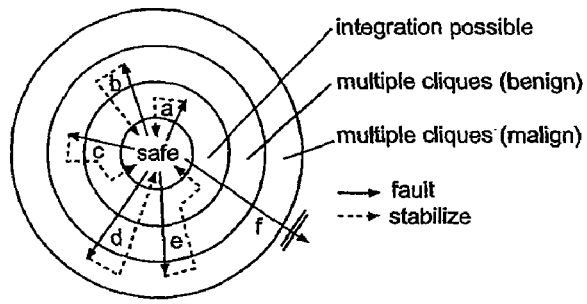
Fig. 49
| 1 | BEGIN $t_{start}^{slot}$ |
|---|---|
| 2 | if $timer \geq \tau^{restart}$ then { |
| 3 | faulty system state detected } |
| 4 | else { |
| 5 | calculate cross sum over membership vector |
| 6 | if $sum \geq \phi$ then { |
| 7 | $timer = 0$ } |
| 8 | } |
| 9 | END |
Fig. 50

| | |
|---|---|
| 1 | BEGIN $t_{start}^{slot}$ |
| 2 | if $timer \geq \tau^{restart}$ then { |
| 3 | faulty system state detected } |
| 4 | else { |
| 5 | calculate cross sum over membership vector |
| 6 | if $sum \geq \phi$ and |
| 7 | *(specific nodes set in membership vector)* then { |
| 8 | $timer = 0$ } |
| 9 | } |
| 10 | END |

SAFE START-UP OF A NETWORK

FIELD OF THE INVENTION

This application is a U.S. National Phase application of PCT International Application No. PCT/AT2006/000268, filed Jun. 28, 2006.

The invention relates to a Method for start-up of a network, the network consisting of a number of nodes, which are connected via channels, and wherein the nodes are able to exchange information in the form of messages via said channels, characterized in that the transition phase of a synchronizing node from its initial phase to a synchronized phase is separated in a first so-called integration phase and a second subsequent so-called cold-start phase, and wherein a) the synchronizing node in the integration phase is listening to messages being sent from nodes in the synchronized phase and wherein the synchronizing node only reacts to an integration message (i-frame), which is instructing a node to change into the synchronized phase, if said integration message is a valid message, and wherein b) a synchronizing node, in the case that integration of said synchronizing node to a set of already synchronized nodes was not successful after a specifiable period, changes into the cold-start phase, in which a cold-start procedure of the node is executed, and wherein in the cold-start phase said node does not react to integration messages (i-frames) of a node in the synchronized phase.

The classification whether a message is valid or invalid can be done at the node, at a guardian, or in combination of both. A valid message may be sent by a correct node, but it is also possible that a valid message is sent by a faulty node. A synchronizing node will react to such valid messages by changing from one phase to another or re-entering the current phase. Such a change between phases requires one or more valid messages. In the case that the synchronizing node receives an invalid message, which is being sent by a faulty node, the synchronizing node will not change its phase due to this invalid message.

Furthermore, it is of advantage when the synchronizing node in the integration phase is further listening to messages being sent from nodes that are about to terminate the cold-start phase in a cleanup state, wherein such a so-called clean-up message (cu-frame) instructs a node to restart its integration phase, and wherein the synchronizing node only reacts to a clean-up message if said clean-up message is a valid message.

The communication in the network may be based on TDMA rounds.

In an advantageous solution it is provided that a node in the integration phase itself verifies if a integration message and/or a clean-up message is valid.

It is also possible that at least one guardian is provided in the network, which guardian blocks the propagation of invalid integration and/or clean-up messages.

A guardian may be provided, which guarantees that only a specifiable number of integration and/or clean-up messages of a node may be propagated in a specifiable period of time.

The specifiable period of time may be equal to one TDMA round.

The specifiable number of invalid integration and/or clean-up messages may be equal to one.

It may be of advantage when a dedicated TDMA round layout consisting only of a limited number of slots and/or different slot lengths during the cold-start phase is used.

The integration phase and the cold-start phase are executed in parallel they are executed sequentially.

Furthermore, the invention relates to a node for a network, wherein the network consists of a number of such nodes, which nodes are connected via channels, and wherein the nodes are able to exchange information in the form of messages via said channels, characterized in that the node comprises means for carrying out the steps of the above mentioned method.

The invention also relates to a network consisting of a number of such nodes, wherein the nodes are connected via channels, and wherein the nodes are able to exchange information in the form of messages via said channels.

Additionally the invention relates to a method for controlling start-up of a network, the method comprising receiving a message from one node of a plurality of nodes at a guardian while the network is in an unsynchronized state, relaying the message to the other nodes of the plurality of nodes, and when the network remains in an unsynchronized state, blocking all messages from the one node of the plurality of nodes until a specifiable period of time has lapsed, wherein the contents of the one message received form the one node is analyzed and wherein the duration of said specifiable period of time is longer than a fixed system parameter.

Furthermore, it is of advantage if the system parameter is a function of the maximum period of message transmission, e.g. of the contention cycle, said one message of said one node is analyzed before relaying said message to the other nodes of the plurality of nodes, or if said one message of said one node is analyzed after relaying said message to the other nodes of the plurality of nodes.

The invention also relates to a guardian for a network consisting of a number of nodes, characterized in that the guardian comprises means for carrying out the steps of the above mentioned method.

The guardian may be realized as central guardian, or the guardian is realized in the form of one or more local guardians means.

The invention also relates to a network of a number of nodes, wherein the network comprises at least one guardian according as mentioned above.

The following description consists of a brief description, a short paragraph referring to the "guardian principle", and the following more detailed description of the invention. References to "Chapters" and "Sections" in the brief description refer to the corresponding chapters and sections of the detailed description.

BRIEF DESCRIPTION OF THE INVENTION

1 Assumptions

The System Model (Chapter 3) lists and discusses the assumptions under which the startup procedure under discussion is intended to operate successfully. This proposal formulates the startup problem in a slightly more general way. Hence, we summarize the most important assumptions in this section. Deviations from the assumptions in Chapter 3 are underlined.

1.1 System Structure

A system is a computer-network that consists of physical components. We distinguish between three types of components:
- Nodes
- Channels
- Guardians Nodes are those instances that have to exchange information. Nodes use channels to propagate the required information in form of messages. Channels may implement guardian instances. A guardian instance is independent of a single node. A guardian instance may block messages from a node according to a priori (that is to system design time) defined rules. The startup procedure under discussion has been designed for star and bus topologies. However, we do not restrict the procedure to those topologies, as the procedure can be adapted to other topologies with simple modifications.

1.2 Timing Assumptions

The timing assumptions are discussed in Section 3.1. Item four (Uncertain Power-On Time) in the enumeration is of particular interest:
The worst-case time until a node is able to listen to the network traffic does not have to be specified a priori.

This worst-case time parameter is difficult to calculate. Hence, it is considered to work without an a priori specification of this parameter.

1.3 Steady State Operation

Steady state operation is discussed in Section 3.2. Additionally, the slot to node relation may be extended such that one node may occupy more than one slot per TDMA round. We will discuss the resulting consequences in this proposal.

1.4 Fault Hypothesis

The fault hypothesis is discussed in Section 3.3. From a fault tolerance point of view, the definition of fault-containment regions is an important issue. A fault-containment region specifies the physical region that may fail as a whole if a single fault occurs. We specify each node to be an independent fault-containment region. We specify each channel plus its attached guardian instance(s) to be an independent fault-containment region. In the fault-tolerance context we speak of a channel instance plus its attached guardian entities as the channel (thus we assume a channel that implements guardian instances).

The startup procedure under discussion shall ensure a safe and timely startup even in presence of an arbitrary faulty node or a passive arbitrary faulty channel. An arbitrary faulty node is allowed to create arbitrary messages (that are messages that contain arbitrary information) at arbitrary times with an arbitrary frequency. A passive arbitrary faulty channel is allowed to create passive arbitrary messages (that are messages that may contain arbitrary information, except a correct message format—e.g. a message that lacks the correct CRC). At any point in time only one fault-containment region will fail. An additional fault-containment region may fail only after the previous fault-containment region successfully recovers.

2 System Startup

In this section we specify the system startup in a hierarchic way. On the top level of the hierarchy we distinguish the following prime algorithmic problems:
- Startup of the nodes (done in the node component)
- Startup of the channels (done in the channel and guardian component)
- Protection of the channels (done in the guardian component)

2.1 Startup of the Nodes

The startup problem and strategies for its solution are discussed in Chapter 4. The general goals of the startup procedure are given in Section 4.1 as Property 1 (Timely Startup) and Property 2 (Safe Startup).

The startup of the nodes is done by the exchange of messages.

2.1.1 Phased Startup

The startup problem can be subdivided into the problem of integration and the problem of coldstart. It shall be configurable whether a node is allowed to execute the coldstart algorithm or not. Both phases may be executed in parallel or sequentially.

Different messages are used for the different phases in the startup algorithm.

2.1.1.1 Problem I: Integration

The goals of the integration phase are listed as Property 3 (Timely Integration) and Property 4 (Safe Integration) in Section 4.4. The basic purpose of the integration phase is: if there exists a sufficient number of nodes that are already synchronized, the integrating node shall join this set of nodes.

During integration the node listens to the channels and tries to receive messages. Usually it does not send messages itself during this phase. The integration principle is based on the relation of nodes to slots: a synchronized node may send a message in its assigned slot(s). The node in integration knows the specified sending schedule (at least parts of it) and, hence, can compare the specified sending schedule to the actual received messages. If it finds a sufficient sequence of messages that matches a fraction of the specified sending schedule, the node successfully integrated, and may send in its own sending slot(s). If integration was not successful for a specifiable period, the node concludes that there is no (sufficient) set of nodes already synchronized and executes coldstart. Based on the number of messages that has to be received and the message semantics, different integration variations can be distinguished.

2.1.1.1 First-Fit Integration (Used in TTP/C 1.0)

The first-fit integration method is the simplest form of integration: if there are already synchronized nodes, at least a subset of these nodes will broadcast integration messages. Integration messages could be a fraction of longer messages or "stand-alone" messages. The integration messages hold the information of the current position in the sending schedule, e.g. in slot two the integration message of the sending node in slot two would hold the information "slot two". Integration is successful upon the reception of one such integration message: the node knows the current position in the sending schedule, e.g. the node knows from the specified schedule that after slot two, slot three will be executed, and so on. The first fit integration requires obviously that faulty messages, e.g. a faulty message that holds the faulty information "slot 1" while the correct information would be "slot 2", have either to be filtered by a guardian or these failure modes are outside the fault hypothesis.

2.1.1.1.2 Tentative Integration

Tentative integration is a method to overcome the problem of integration to faulty messages, while not relying on semantically filtering of the messages by a guardian. Tentative integration uses the fact that only a limited number of integration messages may be faulty. Tentative integration requires the reception of more than one integration message for successful integration. The required number of messages is discussed in Section 4.4. We can distinguish between parallel tentative integration and sequential tentative integration.

2.1.1.1.2.1 Parallel Tentative Integration

Parallel tentative integration is done as follows: a node tentatively integrates to the first received integration frame and checks for the remaining TDMA round whether there exist other integration messages that acknowledge the first received integration message. An integration message acknowledges a previous sent integration message if it corresponds in its state information. Example: the first received integration message holds the information "slot 1", a second integration message that is sent in the following slot holds the information "slot 2". Provided that the slots in the specified schedule are numbered in increasing order, the second integration message acknowledges the first integration message. In presence of a faulty node it can be the case that the integration messages will not be acknowledged by following integration messages. This can be due to: (a) the first integration message was faulty or (b) the upcoming integration message(s) is/are faulty. The characteristic of "parallel" tentative integration is that in case of a mismatch of integration messages the node will execute one tentative TDMA round for each integration message. That means it will execute more than one TDMA schedule in parallel.

The required number of corresponding integration messages is discussed in Section 4.4.

2.1.1.1.2.2 Sequential Tentative Integration

Sequential tentative integration will always execute only one TDMA schedule at a time: a node integrates tentatively to the first received integration message and checks the remaining round for acknowledgments of this integration message. It is not even necessary to detect possible mismatches between integration messages. If the node did not receive a sufficient number of integration messages that acknowledge the first integration message, the tentative integration was not successful. The node then waits an a priori specifiable period (usually a period in the order of a slot) and tries again to receive an integration frame and to tentatively integrate on it. The period, that the node has to wait before the next integration attempt, shall guarantee that the node will not integrate again to an integration message sent by the same node as it integrated to in the previous integration attempt.

The required number of corresponding integration messages is discussed in Section 4.4.

2.1.1.2 Problem II: Coldstart

The coldstart problem is discussed in Section 4.5. The goals of the integration phase are listed as Property 5 (Timely Coldstart) and Property 6 (Safe Coldstart) in Section 4.5.

It shall be configurable whether a node is allowed to initiate coldstart by itself by sending a coldstart signal, or if it is only allowed to synchronize to a coldstart signal.

The use of the coldstart process is the establishment of an agreement on a time origin of a sufficient set of nodes.

We distinguish two basic ways the coldstart algorithm can be constructed: contention-resolution based or contention-tolerant based.

Coldstart is done by the transmission of dedicated signals. The reception of one or more signals is interpreted as time origin. It can be required that a node has to receive silence from the channels for a given period in time preceding the reception of the coldstart signal.

2.1.1.2.1 Contention-Resolution Coldstart

In the contention-resolution coldstart algorithms, the concurrent transmission of coldstart signals by nodes cannot, or should not, be used as coldstart signal. In the case of multiple nodes sending a coldstart signal, a contention resolving algorithm shall guarantee that, within an upper bound in time, there is only one node that sends a coldstart signal. TTP/C 1.0 specifies a contention-resolving algorithm that is based on two unique timeouts per node. This algorithm is discussed in Section 4.5.1 (TTP/C). The listen timeout shall be configurable: valid parameters shall be t.startup+k*t.round, where k may be a value of 1 to 4.

2.1.1.2.1.1 Semantic-Full Coldstart (Used in TTP/C 1.0)

Here a coldstart signal holds the information where to start in the schedule, e.g. node 1 sends a coldstart signal with the information "slot 1". A node that receives such a coldstart signal starts the schedule in slot 1. Likewise node 2 may send a coldstart signal with the information "slot 2". A receiving node starts the schedule then in slot 2. Startup algorithm S.1 in Section 4.6 uses such a coldstart algorithm.

2.1.1.2.1.2 Semantic-Less Coldstart

Here a coldstart message does not contain schedule information. Each node that receives a coldstart frame will start the schedule at its beginning, a fixed offset after the reception of the coldstart message.

2.1.1.2.1.2.1 Simple Coldstart Signal

The coldstart signal used shall be a "simple" signal, e.g. less than four state alternations of logical high and low.

A summary on possible coldstart signals is given in Section 4.3.

2.1.1.2.1.2.2 Complex Coldstart Signal

The coldstart signal used shall be a "complex" signal, e.g. a full message including header, body, and checksum.

A summary on possible coldstart signals is given in Section 4.3.

2.1.1.2.2 Contention-Tolerant Coldstart

In the contention-tolerant coldstart algorithms, even the concurrent transmission of coldstart signals by different nodes can be used as coldstart signal.

Example: a node receives only silence on its incoming channels for a specified time. It then receives anything different than silence for a sufficient long period (this could be a result from a contention of two nodes sending coldstart signals concurrently). The node uses the time instant when it detected the first deviation of silence on its attached channels.

To overcome the problem of a faulty channel that is continually noise, the node may implement a detection algorithm that classifies the channel as faulty. After successful failure diagnosis the node may only use non-faulty channels for the coldstart algorithm.

2.1.1.2.3 Contention-Mixed Coldstart

In general it is difficult to prevent a faulty node to provoke a contention with a good node. The contention-mixed coldstart is a hybrid approach based on both previous coldstart approaches: a contention of a correct node with a faulty node is tolerated, a contention of multiple good nodes is resolved if necessary (e.g. in scenarios where all nodes that are allowed to coldstart are in contention).

2.1.2 Agreement Algorithm

A node can check the number of nodes that are currently synchronized to it by counting the received messages according to the sending schedule (that means e.g. that a node that has multiple sending slots per round will only be counted once in this context). The node may terminate the startup algorithm only after it detects a sufficiently high number of nodes that are synchronized to it. A discussion on this number is given in Section 7.2 (Property 14).

2.1.3 Dedicated Startup Schedule

The startup algorithm may use a dedicated startup schedule. This schedule may consist of a limited number of slots, probably only four slots. After successful coldstart the startup schedule can be changed to the regular application dependent schedule. The dedicated startup schedule as a speed-up mechanism for startup is discussed in Section 4.7.4.

2.1.4 Faulty Channel Detection and Reaction

The startup algorithm may implement a dedicated algorithm for detection of a channel failure. Such a mechanism can be: "A node that reached sync phase and has to re-start can classify the channel that it integrated on as faulty."

If the node detects such a channel failure it will not accept messages from this channel anymore.

2.2 Startup of the Channels

2.2.1 Integration Based on Integration Messages

The startup of the channels is done analogously to the integration process of the nodes.

2.2.2 Usage of Dedicated Synchronization Protocol

The channels use a dedicated synchronization protocol: at certain points in time the nodes send dedicated sync messages. These messages are used only by the channels. These messages can be used by the channels to synchronize to the nodes. Section 5.2 discusses such sync messages. Sections 5.5, 5.6, and 5.7 discuss the usage of sync messages for clock synchronization, for integration, and for coldstart of the channels.

2.3 Protection of the Channels

We use guardian instances that protect the channels from faulty nodes.

2.3.1 Bandwidth Restriction Mechanisms

Bandwidth restriction is the major task of a guardian. It guarantees that a channel will not be monopolized by a single faulty node. Section 5.2 discusses bandwidth restriction mechanisms.

2.3.1.1 Leaky Bucket Algorithm

A simple leaky bucket algorithm is discussed in Section 5.2.1.

2.3.1.2 Slot Control Algorithm

The slot control algorithm is discussed in Section 5.2.2.

2.3.2 Additional Filter Mechanisms

Additional filter mechanisms are discussed in Section 5.4.

2.3.2.1 Semantic Filtering

See Section 5.4.1.

2.3.2.2 Temporal Filtering

See Section 5.4.2.

2.3.2.3 Byzantine Filtering

See Section 5.4.3.

2.3.3 Faulty Channel Detection and Reaction

The channel may implement an error detection algorithm that is able to detect the failure of another channel in the system.

2.3.3.1 Reduction of the Protection Mechanism

The leaky bucket algorithm in the central guardian will only block a port, if the received message was does not fulfill certain requirements.

2.3.3.2 Temporary Filtering Freedom

If there exists a faulty channel, our fault hypothesis excludes the presence of a faulty node. Hence, if all nodes are correct, there is no need for a central guardian instance that protects the shared medium. It is actually counterproductive, as the protection mechanisms conclude the following fact: if the central guardian has detected that all ports have been active, and the system does not manage to reach steady state within the calculated worst-case startup time, there has to be a faulty channel in the system. If there exists a faulty channel in the system, the correct channel stops its filtering mechanisms and relays every message on a first-come first-serve strategy.

2.3.4 Physical Realization of the Guardian Components

2.3.4.1 De-Centralized ("Local") Guardians

The guardian instances can be implemented as so called "local" guardians. These guardians are usually in spatial proximity of the nodes, therefore the terminology. The major characteristic of a local guardian is: each node communicates its messages to different guardians. Each node uses one guardian per channel, e.g. in a two-channel system, each node communicates to two individual local guardians.

2.3.4.2 Centralized Guardians

The guardian instances can be implemented as so called central guardians. These guardians are usually placed at the hub or switching logic in a star-based network topology. The major characteristic of a centralized guardian is: all nodes communicate their messages to the same guardian instances. Each node uses the same guardian per channel, e.g. in a two-channel system, each node communicates to the same two central guardians. Two designs of centralized guardians are discussed in Chapter 5.

2.3.5 Node Guardians

The guardian instances can be implemented as so called node guardians. Node guardians are regular nodes that also incorporate guardian functionality. This type of guardian is of particular interest if the computer network is structured in point-to-point topology. Here nodes are connected in a point-to-point way, such that between any pair of nodes a sufficient number of paths are possible ("sufficient" depends on the fault-hypothesis used, in our case that means $>=2$ paths if the node cannot forge a relayed message, and $>=3$ paths if a node may also forge a relayed message). Note, in general it is not required that each node is directly connected to each other node. A node can rather send a message by itself or relay a message received by a different node. In such a computer network, the node may implement a guardian functionality that ensures that only an a priori defined subset of received messages is forwarded by a node. The braided ring (developed by Honeywell) is an example of the usage of node guardians that is mainly characterized by its ring topology.

2.4 Interrelations and Dependencies of the Prime Algorithmic Problems

The system startup consists of the above discussed parts. The combination of these parts of is in the same order of complexity, if not more complex. Hence, the following items may be protected.

2.4.1 Leaky Bucket Overloading

Leaky bucket overloading means that the rate of message (or signal) generation in a node shall be higher than the rate of messages (or signals) of this node that are relayed by the channels.

We found this of particular interest during the coldstart phase where the priority based contention-resolving algorithm is made fair by using such an approach: if not used the node with the highest priority (that is the node with the shortest timeouts) will always win the contention-resolving algorithm but then fail to send a coldstart signal. Using leaky bucket overloading ensures that there is not a single node that will always win the contention-resolving algorithm.

2.4.2 Switching from Leaky Bucket to Slot Control

This is similar to the previous item. During coldstart the guardians execute a leaky bucket algorithm. Once a sufficient set of nodes accepts the coldstart signal the guardian switches to the slot control algorithm.

Guardian Principle (FIG. 52)

2.5 Guardian Principle

The CBG ("Central Bus Guardian") may either operate in commanded mode or in coldstart mode. It autonomously decides on the mode it will execute in.

2.5.1 Commanded Mode

In commanded mode the guardian waits to receive a sync pattern vote, i.e. it receives transmissions on at least two of the four sync ports that

- have the size of a sync pattern: sync patterns are shorter than any "regular" TTP frame; the guardian will start to count the size of a transmission after having perceived silence (no transition for 2.5 bitcells' times) on the respective port followed by a start-of-frame pattern
- start at about the same time (i.e. within one precision interval)
- comply with the line encoding rules While waiting for a vote in commanded mode the guardian does not forward any traffic received on any port. However, it will start a port-individual two-slots timeout for a (coldstart-enabled) port if it perceives a start-of-frame pattern on the respective port.

If the guardian is in commanded mode and receives a vote indicating that the cluster is executing a user TDMA scheme, it will

- start to relay the traffic of the port as commanded by the voted sync patterns
- output a reshaped version of the signal received on the respective port to all other ports
- relay the traffic for the time suggested by the voted sync patterns
- set up the start window to start at the offset told by the voted sync patterns and to last for twice the precision's duration
- abort relaying immediately if
  - it perceives a start-of-frame pattern prior to the start window
  - the start window ends and it has not perceived a start-of-frame pattern yet
  - the frame has a different type than suggested by the voted sync patterns (N-Frame vs. X-Frame)
  - it perceives silence (2.5 bitcells' times without an edge) after having perceived a (timely) start-of-frame pattern and any number of subsequent data bits (this is either the intended end of a frame or an obvious coding violation)

Note, that the guardian will pick the first vote in case of a 2:2 tie in commanded mode. It assumes that the protocol itself will care for clique resolution in this case and, consequently, that it does not matter which vote it selects. Having processed the "command" received with the voted sync patterns the guardian will start all over again with waiting for another sync pattern vote.

If the guardian receives a sync pattern vote that suggests the acknowledgement round of the coldstart TDMA scheme, it will set up the coldstart TDMA scheme accordingly and change to coldstart mode where it will continue to execute the coldstart TDMA scheme without performing race arbitration before.

Whenever the guardian receives a coldstart-like frame (i.e. any correctly coded transmission that is longer than a sync pattern and whose frame type bits are set to coldstart frame) in commanded mode on a particular port, it will increase a coldstart frame counter associated with this port provided the respective port's counter is smaller than 1. If the guardian finds that the sum of the coldstart frame counters of all sync ports equals 2 and that no port-individual two-slots timeout is active, it will change to coldstart mode (where it will perform race arbitration). In case the guardian received a correct coldstart frame while in commanded mode, but the second channel has relayed the coldstart frame and at least two sync nodes used the coldstart frame for integration, the two-slots timeout ensures that the guardian will receive a valid sync pattern vote.

The guardian will re-set all coldstart frame counters whenever it receives a sync pattern vote indicating a user TDMA scheme or whenever it leaves coldstart mode for commanded mode.

2.5.2 Coldstart Mode

In coldstart mode the guardian will execute race arbitration and relay the traffic of any port that shows activity. The guardian will stop relaying traffic of a particular port after one coldstart slot's duration. The slots of the coldstart TDMA scheme all have the same length which is a function of the precision parameter of the cluster and the selected transmission speed. The duration of the slot is hard-coded for a selected set of combinations of precision and transmission speed. The precision/transmission speed to be used in a particular cluster set up is to be selected by jumpers on the CBG hardware. However, a port will only take part in race arbitration if

- it does not have a block and
- it has been silent for at least five bitcells' times.

Note, that the last condition is permanently being evaluated. Thus, CBG may start race arbitration and a particular port is excluded from the set of ports that may participate because it has been active when CBG started the race. However, once the respective port becomes silent and remains silent for at least five bitcells' times it will become eligible to be assigned transmission permission if it starts another transmission before any other node does.

Once the guardian has chosen a port to relay the traffic of, it will stuck with it and monitor the data received. If the frame type of the transmission is "coldstart frame", the guardian will set up the coldstart TDMA scheme. Otherwise, the guardian will continue race arbitration and watch out for another port to relay the traffic of. In any case—i.e. regardless of whether or not the received traffic is likely to be a coldstart frame—the port that won the race will receive a long block (if it has used all its unblocked coldstart attempts already, where each node is granted three unblocked coldstart attempts) or a short block (if it has any unblocked coldstart attempts left). A long block lasts for as long as it takes to guarantee that another port will win race arbitration (i.e. the coldstart frame of another port will be relayed) before the block is removed. A short block lasts for the duration of the coldstart acknowledgement round plus the coldstart frame offset only and guarantees that a node that sent a coldstart frame followed by a set of sync patterns (during the coldstart acknowledgement round) will not participate in race arbitration when sending the sync patterns.

Whenever the guardian enters the coldstart branch (race arbitration or coldstart mode), it will grant every port three unblocked coldstart attempts. These three attempts guarantee that the guardian will not block a coldstart attempt of a correct node provided the respective coldstart attempt does not collide with a coldstart attempt of another correct node. This way the guardian is transparent to correct nodes once the guardian leaves commanded mode. In case of a faulty guardian that is powered up before the correct guardian being transparent to correct nodes guarantees that the cluster will start up consistently.

If the guardian finds that the port that won race arbitration provided data that obviously was not coldstart-related traffic (either a sync pattern having the coldstart mode flag cleared or a TTP frame that has a type different than coldstart frame), it will set a flag associated with this port. If the flags of two ports are set while the guardian is performing race arbitration, the guardian will change to commanded mode. The flags are cleared upon entering coldstart mode or when finding a matching sync pattern vote in coldstart mode.

Once the guardian has set up a TDMA scheme following a coldstart frame it will proceed in a similar way than in commanded mode: it will wait for a sync pattern vote that matches its TDMA scheme. If it does not receive a vote that matches its own scheme, it will start race arbitration again. Otherwise, it will execute the command received with the sync patterns as in regular commanded mode. However, during the coldstart acknowledgement round the guardian will relay the traffic of a port only if the respective port was not the one it received the coldstart frame on.

If the guardian receives a sync pattern vote that matches its TDMA scheme, it assumes that the transmission it used to set up the TDMA scheme (i.e. the transmission of the port that won race arbitration) indeed was a correct coldstart frame. Thus, the guardian will change the long block (if any) of the respective port to a short block: there is no need to block a potential follow-up coldstart frame of a correct node.

If the guardian directly entered the TDMA scheme from commanded mode (i.e. it did not witness the coldstart frame when performing race arbitration), it will not relay any frames in the coldstart acknowledgement round (since it does not know the node that transmitted the coldstart frame this is the only way to ensure that the coldstarting node will not be able to acknowledge its own coldstart frame). If the guardian receives matching votes for two coldstart TDMA rounds (i.e. the acknowledgement round and the cleanup round), it assumes the cluster is synchronized and will switch to commanded mode.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures:

FIG. 16 is a transition description for a complex startup algorithm,
FIG. 17 is a startup scenario of the complex startup algorithm,
FIG. 23 is the simple leaky bucket algorithm,
FIG. 24 is alternating activity and silence intervals compared to TP and IFG phases,
FIG. 25 is a slot control algorithm,
FIG. 26 is examples of a dedicated hub protocol scheduled with a time-triggered protocol,
FIG. 27 is SOS tolerant activity supervision,
FIG. 28 is a SOS and slot control algorithm,
FIG. 29 is the reshape unit principle,
FIG. 30 e is xamples of the passive reshaping process,
FIG. 32 is the explicit parallel fault-tolerant (EP-FT) algorithm
FIG. 33 is the explicit parallel fault-tolerant average (EP-FTA) algorithm,
FIG. 37 is the approximate coldstart protection,
FIG. 38 is algorithms used in G.A,
FIG. 39 is a G.A startup state-machine,
FIG. 40 is algorithms used in the G.B,
FIG. 41 is a G.B startup state-machine.
FIG. 42 is the fault degree,
FIG. 43 is the effect of increasing fault degree on model-checking performance
FIG. 44 is a number of scenarios for different fault degree
FIG. 45 is the performance results for model checking the lemmas for G.A(S.1),
FIG. 46 is the state names in S .1 and in the SAL model,
FIG. 47 is performance results for model checking the lemmas for G.B(S.2),
FIG. 48 is stabilization in a safety-critical system,
FIG. 49 is a sketch of self-stabilizing mechanisms in the TTA,
FIG. 50 is pseudo code describing the clique resolving algorithm.

DETAILED DESCRIPTION OF THE INVENTION

Figure 1:
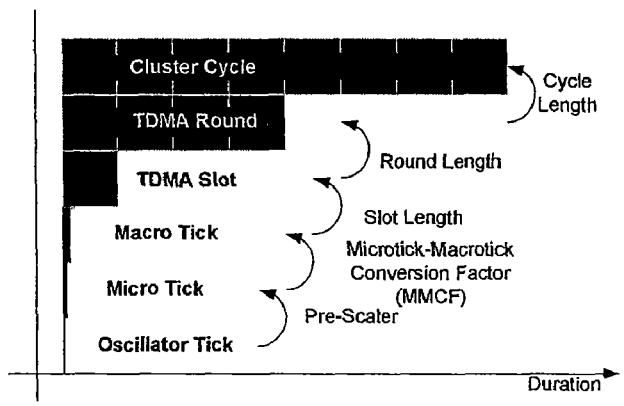
FIG. 1 is the "TTP/C Clock"

Chapter 1
Introduction

The advancements in computer science and engineering allow the implementation of computer systems in everyday devices to improve the quality of their service and to decrease the product costs. Examples of products that successfully use computer systems are electronic shavers, washing machines, mobile phones, or aeroplanes and automobiles; the requirements on the computer systems are as different as their target applications. In particular, the reliability of a computer system that implements critical tasks, e.g. a flight-control system in a jet, must be orders of magnitude higher than for an uncritical task, e.g. the washing program in a washer. This thesis addresses the first type, the so called "safety-critical" systems.

Safety-critical systems have to be fault tolerant, which means that they have to provide a correct service even in presence of failures. Thus, a fault-tolerant system that shall be resistant against external faults inherently calls for a distributed solution where the critical tasks are replicated on several "nodes" to tolerate the permanent loss of parts of the system. A major problem in distributed systems is the communication of information between nodes. A straight-forward solution is an individual direct connection of every pair of nodes that have to exchange information, and, in fact, this approach is used in certain modern aeroplanes. An alternative way for message exchange is the usage of shared communication media such as bus or star topologies, which allows a reduction of physically connections.

The application of shared resources, however, introduces a mutual exclusion problem and, hence, dedicated communication protocols have to be used to guarantee that each node connected to the shared medium will get a fair amount of bandwidth for communication. Time-division multiple-access protocols, such as SAFEBUS [HD93], FlexRay [MHB$^+$ 01], TTP/C [Kop02], SPIDER [MGPM04], which are protocols that off-line specify the access pattern of nodes to the shared medium, are promising due to remarkable quality aspects in the time domain. Also, protection mechanisms that supervise the access of nodes to the medium can be built relatively easy.

Time-division multiple-access protocols require a startup algorithm to reach a steady state operation mode after power-on. In this thesis we discuss such startup algorithms and proper protection mechanisms. Furthermore, we use state-of-the-art model-checking tools to get confidence in the developed algorithms and concepts. The startup algorithm is a powerful mechanism to establish synchronization not only when the system is powered on initially, but can be applied also after a failure that led to a transient upsets of an arbitrary number of components in the system, provided that the system reliably detects the resulting disruption. We discuss such a detection algorithm and the usage of the startup algorithm for restart.

1.1 Contribution

The main contributions of this thesis are:

We developed distributed startup strategies that allow a safe and timely start even in presence of failures. These strategies are based on a distributed algorithm and of centralized instances (central guardians) that control the access to the communication channels. We discuss design tradeoffs between these two parts.

We assess the presented startup strategies by the use of formal methods. To gain objective confidence in our design, we use the SAL model-checking tool-suite developed by SRI International. Our case studies demonstrate the feasibility of tools such as SAL in the design stage of fault-tolerant algorithms.

We show how the startup strategies can be used for restart and define generic restart conditions for time-triggered systems.

1.2 Structure of this Thesis

This thesis is organized as follows:

Chapter 2 "General Concepts": We start by reviewing certain general concepts and terms in the areas of computer systems, dependability, and formal methods.

Chapter 3 "System Model": Here we define the system model, that is, we list the assumptions and requirements under which the algorithms discussed in this thesis are intended to work.

Chapter 4 "Establishment of Synchronization": Time-triggered networks are highly deterministic once a proper degree of synchronization is reached. This chapter discusses algorithms (called "startup algorithms") that are used to establish the required degree of synchronization. We systematically analyze the startup issue and present two startup algorithms: a simple one that tolerates only a limited number of failures and a sophisticated one which is robust to a broader class of failure behaviors.

Chapter 5 "Centralized Fault Masking": As the systems addressed in this thesis communicate over a shared communication medium, an arbitrary failure of any individual node can only be tolerated when additional protection mechanisms for the shared communication medium are present. Such protection mechanisms must be independent of all nodes. The determinism of time-triggered systems allows the implementation of centralized instances, so called "central guardians" as a cost-effective solution. We discuss tradeoffs in the design of central guardians and describe central guardians that are suited to protect the startup algorithms presented in Chapter 4.

Chapter 6 "Algorithm Assessment": The design of fault-tolerant distributed real-time algorithms is notoriously difficult and error-prone: the combinations of fault arrivals, interleaving of concurrent events, and variations in real-time durations lead to a case explosion that taxes the intellectual capacity of human designers. Here we show how modern model-checking tools may assist in the development of fault-tolerant algorithms by analysis and verification of the presented concepts for startup protocols and central guardians.

Chapter 7 "Recovery Mechanisms": Here we discuss the trigger for recovery, that is, the detection of invalid system states. We review the existing "clique avoidance" algorithm and present a new "clique resolving" algorithm as distributed detection mechanisms. This new mechanism is used to automatically trigger a system restart in the rare failure scenarios where multiple nodes fail transiently.

Chapter 2

General Concepts

Unfortunately, the area of computer engineering and computer science lacks an agreed terminology [Pet02]. Thus, to avoid ambiguities, we review selected concepts and terms in this chapter. Here we subjectively group the concepts into three classes: computer system concepts, dependability concepts, and concepts related to formal methods. Computer system concepts are related to the physical characteristics of artificial systems and their functionality. Dependability concepts address mechanisms on how to deal with failures of various nature. Finally, formal methods concepts try to assess system and dependability concepts in an unambiguous mathematical manner.

2.1 Computer Systems

Distributed Real-Time Systems: We understand a distributed system as a finite set of "components" that communicate with each other via dedicated "communication channels" to obtain a common goal. A distributed real-time system is a distributed system that has a non-empty set of real-time constraints as part of the common goal.

Component: A component is a hardware entity which exploits a specified functionality that is specified by its interfaces. A discussion of different classes of interfaces is given in [KS03]. This thesis addresses two types of components: nodes and guardians. Nodes generate, send, and receive messages. Nodes do not directly communicate with each other. They use guardians as relay-stations. The guardians, hence, are able to control the information flow between any pair of nodes. From a node's point of view, a guardian is part of the communication channel it is attached to.

Communication Channel: A communication channel is used to provide information flow between components. This information flow has certain characteristics with respect to timeliness and determinism. A definition of a "timely and deterministic" communication channel is given in [Kop03] by the following three properties:

1. Timeliness: Given that a message is sent at the send instant $t_{send}$ then the receive instants $t_{receive}$ at all receivers of the (multi-cast) message will be in the interval $[t_{send}+d_{min}, t_{send}+d_{max}]$, where $d_{min}$ is called the "minimum delay" and $d_{max}$ is called the "maximum delay". The difference $d_{max}-d_{min}$ is called the "jitter" of the communication channel. $d_{max}$ and $d_{min}$ are a priori known characteristic parameters of the given communication channel.
2. Constant Order: The "receive order" of the messages is the same as the "send order". The send order among all messages is established by the "temporal order" of the send instants of the messages as observed by an omniscient observer.
3. Agreed Order: If the send instants of n (n>1) messages are the same, then an order of the n messages will be established in an a priori known manner.

We call a communication channel that fulfills properties two and three "ordinal deterministic". If a communication channel fulfills all properties stated above we say this communication channel is "temporal deterministic", thus temporal determinism is a stronger form of determinism than ordinal determinism.

We call a communication channel "path deterministic", if there is an a priori known route from a sending to a receiving node. Path determinism and temporal determinism are orthogonal properties.

Common Goal Each system we build has to fulfill a certain purpose. In a distributed system, each component executes an individual functionality and the sum of these individual contributions can be seen as the common goal of the overall system. In this thesis the common goal of the system is rather simple: all components shall exchange information in a temporal deterministic manner.

State: A definition of state is given by Mesarovic et al. [MT89]: " . . . the state embodies all past history of the given system . . . ". Time is, thus, an integral part of the definition of state. To use the abstract concept, time, we have to provide clocks.

Clocks: A component that has access to an oscillator, e.g. a quartz crystal, can use the regularity of this oscillator to implement a clock. A clock is basically a hierarchical set of cyclical counters and has state and rate. The state of a clock at some point in real-time is the current assignment of all its counters. The rate of a clock is the period of the cyclical counters. The state of a clock changes with the progress of real-time in relation to the frequency of the oscillator. According to [Rus99]: let $\mathcal{C}$ be the clocktime, that is time represented within a node by its counters, and let $\mathcal{R}$ be the real-time, then the clock of node p is represented by the function:

$$C_p: \mathcal{R} \rightarrow \mathcal{C} \tag{2.1}$$

meaning that at each point in real-time t there exists a corresponding assignment of a node p's counters that represent the node's local view of time $C_p(t)$.

The timing of the Time-Triggered Protocol is given in FIG. 1 as an example of a clock: the lowest counter in the timing hierarchy counts the oscillator ticks. After Pre-scaler-times oscillator ticks, the next higher counter, in this case the microtick counter, is increased, and so on.

Synchronization: In a distributed system where each of the components has access to a local clock, the states of the local clocks can be brought into agreement, that is, the clocks can be synchronized. For this purpose there are two types of algorithms: clock-synchronization algorithms and startup algorithms. Clock-synchronization algorithms are used to maintain the quality of the synchronization once a certain threshold is reached. The startup algorithm has to ensure that such a threshold is reached within an upper bound in time.

Formally spoken, a startup algorithm ensures that there exists a point in time $t_0$, such that the local clocks of a set of nodes differ by less than an a priori definable threshold Π. Π is called the precision of the system:

$$\exists t_0: |C_p(t_0) - C_q(t_0)| < \Pi \tag{2.2}$$

When there exists such a $t_0$, the clock synchronization algorithm ensures that for each $t > t_0$, the clocks stay in agreement:

$$\forall t > t_0: |C_p(t) - C_q(t)| < \Pi \tag{2.3}$$

This separation of the synchronization problem into the subproblems of startup and clock synchronization is not always done in the literature and there are "clock-synchronization" algorithms that solve both subproblems at once. Many of these algorithms, however, either assume a reliable transmission of messages between the nodes per se or are of a probabilistic nature. Economic safety-critical systems cannot rely on such assumptions and make the isolation of subproblems reasonable.

Triggers: In a computer system, there is no action that starts by itself. An action needs a trigger to be executed. We can distinguish two basic types of triggers: "event"-triggers and "time"-triggers. Event-triggers are external triggers that are received by a component either via the communication channels or from the environment. Time-triggers (are triggers that) arise when a clock, to which the component has access to, has reached an "action state". These action states can either be defined a priori, and be therefore explicitly known to the systems designer, or can evolve from the execution of certain algorithms on a component. An example for an a priori defined action state would be the start of a Task A: schedule task A at time 12:00, where 12:00 is the action state of the component's clock. An example for an evolved action state would be the start of a Task B: schedule Task B after Task A, where the action state evolves depending on the execution time of Task A.

Synchronization of the local clocks of the components allows action states to be defined throughout the distributed system, such that it is guaranteed that these action states are reached within the precision Π. Hence, it is possible to implement synchronized time-triggers, that allow the components to operate as a coordinated whole.

Time-Triggered Communication: Synchronized time-triggers can be used for the communication strategy: we off-line specify the action states when a node is allowed to access the shared medium. If all nodes adhere to this schedule, a fair distribution of bandwidth is guaranteed. Faulty nodes that do not restrict their sending behavior to the specification have to be blocked by additional guardian instances.

We call a communication strategy that is based on synchronized time-triggers a "time-triggered communication" strategy, whereas communication strategies that use unsynchronized (event- or time-) triggers are called "event-triggered communication" strategies.

2.2 Dependability

Before discussing the various dependability concepts we should be aware of the following, rather philosophical, facts:

Observation 1 We do not know how to build a perfect dependable computer system that will always perform its intended behavior.

This is a natural limitation that directly follows from our incomplete knowledge of reality: we simply do not know all external forces that can potentially influence our physical system. On the first glance this appears to be a very restricting fact, however, there are physical systems around that perform safety-critical tasks, e.g. automobiles, aeroplanes, nuclear power plants, and so on. The "Erkenntnistheorie" developed by Popper addresses this problem: although real world problems cannot be proved, we shall formulate our theories on reality in a "testable" way. The procedures and how-to's for the required testing lead to the second fact.

Observation 2 We believe that we know methods that increase the dependability of computer systems.

Dependability research is concerned with the construction and evaluation of such methods. The variety of these methods is as wide as the traditional areas that it encloses: physical methods such as hardware fault-injection, mathematical methods as formal proofs or statistical evaluation of experiments, philosophical and cognitive methods for the assessment of acceptable assumptions and requirements, psychological and sociological methods to increase the trustworthiness to the general public (as well as the certification authorities) in the respective system, and, of course, the omnipresent economic methods that often limit the degree of implementation of all other methods. This list does not claim for completeness. It shows the complexity of the resulting scientific conglomerate.

Observation 3 We do not have a quality metrics for dependability as a whole.

We usually reason on the quality of dependability by creating a safety case which includes all the information that is gathered by the application of the dependability methods. There are certification standards that help in the overall assessment of dependability. However, all reasoning in the safety case is done at least "semi-formal". We do not have a method that quantitatively combines all or even bigger parts of the safety case, let's say the "una in diversitate" is missing. Without such a metric we rely on the experience of the relatively short history of dependable computing systems. This problem of combination as well as quantification is an open field in dependability research and the increasing complexity of industrial computer systems pushes for novel solutions in this area.

Observation 4 Composability is a key concept to master the application of the dependability methods.

Composability [KO02], [KS03] as well as the mathematical counterpart compositionality [Bro97] address the known guideline of "divide et impera!". In order to use dependability methods, we have to divide the overall problem into a hierarchy of well-defined controllable sub-problems. The process of dividing as well as the process of combination of the results is a dependability method as well.

2.2.1 Dependability Tree

Figure 2:
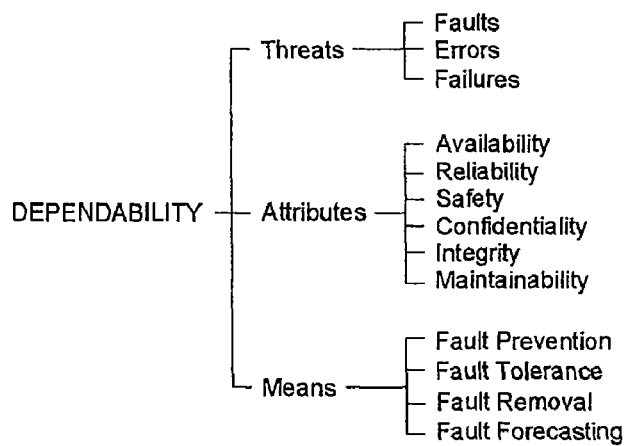
FIG. 2 is the dependability tree [ALRLO4]

Having these fundamental facts in mind we give an overview of the dependability area next. The basic nomenclature for dependability is given by the "dependability tree". As dependability is a relatively young research discipline this tree has changed during the last decades; a current version is given in [ALRL04] (see FIG. 2). It distinguishes three categories: threats, attributes, and means. In the next sections we briefly discuss these categories.

2.2.1.1 Threats

Threats address the concepts of a misbehavior as cause (the fault), manifestation (the error), and consequence (the failure). The fault-error-failure terminology was introduced in [Lap92].

A fault-containment region (FCR) is "a set of components that is considered to fail (a) as an atomic unit, and (b) in a statistically independent way with respect to other FCRs" [KPJ$^+$01].

The independence argument has a great impact on the design of a fault-tolerant system, and it is, hence, necessary to do the classification of fault-containment regions in a reasonable way. Reasons for violating independence are given in [Kop].

Figure 3:
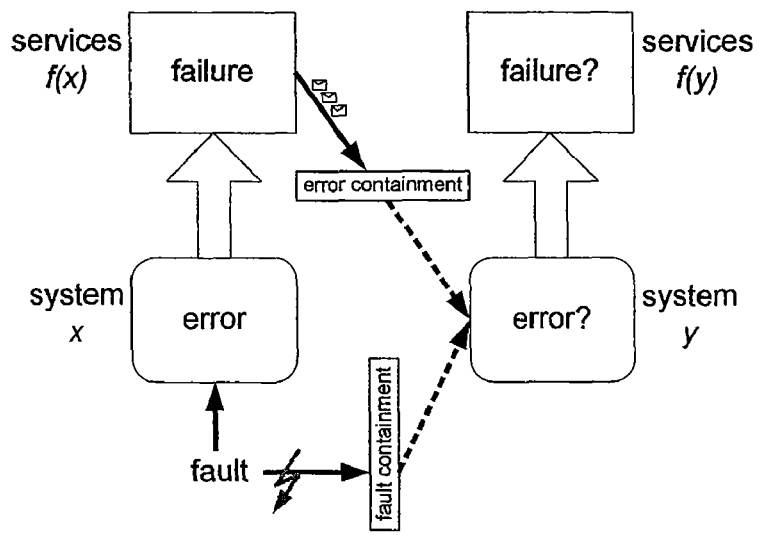
FIG. 3 is a fault-containment and error-containment.

Consider a computer system x that provides a certain service, f(x). Let us assume that x is affected by some fault. If the fault also affects a different FCR, say y, the fault-containment assumption is violated and we say, the fault has "propagated". The fault may change the correct state of system x to an error (state) and this error may lead to a deviation of the actual behavior of the system x from the specified behavior, i.e., system x exhibits a failure. If this failure causes an error in a different fault-containment region, say y, we speak of "error-propagation". Fault-Containment and error-containment and their interrelation are depicted in FIG. 3.

2.2.1.2 Attributes

The dependability attributes are defined as follows [ALRL04]:
availability: readiness for correct service,
reliability: continuity of correct service,
safety: absence of catastrophic consequences on the user(s) and the environment,
confidentiality: absence of unauthorized disclosure of information,
integrity: absence of improper system state alterations,
maintainability: ability to undergo repairs and modifications.

2.2.1.3 Means

The dependability means are defined as follows [ALRL04]:
fault prevention: how to prevent the occurrence or introduction of faults,
fault tolerance: how to deliver correct service in the presence of faults,
fault removal: how to reduce the number or severity of faults,
fault forecasting: how to estimate the present number, the future incidence and the likely consequences of faults.

These means are used, for example in the Time-Triggered Architecture, as follows:

Example: The Time-Triggered Protocol is developed according to safety standards to prevent faults. Fault tolerance is achieved by active replication, the usage of guardians (failure filters), and the usage of fault-tolerant algorithms in general. Key algorithms are verified by the usage of formal methods and exhaustive simulations as well as various types of fault-injection techniques to detect and remove design faults. Fault forecasting is achieved by analysis of the assumptions and requirements of the protocol.

2.2.2 Fault Hypothesis and Assumption Coverage

The fault hypothesis has a central part in the specification of a safety-critical system. It specifies qualitative and quantitative properties of faults that can be tolerated. In particular a good fault hypothesis has to describe the following points [Kop]:
- definition of the fault-containment regions
- definition of the number of fault-containment regions that are allowed to fail at the same time
- definition of the failure modes a fault-containment region is allowed to exhibit
- frequency of failures It is an engineering challenge to find values for these required points of the fault hypothesis. Hence, there is no absolute guarantee that the fault hypothesis will always be satisfied. Powell et al. [Pow92] define a probability formalism to quantify the "assumption coverage" of the failure mode assumptions of a fault-containment region. Another form of the assessment of a broader class of failure mode assumptions can be done by Markov models using computer-aided analysis, as done for a fault-tolerant group membership algorithm in [LMK04].

2.2.3 Redundancy Techniques

The Merriam-Webster Online Dictionary defines redundant as: "exceeding what is necessary or normal". In the context of dependability we have to modify this definition to "exceeding what is necessary or normal in absence of failures". Basically, we can distinguish three different types of redundancy:
- time redundancy: repeated execution of the same function
- space redundancy: replication of components
- functional redundancy: dedicated algorithms for error detection and correction Depending on the failure modes that have to be tolerated the appropriate redundancy type has to be used. In particular, if a component that executes a safety-critical task, is allowed to fail permanently, this component has to be replicated (space redundancy) to ensure the availability of the safety-critical task. The required number of replicas is a function of the failure mode of the faulty component [Kop97, p. 121]:
- $k+1$ components are necessary to tolerate k fail-silent faulty components
- $2k+1$ components are necessary to tolerate k fail-consistent faulty components
- $3k+1$ components are necessary to tolerate k malicious (Byzantine) faulty components ([LSP82])

These functions were developed under a general system model. Hence, if the system model becomes more specialized by adding additional assumptions/algorithms, these functions can alter. An example is the Byzantine Generals problem.

Example (Byzantine Generals): In general it is necessary to implement "interactive consistency" to solve the "Byzantine Generals Problem": a set of nodes has to agree on a correct value in presence of faulty nodes that may be asymmetric faulty. A Byzantine-tolerant algorithm that establishes interactive consistency in presence of k arbitrary failing nodes requires $3k+1$ nodes and several rounds of message exchange [PSL80], [LSP82]. For clock synchronization, and thus, for the maintenance of the global time base [Kop98], instead of an interactive consistency algorithm an "interactive convergence algorithm" [LMS85] can be used that needs only a single round of message exchange.

The Time-Triggered Architecture claims to tolerate 1 arbitrary faulty component (that is k=1). Since all nodes of a cluster, independent of their involvement in a particular application system, can contribute to handle timing failures at the architecture level, the lower bound of nodes in a system is $3*1+1=4$ which is a relatively small number for real systems.

Once a proper global time has been established, tripple modular redundancy for masking of value failures can be implemented using only $2k+1$ synchronized nodes in a particular application subsystem. Two concepts contribute to this fine property, the "self-confidence" principle and "replica-determinism". According to the self-confidence principle a node will consider itself correct until it becomes accused by a sufficient set of nodes. A set of nodes that operates replica deterministic will produce the same output at most an a priori specifiable interval d apart [Kop97, p. 111]. That means that the tolerance of a Byzantine-faulty component does not necessarily require a solution to the Byzantine Generals Problem. The Byzantine Generals Problem has to be solved only if values from the environment are received that are used to maintain and establish the synchronization.

The separation of timing failures and value failures thus reduces the number of components needed for fault tolerance of an application from $3k+1$ to $2k+1$.

2.3 Formal Methods

When using distributed computer networks in safety-critical systems, the correctness of the used algorithms has to be ensured. Due to its inherent ambiguity natural language is not suitable for the specification of such algorithms. Hence, those algorithms are often specified in formal specification languages, which are basically a form of mathematical representation. Once such a mathematical specification has been established, it can be used to derive formal correctness proofs by using formal verification. We can distinguish two methods of computer-aided formal verification: theorem proving [Hoa69] and model checking [CGP99]. In theorem proving a real-world problem is transformed, by hand, into a mathematical model where facts are stated as axioms and properties can be deduced by reasoning on these axioms. With model checking, a real-world model is transformed, again by hand, into a mathematical problem. The model-checking tool (i.e. the model checker) is then used to execute a complete search through the whole state-space of the mathematical model for the validity of a given property. By using highly sophisticated transformation and search algorithms, modern model checkers are able to search an enormous state space. Although theorem proving may still be necessary for the final verification and certification process, model-checking studies are very valuable during the design phase of the algorithms since the proof is derived automatically and can easily be re-done if the model changes. Thus, model checking is a method that may not only be used for verification but appears also attractive for computer-aided design of fault-tolerant algorithms. An comprehensive discussion on the topic of model checking is given in [CGP99]. We will discuss more model-checking concepts in Chapter 6.

Chapter 3
System Model

Before specifying an algorithm it is necessary to define the system model that is intended to host the algorithm, i.e. the rules the algorithm has to follow need to be listed explicitly. The concepts and algorithms discussed in this thesis use the Time-Triggered Architecture (TTA) [KB03] as reference architecture. However, by explicitly listing the architecture's properties we do not restrict the results of this thesis to TTA.

3.1 Timing Assumptions

In order to achieve synchronization in a distributed system, the system has to be "synchronous". Now, there is neither an agreement in the communities on what the properties of a synchronous system are, nor on those that make a system "asynchronous", and hence, there exists a manifold of different system models: synchronous and asynchronous [Lyn96], meso-synchronous [Jen04], timed-asynchronous [CF97], timely computing base [VC02], and many more. These system models differ with respect to the "number" of timing assumptions, e.g., the timed-asynchronous model assumes bounded computational steps, while the asynchronous system model does not require timing assumptions at all. The system model within this thesis is similar to the synchronous system definition given by Verissimo [VR01, Chapter 3].

We call our system model "eventually synchronous". It is defined by the following timing bounds:
1. Bounded Propagation Delay: there is a known upper bound $\delta^{pd}$ on the propagation delay. $\delta^{pd}$ consists of the time it takes for sending the first bit of a message, transporting, and receiving the first bit of a message over a communication medium.
2. Bounded Clock Drift: every node n has a local clock $C_n$ with a known bounded rate of drift $\rho_n \geq 0$ with respect to physical time.
3. Bounded Processing Time: there are known upper and lower bounds on the time required by a process to execute a processing step.
4. Uncertain Power-On Time: the time, $\Delta_{power-on}$, that a node/channel needs until it is able to participate in the distributed system, is bounded but not known.

The first three items are natural assumptions and usually reflect the upper bounds that are required for real-time systems.

Item 4 in this enumeration is the most critical one because it makes the distinction of a crashed component from a late component impossible; this follows from the impossibility result on crash failure detection in asynchronous systems [FLP85]. The first startup algorithm that we will discuss weakens item 4 above by requiring a known upper bound on the power-on time of channels and leaving only the upper bound on the power-on time of nodes free. However, the second approach we present is intended to adhere fully to the timing requirements.

Of course, the easiest way to circumvent the problem with item 4 is to delete item 4 and require known upper bounds for all actions in the computer system. However, it seems an engineering challenge to build a proper mechanism that would not lead to additional requirements and assumptions that make the startup more difficult.

3.2 Steady State Operation

A configuration, a cluster, of the TTA consists of node computers, nodes, and a replicated communication medium, channels. The channels are implemented as half-duplex connections, which means that each node can either transmit or receive at the same point in time, but not both concurrently. To avoid medium access by a faulty node the TTA specifies guardians that can be either local at the nodes [Tem98], or central at hubs [BKS02]. Rodriguez et al. use the similar concept of a "wrapper" [RFA02], which is a software entity used to "wrap" other critical software entities. If central guardians are implemented, these components can be connected via "interlinks". Interlinks are unidirectional channels that allow the central guardian of channel X to receive messages of channel Y and vice versa.

Figure 4:
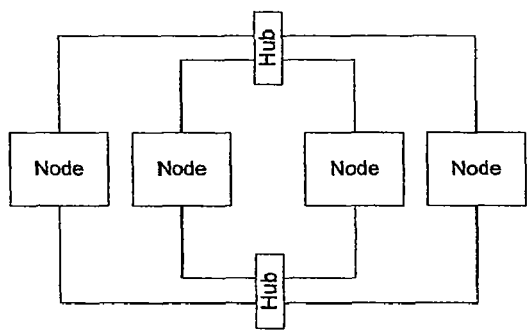
FIG. 4 is a cluster of four nodes and two channels in star topology.

Communication is performed by the Time-Triggered Protocol, a protocol based on time-division multiple-access. The TTA obtains its synchronous behavior by the progression of real time, that is, there exists a global system time, which is used for the arbitration of the communication medium. In the TTA this global time is established by using the local clocks of the nodes. A cluster consisting of four nodes and two channels is depicted in FIG. 4 (interlinks are not depicted).

Figure 5:
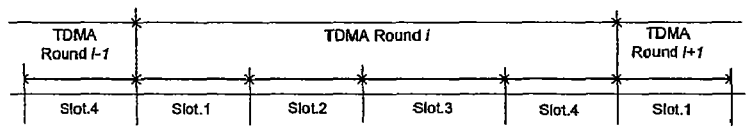
FIG. 5 is a TDMA round of four slots.

A time-division multiple-access communication strategy splits up time into (non-overlapping) pieces of not necessarily equal durations $\tau^{slot}$, which are called slots. Slots are grouped into sequences called TDMA rounds. An example of a TDMA round with four slots is given in FIG. 5.

The knowledge which node occupies which slot in a TDMA round is static, available to all components a priori, and equal for all TDMA rounds, we call this information the "TDMA round layout". According to the TTA each node will only occupy one slot per round. Due to this surjective relation from slots to nodes, nodes can be identified by their slot position in the TDMA round schedule. The duration of a TDMA round $\tau^{round}$ is given by:

$$\tau^{round} = \sum_{j=1}^{n} \tau_j^{slot} \qquad (3.1)$$

We assume that the number of nodes, n, equals the number of slots, n, thus there are no unassigned slots. However, to provide a higher degree of flexibility the TDMA round layout can leave a certain number of slots unassigned for future extensions (see Section 7.5).

When the sending slot of a node i is reached, the node has exclusive access to the communication medium for a defined fraction $\tau_i^{TP} < \tau_i^{slot}$ of the duration of it's slot, $\tau_i^{slot}$. Since the local clocks in a distributed system cannot be synchronized perfectly, there have to be silence gaps to guarantee non-overlapping transmissions. Therefore, the node cannot use the complete slot duration for transmission.

Figure 6:
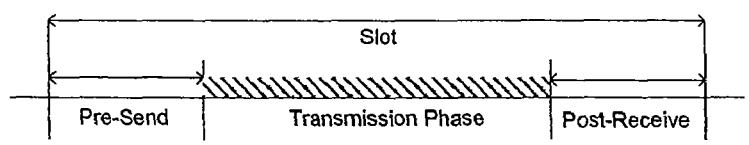
FIG. 6 is slot phases.

The sending slot, $\tau_i^{slot}$, of a respective node i is split up into three phases: pre-send, transmit, post-receive. The slot phases are depicted in FIG. 6.

In the pre-send phase preparations for the transmission are done and the actual sending process is done in the transmission phase. During the post-receive phase the states of the nodes are updated according to the received messages. The duration of a slot i of a respective node i is hence defined by the lengths of the distinguished slot phases $\tau^{pre-send}, \tau_i^{TP}$, and $\tau^{post-receive}$:

$$\tau_i^{slot} = \tau^{pre-send} + \tau_i^{TP} + \tau^{post-receive} \qquad (3.2)$$

The durations of the pre-send and the post-receive phase are equal for every slot while the duration of the transmission phase can be node specific.

The duration between two consecutive transmit phases is called inter-frame gap (IFG) and is of constant duration $\tau^{IFG}$. Hence, we can write the duration of a TDMA round also as:

$$\tau^{round} = \sum_{j=1}^{n} \tau_j^{TP} + n * \tau^{IFG} \qquad (3.3)$$

In order to execute this communication algorithm in steady state operation mode the components of the distributed system have to maintain an individual local state. According to Kopetz [Kop97, p. 76], the state of a component can be divided into two parts: the initialization state (i-state) and the history state (h-state). The i-state is the static data structure that consists of all data that is used for the node's initialization as well as the program code and is usually stored in the ROM of the node. The h-state is the dynamic data structure that changes within the progress of the node's execution and is stored in the RAM of the node.

Definition 1 node's i-state:
program code
the node's ID
startup parameters (timeouts): $\tau^{round}, \tau^{startup}$
the parameters used for clock synchronization: precision $\Pi$, the microtick-macrotick relation, and
the description of the TDMA round layout[1]

[1] In TTP/C this is called the message-descriptor list (MEDL).

Definition 2 node's h-state:
current slot number, $slot_i$,
local view of the global time, $time_i$,
membership vector, $membership_i$, that is a bit vector that consists of one bit for each slot (and therefore node) in the system,
two counters, $accept_i$ and $reject_i$.

The i-state is static and will not change during the mission time of the system. However, a fault may cause changes in the i-state, which may lead to a permanent failure of the component. The h-state can either change by progression of time or by reception of a message and will be updated according to the protocol's algorithms. We assume that during synchronous operation each message that is broadcasted carries a sufficient fraction of a sender's current h-state to enable a node that is not synchronized yet to integrate. Still, for fault-tolerance reasons more than one message may be necessary.

Definition 3 Distributed State: The h-state of a distributed system consists of all local h-states.

To describe the state of our system we introduce a synchronized relation $$\overset{\Delta d}{\sim}$$

between corresponding state values in different nodes:

Definition 4 Synchronized Relation: two values $v_i$ and $v_j$ that are located in nodes i and j, respectively, are said to be synchronized, if after the transmission of a message from an arbitrary node k (with i≠k and j≠k) in the system, the respective values in node i and node j become equal within a given maximum interval, $\Delta d$. We write $$v_i \overset{\Delta d}{\sim} v_j.$$

The synchronized relation, $$\overset{\Delta d}{\sim},$$

is:
reflexive:

$$a \overset{\Delta d}{\sim} a$$

symmetric:

$$a \overset{\Delta d}{\sim} b \rightarrow b \overset{\Delta d}{\sim} a$$

transitive:

$$a \overset{\Delta d}{\sim} b, b \overset{\Delta d}{\sim} c \rightarrow a \overset{\Delta d}{\sim} c$$

The transitive property of $$\overset{\Delta d}{\sim}$$

is a desired property that is guaranteed by using central guardians, during steady state operation.

Figure 7:
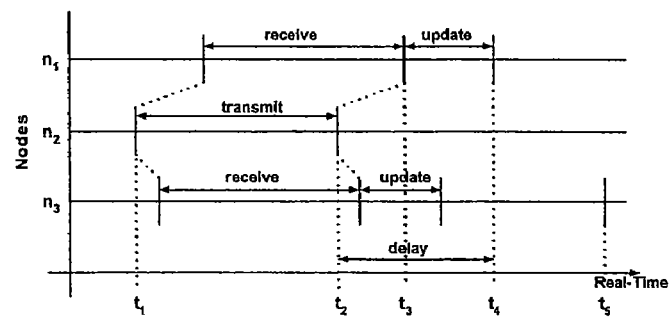
FIG. 7 is intervals of a fixed synchronized state.

The transmission of a node is depicted in FIG. 7. Node $n_2$ starts sending at $t_1$ and finishes at $t_2$. At the latest at $t_3$, each node has received the message. After reception the state has to be updated, which is finished at latest at $t_4$. At $t_5$, the next transmission starts. Thus, the delay $\Delta d$ ($[t_2, t_4]$ in FIG. 7) is given by the sum of the maximum propagation delay, $\delta_{max}^{pd}$ and the worst-case time to update the state, $\Delta_{max}^{update}$:

$$\Delta d = \delta_{max}^{pd} + \Delta_{max}^{update} \tag{3.4}$$

Furthermore we define synchronized nodes:

Definition 5 Synchronized Nodes: a set of nodes is said to be synchronized, if for each two nodes i and j the following conditions are fulfilled:
1. $membership_i$ $$\overset{\Delta d}{\sim}$$

$membership_j$, that is, synchronized nodes have the same view on the membership, and
2. $|time_i - time_j| \leq \Pi$, that is, the local times of two nodes $node_i$ and $node_j$ differ at most by the precision of the global time base, and
3. as a consequence of Point 2: the measurements of the start instant of a slot, as well as the measurements of the end instant of a slot measured by a $node_i$ and a $node_j$ differ at most by $\Pi$, that is, the nodes act slot-synchronously.

The first item in the synchronized nodes definition needs further explanation: in principle it would be sufficient to require only the second and third point to declare a set of nodes synchronized. This is also sufficient for the startup discussions in this thesis: we argue that a consistent membership can be constructed once the synchronous time base has been established and temporal deterministic communication is guaranteed.

However, the TTA provides an integrated diagnosis service as one of its basic services which ensures that all good nodes have a consistent view on the set of good nodes. This integrated diagnosis service uses the membership vector as a data structure. Hence, the system has to recover quickly if the consistency of the membership vector is lost. We will discuss a detection mechanism for membership inconsistencies in Chapter 7.

Definition 6 We call a set of synchronized nodes a clique.
Definition 7 Dominant and Minority Cliques:
We call a clique dominant if no other clique is possible with equal or bigger size in terms of the number of nodes. We call all other cliques minority cliques.

We distinguish two types of multiple cliques scenarios: benign and malign. In the benign case, all cliques operate adhering to the same TDMA schedule and nodes in different cliques have no synchronized membership information (thus violating item 1 in Definition 5). In the malign case nodes in different cliques do not have synchronized membership, nor synchronized time-base which basically means that the TDMA schedules of the cliques are shifted.

Figure 8:
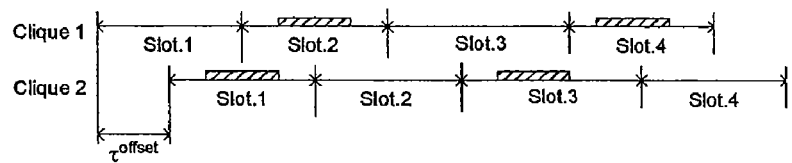
FIG. 8 is a scenario of malign cliques.

Malign clique scenarios are possible where the nodes in different cliques may not be able to recognize the existence of different cliques: all transmissions of one clique occur in the inter-frame gaps of the other cliques. Such a scenario is depicted in FIG. 8, two cliques are formed where clique 1 sends in the IFGs of clique 2 and vice versa.

3.3 Fault Hypothesis

The design of a fault-tolerant architecture and its corresponding algorithms is a complex procedure that requires an explicit listing of the assumptions on faulty components. We review these assumptions in this section.

3.3.1 Primary Fault Hypothesis

According to the TTA fault hypothesis, each node and each communication channel (together with its guardian) forms one fault-containment region (FCR) [KPJ+01], that is, those components fail statistically independently. The failure modes of the different FCRs are defined as follows. A node is allowed to fail "arbitrarily", that means it may:

send arbitrary signals,
at arbitrary times,
for arbitrary durations.

The fault model of a channel is defined to be "passive arbitrary". That means a faulty channel/guardian:

may delay a message only for an upper bound in time,
may relay a received message only to a subset of connected nodes, and
may not create correct messages.

The system has to tolerate the permanent loss of any one of its FCRs in the defined failure mode. We say the system has to guarantee its services under a "single-failure hypothesis".

The TTA uses two replicated broadcast channels. Hence, in general, the arbitrary failure of one of the channels cannot be tolerated.

Example: Suppose a node $n_{send}$ sends a message m to a receiver $n_{receive}$. Say, the contents of m is value "true". The correct channel relays the correct message m, but a faulty channel sends a valid message with the faulty content m="false". $n_{receive}$ receives therefore "true" on the correct channel and "false" on the faulty channel. Hence, it is not possible for $n_{receive}$ to identify the correct value.

A more sophisticated example is given by Morris et al. in [MKK04], where the TTP/C startup algorithm is analyzed in presence of arbitrary faulty central guardians.

In order to achieve this primary fault hypothesis the TTA uses guardians and active replication of the nodes and channels.

3.3.2 Secondary Fault Hypothesis

Field studies show that the probability of transient upsets in a single component [Nor96, O'G94], also referred to as soft errors in the literature, caused for example by cosmic rays, is much higher than the probability of a permanent failure of a component [WWS99, PM98]. Furthermore, in some rare cases the assumption on fault containment regions may not hold anymore. The whole system may be affected by either a single transient fault or by multiple transient faults within some interval $\Delta t$. We call such scenarios a transient upset. The secondary fault hypothesis addresses the failure class of transient upsets:

Definition 8 The secondary fault hypothesis claims that the TTA will recover after a transient upset of an arbitrary number of components within an upper bound in time.

3.3.3 Fault-Hypotheses Dependencies

This secondary fault hypothesis extends the primary fault hypothesis, hence, a faulty node may show a particular behavior that would not be possible in the primary fault hypothesis only:

Lemma 1 An arbitrarily faulty node can participate as a correct node in an arbitrary number of cliques in the system, which increases the set of nodes in the system from a logical point of view. Therefore, we call the resulting set of nodes logical nodes.

Discussion: The system can be disrupted in such a way that multiple cliques are established. An arbitrary faulty node can pretend to be participant in more cliques by simply sending in its sending slots in the respective cliques. That is, a faulty node occupies a sending slot in each clique. All nodes of a respective clique will see this particular node operating synchronized to themselves. ∎

For central guardians, the following lemma holds:

Lemma 2 A correct guardian will participate only in one clique. A valid failure model of a guardian is to participate in an arbitrary number of cliques.

Discussion: The task of a correct guardian is to ensure correct protocol execution. Thus a correct guardian will only protect the single clique it participates in and block all other communication. A faulty guardian, however, may fail to block communication of other cliques, and, thus, relays messages from nodes in various cliques on its channel. ∎

3.3.4 Manifestation of a Faulty Component

In the fault hypothesis we defined the failure mode of a faulty node as arbitrary faulty and for a faulty hub as passive arbitrary faulty. On a logical, algorithmic level that means:

a faulty node is allowed to send an arbitrary sequence of messages and noise (that is activity that is not recognized as a valid message), with arbitrary intervals of silence in between two accesses to the communication channels.

a faulty channel may relay valid messages only to a (possibly empty) subset of nodes whenever a node sends a valid message. Furthermore, a faulty channel is allowed to send noise itself to a subset of nodes at any time.

Byzantine Failure We understand a Byzantine-faulty component as a component that yields an asymmetric failure behavior. Different components that interact with the Byzantine-faulty component may see the output of the Byzantine-faulty component inconsistently. In a distributed system, which solely exchanges messages via a shared medium, the impact of a Byzantine-faulty component is limited: the Byzantine-faulty component cannot send different messages to different components (as it would be possible in fully-connected topologies). Still the Byzantine-faulty component may exhibit its asymmetric behavior in the borderland between digital and analog world, since it is impossible to perfectly synchronize the local clocks in a distributed system [LL84]. Algorithms that are based on the values of the local clocks are inherently vulnerable to a Byzantine-faulty component. For example: assume a given deadline when a message of a Byzantine-faulty component has to arrive. The Byzantine-faulty component sends the message "just about" this deadline which potentially causes a component A to classify the message as timely accurate while a component B detects a timing failure, since B's local clock is slightly faster than the clock of A. We call such a failure a "temporal Slightly-Off-Specification" (temporal SOS) failure. On the other hand slight changes on the voltage levels at the physical communication lines may cause a component A to decode a message sent by a Byzantine-faulty component differently than a component B. We call such a failure a "value SOS" failure.

SOS failures have been examined during fault-injection experiments and as an architecture decision the central guardians were equipped with control mechanism to trans-form the asymmetric SOS behavior into detectable symmetric failures. This method is also called "Byzantine filtering" in the literature [DHSZ03].

This interpretation of a Byzantine faulty component abstracts from failures caused by metastability [KC87], [Wel96]. A faulty node may send such a metastable signal that can be interpreted by two receivers differently. However, such a signal would have to propagate through the central guardians. By increasing the logic in the central guardians as well as by decreasing their clock speed, the probability of the propagation of the metastable signal can be reduced.

Information Loss Our system model, which is based on a shared communication medium, causes the manifestation of a particular failure behavior: a faulty component may not only introduce additional faulty information, it can potentially cause a reduction of correct information. In our case this reduction can be caused by a faulty channel that drops messages but can also be caused by a faulty node that destroys a message of a correct node by sending at an inappropriate point in time. This second type is of particular importance for the startup strategy as we will see in the upcoming chapters of this thesis.

3.4 Minimum Configuration

The TTA requires a minimum configuration of four nodes to guarantee the correct execution of its algorithms, as for example the clock-synchronization algorithm. This is a natural consequence of the defined fault hypothesis:

the failure behavior of a faulty node may be arbitrary
in general we need 3 k+1 nodes to tolerate k arbitrary faulty nodes
we allow one node to fail
for k=1 we need 4 nodes to tolerate one arbitrary faulty component We also require a minimum number of two channels:
the failure behavior of a faulty channel may be passive arbitrary
we allow one channel to fail
having two channels allows the good channel to mask the failure of the faulty channel As we will discuss in Section 4.3, the minimum configuration requirements are appropriate for steady state algorithms but cause restrictions for the startup procedure.

3.5 Steady State

The steady state is then reached, when a sufficiently high number of correct nodes and channels are synchronized and the failure of a component according the primary fault hypothesis can be tolerated, without the a re-execution of the startup algorithm.

Chapter 4
Establishment of Synchronization

The need for close synchronization of distributed computing nodes as a prerequisite for this collective of individuals to operate as a coordinated whole is widely accepted in the real-time community. We already introduced the concept of synchronization in the second chapter of this thesis. Informally spoken, synchronization means that the nodes in the distributed system agree on a current point in real time with a maximum deviation of some predefined parameter Π (precision). In order to establish and maintain a close synchronization, the following problems have to be solved:

the clock synchronization problem
the integration problem
the coldstart problem

The clock synchronization problem is concerned with adjusting the values of the local clocks of the nodes so that nodes remain synchronized despite the drift of their hardware clocks (due to their oscillators operating at slightly different rates). The clock synchronization problem is well understood and many algorithms to solve it have been developed and formally verified, including the algorithm employed in TTA [PSvH99].

The integration problem is to ensure that once a node has lost synchronization to a running system or is powered on late, this node will become synchronized within an upper bound in time.

The coldstart problem is to establish values for the local clocks as the nodes first power up so that they quickly become synchronized. The integration and coldstart problems together are referred to as the "startup problem". That is, startup algorithms establish synchronization, clock synchronization algorithms maintain synchronization.

Claesson et al. present a strategy for the solution of the startup problem that is based on unique message lengths and full-duplex communication links [CLS04]. Lönn discusses startup algorithms in [Lön99] and formally verifies with Pettersson a particular startup algorithm in [LP97]. The startup algorithms presented within this thesis, which are startup algorithms based on unique timeouts, are similar to the startup algorithm of the Token Bus protocol [IEE90] (the general startup strategy is presented in Section 4.3). Krüger introduces such an algorithm for the startup of time-triggered protocols [Krü97]. The TTP/C startup algorithm as specified in [Kop02] is based on this principle. This algorithm is analyzed in [SP02] and [Ste01] by means of simulation and tested for its robustness in presence of failures. This preliminary analysis by simulation revealed problems (e.g. masquerading) if an arbitrarily faulty node has to be tolerated. In order to overcome these limitations of the startup algorithm there are two strategies:

additional components, like central guardians, have to be intelligent enough to compensate for those failures that are not covered by the startup algorithm itself or,
the startup algorithm has to be modified to compensate problematic failure scenarios itself while allowing a relatively simple central guardian design.

In this chapter we first specify the problem of startup in more detail and define two major properties that each startup algorithm has to provide. We then discuss the general startup strategy and present an impossibility result for reliable steady state detection in our system model. We address the subproblems of integration and coldstart in isolation. Finally, we present two startup algorithms with different fault coverage.

4.1 Problem Specification

There are two key properties that a startup algorithm has to guarantee: timeliness and safety.

Property 1 Timely Startup:
Whenever at least a minimum configuration of nodes and channels is powered-on, a startup algorithm establishes synchronous communication of the correct components within an upper bound in time.

The minimum configuration is specified in Section 3.4. The "whenever" factor in the property specification is highly important, since it does not specify an upper bound in time until a minimum configuration is powered-up. Note also that this timeliness property is stronger than a "liveness" property: in contrast to liveness properties, timeliness properties require an upper bound on the duration after which a property has to be established.

Property 2 Safe Startup:
When the startup algorithm terminates, all correct nodes that communicate synchronously are synchronized to each other.

The safety property ensures that the startup algorithm will not produce multiple "cliques", that are excluding sets of nodes that communicate synchronously within the set but not with nodes in other sets (see Section 3.2). However, cliques can be formed temporally during the startup process.

Ensuring these properties is a non-trivial problem, even in the failure-free case, since:

each synchronization process requires the timely and deterministic delivery of messages, and a shared broadcast medium requires synchronization in order to timely and deterministically deliver messages.

It is not possible to address these two points in isolation. Solutions, as for example "leader-election" algorithms are not feasible, since they rely on message exchange and message exchange relies on synchronization. A startup algorithm has to address both issues at the same time.

4.2 Related Problems

There are some central problems in the fault-tolerance area. We summarize such problems and sketch the relation of these problems to the startup problem and time-triggered communication in general.

Consensus: The consensus problem is "to form an agreement among the fault-free members of the resource population on a quantum of information in order to maintain the performance and integrity of the system" [BDM93]. A compact definition of the (uniform) consensus problem is given in [ESU04] by the following four properties:

Termination: every correct process eventually decides on some value.

Uniform Integrity: every process decides at most once.

Uniform Agreement: no two processes (correct or not) decide a different value.

Uniform Validity: if a process decides v, then v was proposed by some process P.

Reliable Broadcast: A set of processes communicates by exchanging messages and each of these processes produces local output based on the messages exchanged. Informally spoken, reliable broadcast is a mechanism that guarantees that all processes generate the same unordered set of messages as their local outputs.

The broadcast problem introduces two functional primitives: broadcast ( ) and deliver ( ). Each process uses the primitive broadcast ( ) to distribute messages to all the other processes.

Each process uses the deliver ( ) function to generate output. Thus, with progress of time, the deliver ( ) primitive generates a sequence of messages. A set of processes solves the reliable broadcast problem if it provides [HT94]:

Validity: if a correct process broadcasts m, it eventually delivers m.

Agreement: if a correct process delivers m, all correct processes eventually deliver m.

Integrity: for any message m, every correct process delivers m at most once, and only if m was previously broadcasted by a correct sender.

Atomic Broadcast Atomic broadcast is defined as reliable broadcast that fulfills the following additional ordering property:

Total Order: if correct processes p and q both deliver messages m and m', then p delivers m before m' if and only if q delivers m before m'.

Informally spoken, atomic broadcast guarantees that not only the set of messages is equal within the set of correct processes, but also the delivery order of the messages.

Failure Detectors The consensus problem underlies the well-known impossibility result of Fischer, Lynch, and Paterson (FLP) [FLP85], which claims that there cannot exist a solution to the consensus problem in an asynchronous system. Here, an asynchronous system is defined as a system with:

1. unbounded communication delays,
2. unbounded processing steps, and
3. unbounded drift of local clocks.

The FLP impossibility result led to major research activities to find ways for its circumvention. For this purpose Chandra and Toueg established the concept and a classification of "failure detectors" [CT96] to detect crash failures in asynchronous systems. Failure detectors are characterized by two properties:

Completeness: the ability to detect the failure of a process.

Accuracy: the ability not to classify a correct process as faulty.

The classification of failure detectors is done with respect to the quality of these two properties. The failure detector "$\Diamond S$", for example is defined by:

Strong Completeness: eventually every process that crashes is permanently suspected by every correct process.

Eventual Weak Accuracy: there is a time after which some correct process is never suspected again.

Such failure detectors are seen as additional black boxes (sometimes called "oracles") that have the defined properties. In particular it is important to find the "weakest" failure detectors that are required for some given problem. For example, it can be shown that $\Diamond S$ is the weakest failure detector necessary for the solution of the consensus problem [CHT96].

The implementation of a failure detector may cause a change of the asynchronous system assumptions: the FLP impossibility result showed that consensus is not possible in an asynchronous system. Hence, to solve consensus we have three possibilities:

1. redefine the consensus problem,
2. change the system model (that is, the timing assumptions), or
3. a combination of the above two points.

Time-Triggered Broadcast: It is shown in [HT94] that the atomic broadcast problem and the consensus problem are equivalent, that means, a failure detector that solves one of these problems is also able to solve the other one and vice versa. A time-triggered communication strategy (we call it the time-triggered broadcast in this context), as presented in the previous chapter, inherently guarantees the atomic broadcast properties, since the order of messages is a priori defined.

The time-triggered broadcast makes the implementation of the broadcast ( ) primitive on a shared medium trivial: each node uses the shared medium in its assigned time slot. Furthermore, the implementation of a guardian instance that controls the access to the shared medium is possible. It is questionable if there are other solutions for the broadcast ( ) primitive in atomic broadcast (that means non-time-triggered solutions) that tolerate a non-fail-silent faulty process and use a shared communication medium.

4.3 General Startup Strategy

Figure 9:
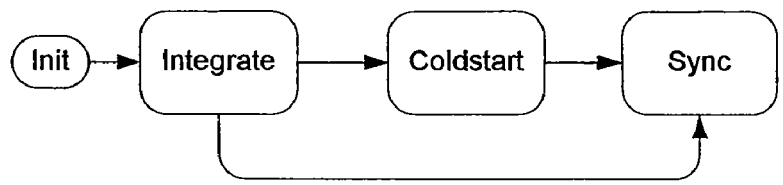
FIG. 9 is a general startup strategy.

The general strategy for starting up the system is depicted in FIG. 9. It identifies three protocol phases: integration, coldstart, and sync.

After power-on (that is after the node is initialized) the node starts the integration phase. As defined by the system model, each slot in the communication schedule is a priori assigned to a sending node and each message carries the identifier of its sender. Hence, the node listens to the communication channels and has to identify, based on the messages received, if there is a sufficient number of nodes communicating synchronously. If such a set exists, the node integrates into this set and becomes synchronized. If such a sufficient set does not exist, the node enters the coldstart phase.

In the coldstart phase a node a) waits for coldstart signals and b) sends coldstart signals by itself. The system can be configured such that only a dedicated set of nodes, the "core system" is allowed to enter coldstart phase. Nodes that are not in the core system will enter steady state only by integration. Coldstart signals are starting signals for the nodes to start synchronized communication. There are several ways to construct such a coldstart signal:

Noise: any kind of activity that can be detected by nodes. This form of coldstart signal highly depends on the physical layer used for the realization of the communication channels.

Semantic-Free Coldstart Message: a valid unique message that is sent as coldstart signal. The reception of the message alone is evaluated as coldstart signal.

Semantic-Full Coldstart Message: a valid unique message that is sent as coldstart signal. This coldstart signal carries additional information, for example where to start in the communication schedule.

If there is more than one node allowed to send coldstart signals, there is always the possibility that these nodes send their coldstart signals at approximately the same time causing a contention. According to our system model the communication channels are half-duplex, which means a node is not able to receive while it transmits and, hence, contentions cannot be detected immediately. Furthermore, propagation delays on the communication channels and deaf windows in the nodes (that are phases when a node switches from receiving to transmitting) make it impossible that a node receives the coldstart signal from another node instantaneously. If the contention is not resolved, the quality of the initial synchronization depends on these parameters (propagation delay and deaf window). A contention-resolving algorithm (see Section 4.5.1) can be used to ensure that eventually there is only one node that sends a coldstart signal that will not result in a contention.

The coldstart phase ends when a sufficient set (possibly an empty set) of nodes has been synchronized. The nodes are able to acquire this number of nodes by counting the synchronous replies to the coldstart signal.

In the synchronous phase the node cyclically executes the communication schedule.

The transitions between the different phases of the startup strategy are taken either by the expiration of timeouts or by the reception of a sufficiently long sequence of messages. In particular, a faulty node should not be able to spread such a sequence of messages (e.g. by masquerading a number of different nodes) that will cause a good node to take an incorrect transition between startup phases. That means, a startup algorithm shall be coordinated.

The minimum configuration requirements in combination with our timing assumptions bear a potential problem for every startup algorithm:

Lemma 3 Under the given timing and minimum configuration requirements (Section 3.4) it is impossible to reliably determine when the steady state is reached.

Discussion: We require four nodes for a minimum configuration. Out of these four nodes we allow one node to exhibit an arbitrarily faulty behavior. We would like to create an algorithm that is able to detect steady state operation mode in a safe (that is, correct) and timely (that is, the algorithm will terminate) manner.

Each node is able to count the number of nodes by the messages it receives due to the surjective relation of slots to nodes. To safely determine that steady state operation mode is reached, each node has to receive messages from at least three other nodes: due to the unknown time bound (Point 4 in Section 3.1), messages of two other nodes are insufficient, since one good node may not yet be powered-on and one of the powered-on nodes may be arbitrarily faulty and only "pretend" to be a good node. However, the faulty node can also fail in a mode where it never sends a message and hence, the detection algorithm will never terminate, thus violating the timeliness requirement.

From our timing assumptions follows that we cannot distinguish a fail-silent faulty node from a node that is powered on relatively late, similar to the notion of a "slow node" in the impossibility result of Fischer, Lynch, and Paterson [FLP85].

The generalization from four nodes and one faulty node to n nodes and k failures is straight forward:

the number of components to tolerate k faulty components is a function $f(k)$ of its failure behavior (in the case sketched above we want to tolerate one faulty node that may be arbitrary faulty: $f(k)=3k+1=4$), since each faulty component may be fail-silent or behave correctly, $f(k)+k$ components are required to reliably determine the point in time from which on the specified failure of a component is tolerated (in the case sketched above $f(k)+k=5$), the overall number of nodes, n, has to satisfy: $n \geq (f(k)+k)$ (which is violated in the previous special case $(4 \geq 5)=$ false)

An analogous discussion can be done regarding the minimum number of channels.

We conclude that it is impossible to construct a detection algorithm that guarantees both safety and timeliness under the given timing and minimum configuration assumptions. ∎

It follows from this lemma that there exist scenarios in which an already synchronized system will lose the established synchronization. Theses scenarios take place when a faulty node or channel behaves correctly during the startup phase while a sufficient number of good nodes/channels is not powered-on (and, hence, not able to synchronize). Before the necessary good nodes/channels integrate into the synchronous communication the faulty component causes the system to lose synchronization.

Example: The example is similar to the discussion of Lemma 3. Let us assume a faulty channel. Furthermore, let the correct second channel be powered on relatively late to all other components. Let the faulty channel behave correctly during the execution of the startup algorithm and just when a set of nodes has reached synchronous communication, the faulty channel stops to relay messages. Hence, communication is lost and nodes that already reached sync phase have to restart.

We identify the following three ways to overcome Lemma 3:

Change timing assumptions: we may add an additional requirement to our system model: the knowledge of the worst case power-on time of nodes/channels.

Change minimum configuration assumptions: we may require a higher number of nodes/channels for a minimum configuration.

Live with it.

The first startup algorithm $S1$ (see Section 4.6) uses a hybrid approach of the first and the last point by requiring that at least one correct channel has to be active when the first good node starts to send a message. The second startup algorithm adheres to the last point only, which means that a node that reached steady state may have to restart, as shown in this section.

4.4 Integration

An integration algorithm has to fulfill the following properties:

Property 3 Timely Integration:

If synchronous communication has already been established, a node will become synchronized within an upper bound in time after power-on.

Property 4 Safe Integration: A correct node integrates to correct nodes only.

During steady state of the system, that is when a synchronized set of nodes exists, each node sends a message which carries its sender's identifier in its a priori assigned sending slot. Integration is, hence, a straight forward task: when a node receives a sufficiently long sequence of messages during one TDMA round, the node knows that synchronous communication exists, and, furthermore, is able to adjust its local state to the state contained in the received messages. The necessary length of the sequence has to be longer than the sequence of messages that a faulty node can insert into the distributed algorithm execution. Insert means in this context that a message from a faulty node is relayed by the communication medium. Guardians, as we will see in the next chapter, are able to block faulty messages, which means that not each message generated by a faulty node will be inserted into the distributed algorithm execution.

As defined in our system model, only one slot per TDMA round is assigned to each node and the round layout is equal for each round. Given a guardian that guarantees that a node will only send in its sending slot in steady state, it is guaranteed that a faulty node can insert only one faulty message per TDMA round per channel. A node needs to receive a majority of detectably correct messages. The actual number changes if further filtering techniques are used in the guardian. A node needs:

1-out-of-2 corresponding messages (that is a sequence of 1 message), if the faulty message is detectably faulty (following the k+1 rule), or 2-out-of-3 corresponding messages (that is a sequence of 2 messages), if the faulty message is not detectably faulty (following the 2 k+1 rule).

Obviously there is an interdependency between the slot to node relation, the required filtering techniques in the guardian, and the required number of messages necessary for integration: if the system model is weakened with respect to the relation of slots to nodes such that a node is allowed to acquire more than one slot per round, a faulty node can simulate a number of faulty nodes which is equal to the maximum number of slots in which it is allowed to send. If we do not use further filtering techniques we have to implement a majority voting: a node has to receive (k+1)-out-of-(2 k+1) corresponding messages, where k is the maximum number of slots assigned to a node in a TDMA round. However, that does not mean that we require (k+1) distinct nodes, as also correct nodes can be assigned more than one slot per round.

4.4.1 Integration Termination

The integration phase can terminate "successfully" or "unsuccessfully": when the node has received a sufficiently long sequence of messages it is able to synchronize to a running system and the integration terminates successfully. If the node is not able to integrate for a given duration, the node terminates the integration phase unsuccessfully and transits to the coldstart phase.

4.5 Coldstart

The coldstart part of the startup algorithm has to fulfill the following properties:

Property 5 Timely Coldstart: Whenever at least a minimum configuration of nodes and channels is powered-on, a coldstart algorithm establishes synchronous communication of the correct components (nodes/channels) within an upper bound in time.

Property 6 Safe Coldstart: After the coldstart has terminated successfully all correct nodes that participated in coldstart will be synchronized to each other.

Figure 10:
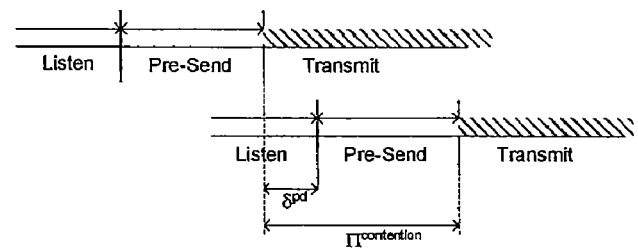
FIG. 10 is initial precision after a contention.

In a fault-tolerant system it is necessary to configure more than one node to send a coldstart signal and, hence, there exists no way to circumvent contentions. As discussed above, a contention arises when the nodes send their coldstart signal at approximately the same point in time. A contention scenario with two nodes is depicted in FIG. 10.

During the listen periods, the nodes try to receive coldstart signals. At some point in time the nodes decide that they have to initiate the coldstart themselves. During the following pre-send period the nodes are not able to receive messages from the communication channels. Finally, the nodes broadcast their messages. We see that the quality of the initial precision $\Pi^{contention}$ depends on the maximum propagation delay $\delta^{pd}$ (the propagation delay is assumed also to cover digitalization errors at the receiver) and the duration of the pre-send period $\Delta^{pre-send}$.

$$\Pi^{contention} = \delta^{pd} + \Delta^{pre-send} \quad (4.1)$$

We can distinguish two types of contentions depending on the topology of the communication medium.

A physical contention occurs, when two or more nodes send at approximately the same time and the signals of these nodes physically overlay on the medium. This type of contention may occur in a bus topology.

A logical contention is a result of the replication of the shared medium where the replicas are controlled by mutually independent instances, e.g. central guardians. Each of these instances guarantees a transmission free of physical contentions on one replica. However, since these instances are independent of each other, nodes that start to broadcast at approximately the same time may occupy only a subset of the replicas each. A receiver, therefore, will receive messages from different senders on the replicas of the communication medium. Logical contentions may occur in a star configuration of a system.

This thesis focuses on the star topology and therefore on logical contentions.

There are two ways to deal with contentions:
1. Contention Acceptance and
2. Contention Resolving As we will see in the next chapter, the design of a fault-tolerant contention resolving algorithm is costly in terms of the fault-tolerant wrapping mechanism, which means the wrapper has to have much information regarding the system configuration. Hence, combinations of contention acceptance and contention resolution are attractive: a contention of a good node with a faulty node is accepted, because a resolution may be expensive, whereas contentions of two or more good nodes are resolved.

In general, it depends on the system requirements whether the quality of the precision after a contention is acceptable, whether a contention resolving algorithm has to be implemented or not.

4.5.1 Contention Resolving Algorithms

The contention resolving algorithm has to guarantee the following property:

Property 7 If several nodes have produced a contention at their n-th access to the shared medium, there exists an x such that the (n+x)-th access of at least one node in this set will not result in a contention.

A contention resolving algorithm, thus, guarantees that there exists an upper bound in time, when the access of at least one node will not result in a contention. This property is essential for the coldstart phase since it guarantees that even if there are more nodes sending their coldstart signal at approximately the same point in time, there exists an upper bound in time when one node will send its coldstart signal without a contention.

The contention problem naturally arises in communication networks based on a shared communication medium, and hence, communication protocols have to provide solutions for this problem. We summarize the contention resolving algorithms of common communication protocols next, as they show a common pattern.

AFDX (ARINC 664): Avionics Full-Duplex Ethernet (AFDX) [AEE03] is an extension of "switched Ethernet" which, itself, is based on regular Ethernet [IEE85].

Originally designed for a shared bus topology, Ethernet specifies a network protocol that allows the transmission of messages between nodes connected to a single shared bus. Ethernet has to resolve the contention problem. The contention resolving algorithm defined by Ethernet is relatively simple: a sending node compares its outgoing signal stream to the signal stream it receives. If it finds a deviation between those two streams it will assume that a contention has occurred and sends out a "jamming" signal, which ensures that all sending nodes cancel the transmission. Afterwards, all sending nodes wait for a random timeout before they retry the transmission. Due to the probabilistic aspect of this contention resolving algorithm Ethernet cannot guarantee a timely transmission of messages, as it cannot guarantee that contentions will stop to occur.

Switched Ethernet makes this contention resolving algorithm unnecessary. First, the wiring is full-duplex, that means that a node may send and receive at the same point in time; second, the network topology changes: instead of a shared bus a star topology is used. All nodes are connected to a "switch" that forms the center of the star. This switch distributes the messages in the system. If two or more nodes start to transmit at approximately the same time, their messages will be buffered in the switch and relayed sequentially. However, when the buffers are full, messages are discarded, thus a timeliness guarantee cannot be given by switched Ethernet either.

AFDX attempts to augment the switched Ethernet standard for the usage in safety-critical real-time applications. The two main additional concepts are: a "traffic shaping policy" and the replication of the communication channel. By executing the traffic shaping policy the timeliness property for message transmission can be addressed, because it is a priori guaranteed that the buffers in the switch will be sufficiently big. However, as addressed in the AFDX specification, the combination of the traffic shaping policy with the replication of the communication channel leads to a number of new problems that must be considered.

In both switched Ethernet and AFDX the contentions are resolved by buffering in the switches.

CAN: The Control Area Network (CAN) [CAN92] is classified as a contention avoidance protocol. This is misleading. Contentions do arise in a CAN network very well but CAN uses a dedicated mechanism for their resolving: the bitwise arbitration algorithm. This mechanism allows to resolve contentions right upon their occurrence (x=0 in Property 7).

Figure 11:
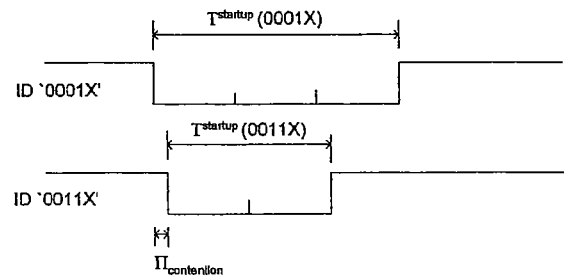
FIG. 11 is a bitwise arbitration algorithm.

CAN specifies two bus states: dominant and recessive. In FIG. 11 logical low means dominant while logical high refers to recessive. A node starts its transmission by sequentially sending its bits to the channel while concurrently monitoring the bus state. When a node finds the bus state different than its outgoing state, that is, it sends a recessive state and detects a dominant bus state, the node detects a contention with a node of higher priority. Hence, the node aborts its transmission and the contention is resolved. The first bits of a CAN message, the arbitration field, are, thus, used as a priority mechanism. As depicted in the scenario above, the arbitration field directly relates to timeouts that are used for the contention resolving mechanism. The scenario depicted is a fairly simple one, and only the first timeouts of the respective nodes are required. In the worst case, each bit of the arbitration field must be used for contention resolving and has to be considered as timeout by itself (e.g. node '01010101' and node '01010100' are in contention). The token bus protocol uses a similar contention resolving algorithm.

Token Bus: Token Bus basically consists of three different modes of operation: steady state operation, integration, and startup. In our terminology these phases correspond to steady state, integration, and coldstart phase, respectively.

During steady state the nodes form a logical ring based on their unique identifier (address). A token is used to determine the node that is allowed to broadcast on the shared medium. After completion of a transmission, the token is passed to the successor node in the logical ring. Hence, during steady state, contentions are not possible due to the strict sending order given by the unique identifiers. However, during integration and coldstart phase contentions may occur. The contention problem is essentially solved using an algorithm similar to the CAN bitwise arbitration algorithm with the following difference: instead of performing the arbitration algorithm bitwise, token bus splits its identifier into a sequence of pairs of bits. Each pair of bits represents a binary factor pair. A node starts by sending traffic of length ($pair_i$*slot_time) (for integration) and ($2$*$pair_i$*slot_time) (for coldstart), where slot_time is a configurable parameter. If the node detects traffic on the channels after its transmission has been finished it has detected a contention with a node of higher priority, if no traffic is detected, the next pair of bits $pair_2$ of the identifier is used and the procedure is repeated. The arbitration algorithm is finished when the last pair of bits of the identifier is used and it guarantees a resolution of the contention. A detailed description of the algorithms can be found in the IEEE standard for token bus [IEE90]. The decoupling of the bitlength from the arbitration algorithm has the major advantage that the tradeoff between bandwidth and spatial length of the channel (which has to be considered in CAN) becomes obsolete.

TTP/C: TTP/C specifies a contention resolving algorithm that is based on three unique timeouts per node:

Startup Timeout: $\tau_i^{startup}$ is unique to each node. It is given by the duration of all TDMA slots from the beginning of the TDMA round up to the beginning of the slot for node i (whose duration is $\tau_i^{slot}$):

$$\tau_i^{startup} = \begin{cases} 0 & i = 0 \\ \sum_{j=1}^{i} \tau_{j-1}^{slot} & i > 0 \end{cases} \quad (4.2)$$

Listen Timeout: $\tau_i^{listen}$ is given by the sum of the node's startup timeout $\tau_i^{startup}$ and two TDMA rounds (each of duration $\tau^{round}$):

$$\tau_i^{listen} = \tau_i^{startup} + 2 * \tau^{round} \quad (4.3)$$

Cold-Start Timeout: $\tau_i^{coldstart}$ is given by the sum of the node's startup timeout $\tau_i^{startup}$ and one TDMA round:

$$\tau_i^{coldstart} = \tau_i^{startup} + \tau^{round} \quad (4.4)$$

After power-on each node tries to receive messages for the duration of its unique listen timeout. If it was not able to synchronize during this period, it tries to start the system by itself by sending a coldstart message. After this transmission, the node, again, tries to synchronize for the duration of its unique coldstart timeout (the timeout starts with the transmission of the coldstart message). If the node is not able to synchronize during this period, the node keeps on coldstarting the system with the period of its unique coldstart timeout. The startup algorithm is discussed as startup algorithm S.1 in Section 4.6. Here, we are interested in the contention resolving mechanism.

If a contention occurred, it is guaranteed by the timeout durations that no further contentions occur:

1. Based on the strict order of the unique coldstart timeouts $\tau_i^{coldstart}$ no two nodes that caused a contention can collide again, as exactly one of the nodes in contention has the shortest coldstart timeout. The contention itself is, hence, used as a first synchronization event.
2. A node that does not send a coldstart message and detects a contention will reset its timer and wait its local coldstart timeout before it transmits a coldstart message itself (provided that no other node has a shorter coldstart timeout and sends a coldstart message earlier). The contention itself is, hence, used as a first synchronization event for these nodes as well.
3. Since $\tau_i^{listen} > \tau_j^{coldstart}$, for every two nodes i,j, no newly powered-on node i may cause a contention.

Figure 12:
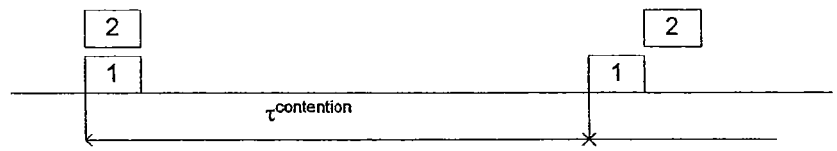
FIG. 12 is the contention cycle.

Hence, this contention resolving strategy guarantees, that:
1. there can be only one contention and
2. the contention is resolved within one "contention cycle" as depicted in FIG. 12.

The duration $\tau^{contention}$ of a contention cycle is given by the minimum time between two consecutive coldstart attempts (that is the smallest period of coldstart attempts) of a node in the system:

$$\tau^{contention} = \min_i(\tau_i^{coldstart}) \quad (4.5)$$

4.5.2 Coldstart Termination

There are two ways how the coldstart is terminated: the coldstart will terminate "successfully", if the node finds a sufficient number of nodes synchronized and transits to the steady state phase, otherwise the coldstart terminates "unsuccessfully". When the coldstart phase terminates unsuccessfully another coldstart phase may be started immediately. Alternatively, depending on the overall strategy, the node may re-start the integration phase.

Determining when a set of nodes is sufficient is done at design time and the following issues have to be addressed.
1. How many nodes are necessary to guarantee the stability of the protocol execution?
2. How many nodes are necessary to allow an unsynchronized node to integrate into a synchronized system?

Following the impossibility of the detection of a steady state (Lemma 3, Section 4.3), the termination condition cannot be bound to the number of necessary nodes/channels for stable execution of other (steady state) algorithms. However, the second point can be addressed without violating the minimum configuration requirements if the guardian instances provide sufficient filtering capabilities.

4.6 Startup Algorithm $S.1$

To tolerate the failures according to our primary fault hypothesis, the central guardian instances (see Chapter 5) are able to transform the failure of a faulty node into a detectable faulty failure. By doing so we can limit the required length of the message sequence, needed for a transition from one algorithm phase to another, to only a single correct message. Hence, the startup algorithm $S.1$ has the major benefit of simplicity:

a node that receives a cs-frame executes coldstart,
a node that receives an i-frame executes integration,
a node that does not receive a frame for a certain duration coldstarts itself.

4.6.1 Messages

Startup algorithm S.1 uses two different messages: cs-frames and i-frames.

cs-frames: cs-frames are the starting signals in the system. cs-frames carry the binary information that they are cs-frames and the slot position in the TDMA round layout of their sender (semantic-full coldstart messages). A node that receives and accepts a cs-frame (see Section 4.6.2) starts the TDMA schedule at the position carried within the cs-frame (e.g. a node that receives a cs-frame from node 3 sets its current position in the TDMA layout to 3, and, hence, the sending and the receiving node are synchronized).

i-frames: i-frames are the regular frames transmitted when a set of nodes is synchronized. i-frames differ from cs-frames only in their frame type information. i-frames and cs-frames may carry more information of different (higher-level) services, for simplicity we assume that the protocol information only consists of the current slot position.

4.6.2 Algorithm Description

Figure 13:
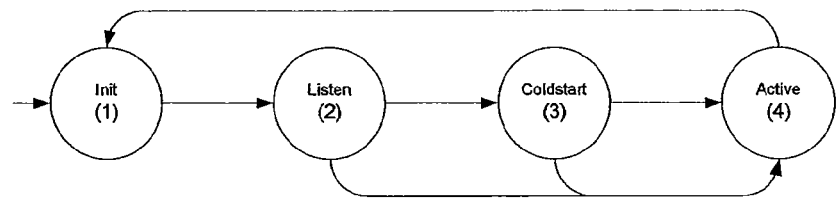
FIG. 13 is a simple startup algorith

The state-machine of the startup algorithm $S.1$ executed in the nodes is depicted in FIG. 13. It consists of four states: INIT, LISTEN, COLDSTART, and ACTIVE. Each node i has two unique timeout parameters, $\tau_i^{listen}$ (Equation 4.3) and $\tau_i^{coldstart}$ (Equation 4.4).

This startup algorithm is a rather simple one which requires sophisticated filtering techniques in the central guardian. When a node is powered-on it either has to integrate to an already synchronous set, or it must initiate a coldstart or wait for a coldstart to be executed. Due to the capabilities of the central guardian we are able to execute the integration phase and the coldstart phase "in parallel", meaning that a node is always waiting for either integration or coldstart messages and performs the respective action after reception.

4.6.2.1 Integration

Each newly started (or restarted) node i, after performing some internal initialization in the INIT state, transits to LISTEN (Transition (1)→(2)) and listens for the unique duration $\tau_i^{listen}$ to determine whether there is a synchronized set of nodes communicating on the medium. If the node receives an i-frame (which are only broadcast if there exists a synchronized set of nodes), it adjusts its state to the frame contents and is thus synchronized to the synchronized set (Transition (2)→(4)); if the node does not receive an i-frame before the timeout, it assumes that there does not exist a synchronized set of nodes and tries to coldstart itself.

4.6.2.2 Coldstart

Coldstart is done in two phases. During the first phase (while in the LISTEN state), each node concurrently listens for an i-frame (for integration) and for a cs-frame (for coldstart) from another node. When a node completes reception of a cs-frame, it enters the second phase COLDSTART (Transition (2)→(3)) and resets its local clock to $\delta^{cs}$ (that is the transmission duration of the cs-frame). Thus, all nodes that have received the cs-frame have synchronized local clocks (within system tolerances, including propagation delay as discussed in Section 4.5). Each node that receives neither an i-frame nor a cs-frame during the LISTEN phase enters COLDSTART (Transition (2)→(3)), resets its local clock to 0 and sends out a cs-frame by itself. Thus, after the transmission of the cs-frame ($\delta^{cs}$ later), the local clock of the sending node will also be synchronized to the local clocks of the set of receiving nodes.

There is, of course, the possibility that two nodes p and q send out simultaneous or overlapping cs-frames. The receiving nodes will see this as a logical contention but take the same actions as if a single cs-frame was received. Each node p in COLDSTART state waits for reception of another cs-frame or i-frame until its local clock reaches the value of its individual coldstart timeout $\tau_p^{coldstart}$. If it receives such a frame it synchronizes on its contents and enters the ACTIVE states (Transition (3)→(4)); if not, it resets its local clock and again broadcasts a cs-frame (Transition (3)→(3)). No further contention can occur at this point, as discussed in 4.5.1 (TTP/C).

4.6.2.3 Big Bang Mechanism

In principle it would be possible that a node that receives a cs-frame during LISTEN state uses this cs-frame for a transition to ACTIVE state. The algorithmic choice, not to directly synchronize the receiving nodes on the contents of the first cs-frame while in the LISTEN state, is called the big-bang mechanism. The big-bang mechanism ensures better precision, since the synchronization quality in the second phase is independent of the propagation delay: a receiving node knows the identity of the unique sender of the cs-frame and can compensate for its known propagation delay. More importantly, the big-bang mechanism is necessary to mask certain faults, as we will elaborate in the algorithm assessment chapter (Chapter 6).

Figure 14:
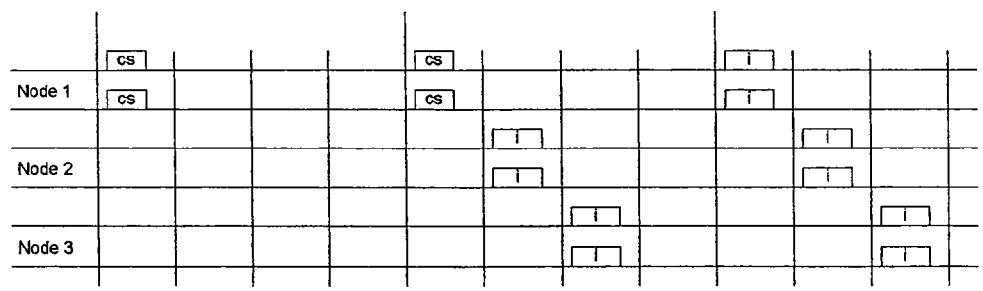
FIG. 14 is a startup scenario of the simple startup algorithm.

Example: A startup scenario is depicted in FIG. 14.

Let nodes 1, 2 and 3 be powered on and node 1 to be the first to send a cs-frame. Nodes 2 and 3 receive this cs-frame and count it as the big bang. The next cs-frame of node 1 is accepted by nodes 2 and 3 as cs-frame and the nodes synchronize on its contents. Node 2 is the first node to send an i-frame which is used by node 1 to integrate into the synchronous communication of nodes 2 and 3.

In order to execute its task, the central guardian has to have a considerable high amount of distributed protocol state (which is the sum of all local h-states in the nodes). Our next research objective was to design a startup algorithm that manages an arbitrary failure by using a central guardian with minimal distributed protocol state. The results of this research are discussed next as startup algorithm $\mathcal{S}.2$.

4.7 Startup Algorithm $\mathcal{S}.2$

Startup algorithm $\mathcal{S}.2$ is inherently more complex than $\mathcal{S}.1$, as it achieves fault tolerance by voting mechanisms: the transition from one startup phase (e.g. integration to sync) requires the reception of a sequence of messages that consists of more than one element. For this startup algorithm we use four different frame types that indicate the current protocol state of the sender. The startup algorithm state machines actually represent the message sequences that are required for a transition from one startup algorithm phase to another one. Hence, the startup algorithm description just describes the sequence "patterns" and how they are established.

The major benefit of startup algorithm $\mathcal{S}.2$ is that it does not rely on a central guardian that is as sophisticated as the central guardian required for $\mathcal{S}.1$.

We start this section by reviewing the message types used by the algorithm. We then discuss the problem of merging messages from the two independent channels to one message. Finally, we present the startup algorithm in a way similar to $\mathcal{S}.1$ by presenting the algorithm's states and defining the state transition rules.

4.7.1 Messages

Although startup algorithm $\mathcal{S}.2$ handles a wide class of failures on its own, the central guardian has still to implement a filtering functionality. Alternatively to a "semantic filtering" mechanism that semantically interprets the contents of the algorithm's messages (as proposed in the first prototype of the central guardian in Section 5.9) we assign different message types different lengths to allow the implementation of a "temporal filtering" mechanism in the central guardian. We will review different types of filtering mechanisms in the next chapter. The algorithm uses the following message types:

cs-frames: cs-frames are the starting signals in the system and have length $d^{cs}$. cs-frames only carry the binary information that they are cs-frames (semantic-less coldstart messages). This is different to startup algorithm $\mathcal{S}.1$ where cs-frames also carried a suggested protocol state information. Here, in $\mathcal{S}.2$, a successful cs-frame will signal the start of a TDMA round instead of a dedicated position in the TDMA round. That means, in contrast to S.1, the suggested protocol state in a cs-frame is don't care.

ack-frames: acknowledgment frames are used to acknowledge a received cs-frame. ack-frames have length $d^{ack}$, where $d^{cs}=d^{ack}$. ack-frames carry the current slot position in the TDMA schedule.

i-frames: i-frames are the regular frames transmitted when a set of nodes is synchronized. i-frames have a minimum length of $d^i$, where $d^{ack}<d^i$. i-frames carry the current protocol state, for simplicity we assume that this state only consists of the current slot position.

cu-frames: cu-frames (cleanup-frames) are used for the speedup of the startup algorithm (Section 4.7.4). They are broadcasted during the first round after a node has been synchronized as those frames shall not be used for nodes to integrate on. cu-frames have length $d^{cu}$, where $d^{ack}<d^{cu}<d^i$ In addition to these four frame types a node may send sync messages that can be used by a central guardian for integration and synchronization. sync messages are not directly part of the startup algorithm and we address them here just for the purpose of completeness. We will discuss the usefulness of such a dedicated "hub protocol", realized by sync messages, in the next chapter (Section 5.3).

4.7.2 Merging of Replicated Messages

Since we use a replicated shared medium consisting of two channels, a receiver has to merge the replicated messages to a single piece of information. For merging the content of messages by a receiving node we can define a set of simple rules for a receiving node:

1. if both replicated messages are received and their content is equal, use any of them
2. if both replicated messages are received and their content is not equal, use the message that is conform to your current protocol phase and your local state (provided that the node is already synchronized), if such a message exists; if such a message does not exist use none
3. if only one message is received, use this message If a node is not synchronized yet, these rules make the specification of a timeout necessary: after the reception of the first bit of a message on channel X[1] the receiver has to wait for an a priori calculable duration, the "inter-channel delay" $\phi^{inter-channel}$, for the start of the reception of the replicated message on the respective other channel Y. If $\phi^{inter-channel}$ expires the node terminates the reception on the second channel unsuccessfully. We will discuss the duration of $\phi^{inter-channel}$ next.

---
[1]Channel X is not defined a priori. A receiving node that awaits the reception of a message classifies the channel as channel X from which it receives the first bit. That means also, that for different messages channel X and Y can be different.

A receiver can calculate the start of the transmission of a message from a specific node by subtraction of the a priori known propagation delay $\delta^{pd}$ from the start instant of the message reception:

$$t_X^{send} = t_X^{receive} - \delta_X^{pd} \quad (4.6)$$

$$t_Y^{send} = t_Y^{receive} - \delta_Y^{pd} \quad (4.7)$$

A correct node sends the replicated message at the same point in time: $t_X^{send} = t_Y^{send}$. Hence, the inter-channel delay is given by:

$$\varphi^{inter-channel} = \begin{cases} 0 & \delta_X^{pd} - \delta_Y^{pd} \leq 0 \\ \delta_X^{pd} - \delta_Y^{pd} & \delta_X^{pd} - \delta_Y^{pd} > 0 \end{cases} \quad (4.8)$$

In the case of a cs-frame, where the receiver does not know the sender of the message, the receiver has to wait for the maximum inter-channel delay, $\phi_{max}^{inter-channel}$.

A faulty node is not bound to send its replicated messages at the same point in time. In particular, the faulty node can offset its messages such that a subset of receiving nodes receives both messages while a disjoint set receives only one message. However, it is not possible that a subset of nodes receives only the message on channel X while a disjoint set of nodes receives only the message on channel Y.

4.7.3 Algorithm Description

Figure 15:
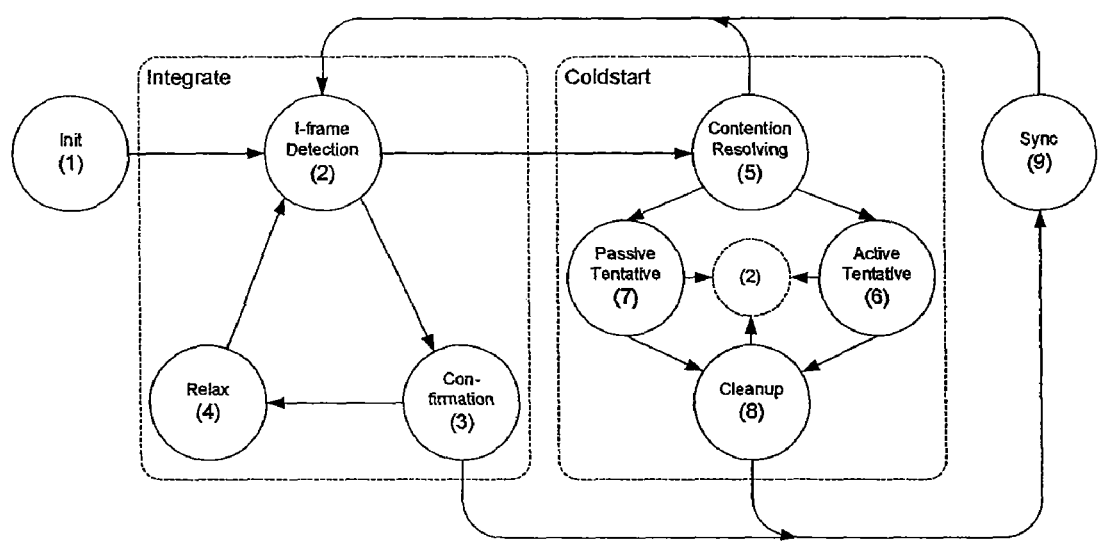
FIG. 15 is a complex startup algorithm.

The startup algorithm $\mathcal{S}.2$ is represented by the state machine in FIG. 15.

The startup algorithm consists of nine states: Init(1), i-frame Detection(2), Confirmation(3), Relax(4), Contention Resolving(5), Active Tentative(6), Passive Tentative(7), Cleanup(8), and Sync(9). (2), (3), and (4) form the integration part of the startup algorithm. (5), (6), (7), and (8) form the coldstart part of the algorithm. A transition is triggered by either a time-out or by the reception of a valid frame. The transition description table for $\mathcal{S}.2$ is given in FIG. 16. The transition description table consists of one entry for each transition. The first column identifies the transition in the form "start state→end state". The second column describes the trigger for the transition. Columns three and four describe the change of the local variables used by the startup algorithm. The variable t represents a timer; the timer is set to the respective value in the table and decremented with the progression in time. The variable IFC is a tuple consisting of two integer values, which is used to count the number of received messages per channel. The constant min (minimum_sync) is an a priori known constant that is used for a consistency check during the startup. We will further discuss the quality and quantity of this constant in the algorithm description. Columns five and six define the messages that a node will send when a transition is triggered. The fifth column specifies the dedicated sync messages that allow the central guardian to synchronize itself to the nodes. The sixth column specifies the regular protocol message that has to be sent.

Example:

|  |  |  | Local State | Send | |
|---|---|---|---|---|---|
| Transition | Trigger | t | IFC · [A, B] | Hub | TTP |
| (2)→(2) | cs received | $\tau^{round}$ | [0, 0] | — | — |

When the node is in state (2) and a cs-frame is received it re-enters (2) and sets its timer to $\tau^{round}$ and its IFC counters to 0. It does not send either a sync message or a TTP message.

|  |  |  | Local State | Send | |
|---|---|---|---|---|---|
| Transition | Trigger | t | IFC · [A, B] | Hub | TTP |
| (2)→(3) | i received [a, b] | $\tau^{round} - 1$ | [a, b] | — | — |

A node that is in state (2) and receives an i-frame transits to (3). It sets its timer to one TDMA round minus the expired time of the i-frame reception. The tuple [a, b] identifies the channels on which the i-frame was received. a and b are either 1 if an i-frame has been received on channel A or channel B, or 0 if no i-frame has been received on the respective channel. The respective IFC.A and/or IFC.B counters are set to the values of the tuple [a, b].

4.7.3.1 Init

Init(1): In (1) the node performs its internal initialization and is not able to receive messages from the channels. When a node finishes its internal initialization it transits to (2) and initiates execution of the startup algorithm.

4.7.3.2 Integration i-frame Detection(2): During (2) the node tries to receive valid messages for a duration of one TDMA round. If it receives a cs-frame it re-enters (2), which basically means, that the timer is reset. By doing so, it is guaranteed that the node will not accept a cs-frame earlier than one TDMA round after a previously sent cs-frame. If an i-frame is received, the node synchronizes on the contained state information and transits to (3) where it performs tentative integration. If nothing is received for a duration of $\tau^{round}$, the node transits to (5).

Confirmation(3): Here a node waits for a second i-frame with corresponding state information to the previous i-frame. If during one TDMA round (which is started with the reception of the first i-frame in (2)) no such i-frame is received the node transits to (4) and integration was unsuccessful. If during this duration an appropriate i-frame is received, the node transits to (9) and integration was successful. This confirmation can be generalized in that more than one i-frame has to be received for a valid state confirmation. However, to tolerate a single failure one i-frame suffices for confirmation.

Relax(4): The unsuccessful confirmation in (3) can be a result of the synchronization to a faulty message in (2): the first frame the integrating node received was sent from a faulty node and contains a faulty state. Since the node synchronizes to this faulty state, following correct messages will not confirm the integrating node. The purpose of the Relax(4) state is, to guarantee that the integrating node will not again synchronize to the message of the same, potentially faulty, sender. Hence, the node waits in relax state for a sufficiently long duration $d^{relax}$ and does not react to traffic on the channels before it transits back to (2) where it is reactive to messages again. For simplicity we assume here that $d^{relax} = \tau^{slot}$.

4.7.3.3 Coldstart

Contention Resolving(5): In the Contention Resolving(5) state a node sets its local timer to $\tau^{long-startup}$ timeunits and waits for the reception of messages:

if an i-frames is received, the node transits back to (2).

if a cs-frame is received the node sets its IFC counters, that are channel Independent Frame Counters, accordingly (that means channel independent to 1 if a cs-frame has been received on the respective channel) and enters (6). The counters have to be updated consistently when the sender of the frame was a correct node. That means, that the message reception is not finished with the reception of one frame on either channel but $\phi_{max}^{inter-channel}$ after the reception of a valid frame.

if for $\tau_i^{long\text{-}startup}$ no frame is received, the node sends a cs-frame itself and enters (7).

Upon transition to (6) or to (7) the node also sets its local timing to the start instant of the cs-frame received on the faster channel, corrected by the propagation delay, or to the start instant of the cs-frame transmission.

Our model-checking studies showed that the startup timeout $\tau^{long\text{-}startup}$ should be configured to:

$$\tau_i^{long\text{-}startup} = 3 * \tau_i^{round} + \tau_i^{startup} \quad (4.9)$$

Note here, that the coldstart period $\tau^{coldstart}$ has to take also the first additional tentative round and the round during integration phase into account. Hence the coldstart periods are given in by:

$$\tau_i^{coldstart} = 2 * \tau^{round} + \tau_i^{long\text{-}startup} \quad (4.10)$$

Furthermore, we do not have a longer listen timeout that shall prevent that recently powered-on nodes cause additional contentions with previous coldstarters. We can do so because of the following two properties:

- we use a star topology, hence, we can neglect physical contentions
- we use semantic-less coldstart messages, hence, in case of a logical contention, a receiving node will still receive two equal cs-frames The task of the contention resolving algorithm is to ensure that nodes that once were in contention will eventually not be in contention. This is necessary to guarantee that there are eventually enough nodes that acknowledge the coldstarter.

Active Tentative(6): Here the node executes one tentative TDMA round starting with the first slot in the TDMA schedule. Since one physically faulty component may present itself as two logically faulty components, by alternately sending messages on only one channel (see Section 6.6.4.1), the messages have to be counted on a per channel basis using the IFC. When a node receives an ack-frame that corresponds to its local view on the current protocol state (that means that the sender ID in the received frame is equal to the receivers current slot position in the TDMA round layout), it increments the respective IFC counter(s) by one. If the node reaches its sending slot in the schedule, the node sends an ack-frame itself on those channels on which it has received the cs-frame in state (5), and increments the respective IFC counter(s). When the tentative round is finished, the node checks whether any of its IFC counters reached the minimum_sync value. If so, the node transits to (8) to execute a second tentative round, the cleanup round. If none of the IFC counters has reached the necessary threshold, the node resets its counters and re-enters (2).

The minimum_sync value depends on the number of nodes that are allowed to execute the coldstart phase (the core system), say n:

$$\text{minimum\_sync} = \left\lceil \frac{n}{2} \right\rceil + 1 \quad (4.11)$$

The discussion of this value is done in Chapter 7, where we explicitly address a clique resolving algorithm. The Active Tentative(6) state implicitly incorporates such a functionality in order to guarantee that if there exists a node in Sync(9) state, there always exists a majority of correct nodes in Sync (9) state. Our experiments used a core system of four nodes (minimum_sync=3).

During this state the node may send a sync-frame at the beginning of each slot.

Passive Tentative(7): This state is equal to state (6) with the exception that a node will not send in its sending slot.

Cleanup(8): The cleanup state is a second tentative round in which i-frames are broadcasted. At the end of this round, each node checks if there are at least minimum_sync-1 nodes communicating synchronously, to tolerate a fail-silent faulty node that was active during the first tentative round. The cleanup state becomes more important with the usage of the startup algorithm speedup (see Section 4.7.4).

4.7.3.4 Steady State

Sync(9): This is the steady state of the system. A node cyclically executes the TDMA schedule as discussed in Section 3.2.

In rare situations, for example if a system of only two correct nodes and one faulty node are running synchronously, the nodes can loose synchronization. This is detected by continuously monitoring the number of frames received from core nodes. The node executes a watchdog algorithm: upon entering the steady state a node sets its timer to $K^{unstable}$ rounds. Whenever a node detects minimum_sync nodes in steady state, it feeds the watchdog timer. If the watchdog timer elapses, the node restarts.

Example: FIG. 17 depicts a fault-free startup scenario with three nodes. The x-axis represents the progression of time and the rectangles represent the transmitted frames (ack-frames are depicted as "a") of the respective node (only one channel is depicted). Node 1 sends a cs-frame, that brings node 2 and node 3 into active tentative state, where they broadcast ack-frames on both channels (since they have received a cs-frame on both channels). At the end of the tentative round each node checks if there exists an IFC counter that is sufficiently high. The check is successful and the nodes enter the second tentative round (cleanup) and steady state afterwards.

4.7.4 Startup Algorithm Speed-Up

Figure 18:
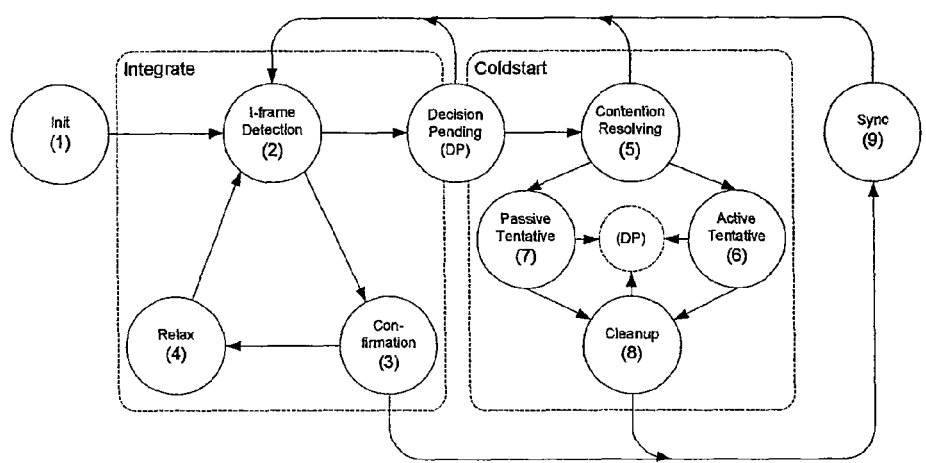
FIG. 18 is a complex startup algorithm with core and user mode.

The presented startup algorithm is costly in terms of TDMA rounds. Hence, we propose to use a dedicated TDMA round layout, a "core TDMA round layout", that consists only of a limited number of slots (possibly only four) during the startup phase. When a sufficiently high number of nodes has reached steady state, the nodes switch from the core TDMA round layout to the "user TDMA round layout". Using two different TDMA round layouts makes an add-on to the startup algorithm necessary as depicted in FIG. 18, which shows an additional state "Decision Pending(DP)".

Having two different TDMA round schemes also implies to have two different TDMA round lengths: $\tau_{user}^{round}$ and $\tau_{core}^{round}$. During integration phase $\tau_{user}^{round}$ is used, while during decision pending and coldstart phase $\tau_{core}^{round}$ is used. As a second change in the startup state machine, the node will return to decision pending state after the tentative round (either active or passive), if it does not detect enough synchronized nodes.

With the startup speedup we also aim for a solution that does not react to cs-frames during integration phase and to i-frames during coldstart phase. cu-frames are used in both protocol phases.

modified i-frame Detection(2): In state (2) we may not react directly to cs-frames. The transition from (2) to (2) will be executed if a sufficient number cu-frames is received.

Decision Pending(DP): We use the dedicated state Decision Pending (DP) for the decoupling of the different TDMA round layouts. Upon entrance in (DP), the node starts its local timer and waits for the duration of the core TDMA round $\tau_{core}^{round}$. If a sufficient number of cu-frames is received the node re-enters the integration phase in state (2). If a cs-frame is received the node re-enters (DP). If its timer times out, the node transits to (5); the IFC counters are not reset.

(modified) Contention Resolving(5) We define an extra transition, as in (DP), to (2), which is taken when a sufficient number of cu-frames has been received (that is two in our case). As the IFC counters are not reset in (DP) it is sufficient to receive two cu-frames during (DP) and (5).

The implementation of the transition from (5) to (2) upon reception of an i-frame is optional.

(modified) Active Tentative(6)/Passive Tentative(7): In the native startup algorithm S.2 the node will re-enter the integration phase after an unsuccessful coldstart phase. This is different in the algorithm speed-up, where the node enters (DP).

Assume a faulty channel that will only relay the messages to say three nodes and will not relay the messages to a fourth node. If the second good channel is not powered-on yet the faulty channel can cause the three nodes to establish synchronous communication while the fourth node stays in the coldstart phase (because it does not receive any messages). When the second good channel is powered on, the three synchronized nodes may execute the user TDMA round layout already. Hence, the synchronized nodes and the node in coldstart phase execute different TDMA round layouts. In the general case it cannot be guaranteed that the node in coldstart phase will ever react to the messages from the synchronized set of nodes, although they are reliably relayed by the good channel.

Failure scenarios like this one make it reasonable to define an extra exit condition from the coldstart phase to the integration phase: after $K^{exit\text{-}coldstart}$ unsuccessful coldstart attempts the node will exit coldstart phase and re-enter integration phase (this exit transition is not depicted in the transition relation table). We will further elaborate on the quality and usefulness of such an exit strategy in Chapter 7, where we use it also to recover from multiple transient failures.

(modified) Cleanup(8): The Cleanup(8) state becomes more important when using the algorithm speed-up. If the central guardian uses "approximate coldstart supervision" to control the access to the shared medium during startup, it is not guaranteed that each cs-frame sent by a correct node will be relayed by the guardian. That means that scenarios are possible where a set of nodes successfully executes the first tentative round, while a disjoint set of nodes, which, is also in coldstart phase, does not. Using the algorithm speed-up, the nodes send cu-frames during Cleanup(8). All nodes that did not enter Cleanup(8) will receive a sufficient number of cu-frames during (DP) and (5). Hence, the Cleanup(8) state is used to bring nodes that are "stuck" in the coldstart phase back to integration phase when a sufficient number of nodes becomes synchronized. We use here a dedicated cu-frame instead of i-frames in order to avoid that nodes integrate into the core TDMA round layout. Integration of nodes shall be possible only into the user TDMA round layout.

Figure 19:
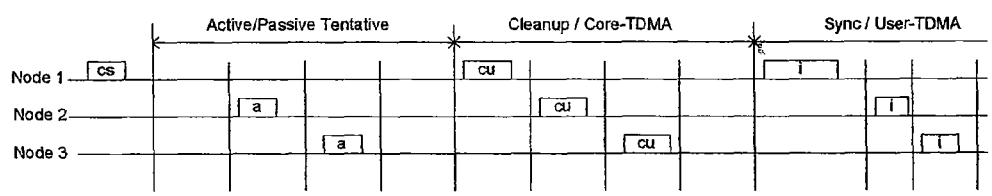
FIG. 19 is a startup scenario of the complex startup algorithm.

Example: FIG. 19 presents a startup scenario using the speedup for the complex startup algorithm. After cs-frame reception, the nodes execute a tentative round, followed by a TDMA round according to the core TDMA schema. After this cleanup round, the nodes change to the user TDMA schema and execute steady state operation. This startup scenario is essentially the same as the previously presented scenario (without startup speedup), with two differences: dedicated frames types are used during the cleanup round and we use different TDMA round layouts for startup and steady state.

Chapter 5
Centralized Fault Masking

When multiple Fault-Containment Regions (FCRs) share a common resource, as in our case a shared broadcast channel, it is necessary to protect that shared resource via additional, independent FCRs. If such a protection mechanism is not implemented, a faulty FCR bears the potential danger to monopolize the shared resource and to render it unusable for other, correct FCRs. Temple introduced the concept of "local guardians" in [Tem99]: a node will not access a shared broadcast channel directly but will communicate with a local guardian which may or may not relay the send attempt to the shared broadcast channel, depending if the local guardian classifies the sending attempt correct or faulty. To tolerate the failure of one local guardian or of one shared broadcast channel itself, the local guardian, as well as the channel, have to be duplicated. This results in a number of 2*n local guardians in a system of n nodes with two replicated channels. To justify the independence argument of FCRs it is required to implement the node and local guardians on separated silicon which makes the local guardian solution economically unattractive. Indeed, the first implementations of the local guardian concept (for TTP/C) placed the local guardians and the node on the same chip, thus weakening the requirements on a FCR. Fault-injection studies showed that this implementation of local guardians leads to error propagation scenarios [ABST03].

With the movement from a bus topology to a star topology, the promising concept of central guardians was introduced [BFJ+00]: instead of implementing the guardian FCRs local at the node's side, the guardians are placed at the hubs of the star network. The economic benefit of this solution is obvious, instead of 2*n local guardians only two central guardians are necessary in a two-channel system for any number of nodes. The first proof of concept of central guardians [BKS03] basically places a passive node, that is a node without hardware units for message generation, at the hub that executes the same protocol as the regular nodes. The hub controls the dataflow according to the passive node. From a conceptual point of view, this solution is elegant: a node and the central guardian temporally form a self-checking pair, that is, the central guardian is able to transform the arbitrary behavior of a faulty node to a detectably-faulty behavior (with respect to protocol execution). Thus, no semantically faulty messages will pass the central guardian and the fault-tree of the system can be kept at a minimum. Another central guardian strategy is a minimum strategy that aims at keeping the central guardian as small as possible. This strategy has certain benefits for reasoning about the fault behavior of the central guardian itself, since we have to argue that even a faulty central guardian will not create valid messages.

This chapter addresses the functionality of a central guardian. We will discuss four prime mechanisms: access control, filtering, synchronization (clock synchronization, integration, and coldstart), and download, and list a number of possible implementations for each of these mechanisms. This list does not claim for completeness, but rather reflects the most interesting options for implementation we found during the development of the central guardian prototypes. Finally, we discuss two particular central guardian designs, which are capable to protect the startup algorithms presented in the previous chapter.

5.1 Structure and Parameters

Figure 20:
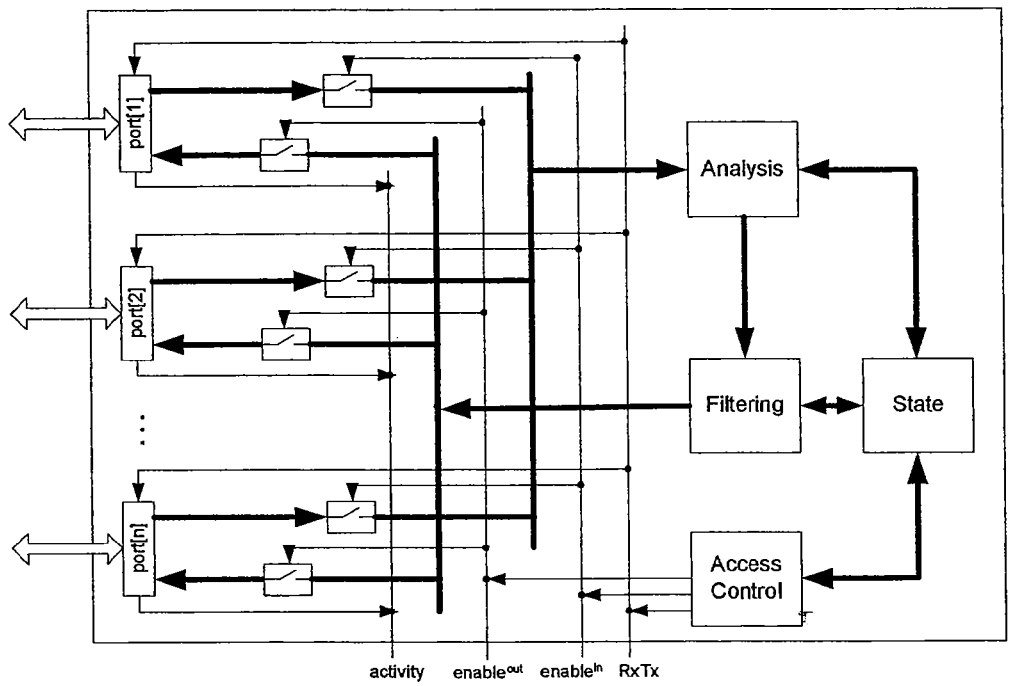
FIG. 20 is an overview of the structure of a central guardian.

FIG. 20 gives an overview on the internal structure of a central guardian; regular lines represent the control flow, bold lines the data flow. Given a system of n nodes, the central guardian has to provide n incoming and outgoing ports.

The access control mechanism (Section 5.2) specifies the ports that are allowed to access the shared medium. Incoming protocol messages can optionally be analyzed (Section 5.3) and filtered (Section 5.4) before they are relayed. In order to execute certain filtering mechanisms the central guardian has to be synchronized to the nodes (Sections 5.5, 5.6, 5.7). The information of these analyzing, filtering, and synchronization processes as well as the various configuration data (Section 5.8) form the local state (h-state and i-state) of the central guardian.

Figure 21:
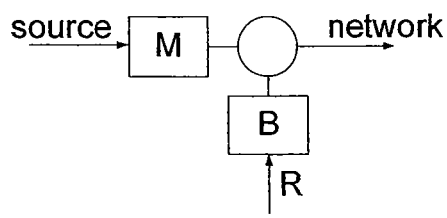
FIG. 21 is a "conventional leaky bucket", taken from [LA98]

For the conceptual description of the various algorithms in this chapter we need the following signals of the central guardian:

$active_i$, $1 \leq i \leq n$: becomes TRUE if an incoming signal is detected on a port i and is FALSE otherwise $enable_i^{in}$, $1 \leq i \leq n$: when set to TRUE, the connected node on port i is able to send to the shared medium, when set to FALSE, the respective node is blocked $enable_i^{out}$, $1 \leq i \leq n$: when set to TRUE, the connected node on port i is able to receive messages from the shared medium, when set to FALSE, messages are not relayed to node i RxTx: since we use half-duplex connections, the central guardian has to switch between reception (RxTx=TRUE) and transmission (RxTx=FALSE) of the respective port 5.2 Access Control The primary function of a central guardian is the masking of the "babbling idiot" failure of a node. A babbling idiot continually accesses the shared medium and, by doing so, makes it impossible for other nodes to use the shared medium. A mere replication of the shared medium is no solution: a babbling idiot is free to babble on all its attached channels. Hence, the only solution to this failure mode is active fault masking by a different FCR, like a central guardian. The central guardian has to ensure that each node will only gain access to the shared medium for its a priori specified bandwidth. We know algorithms for that problem from the "ATM" (Asynchronous Transfer Mode) protocol [Min89] where algorithms that achieve such a bandwidth limitation are called "leaky budget", "token budget", or "generic cell rate" algorithms. The basic principle is given in the introduction of [LA98], as depicted in FIG. 21.

There are two basic parameters:
token generation rate R
token pool size B

As a message arrives (M), the token pool is checked whether there are tokens available. If so, the message is relayed and one token is removed from the pool. If the token pool is empty, the message is discarded. New tokens are generated with the token generation rate R.

This is the general approach used in ATM on a per cell basis and usually M is used as a buffer for incoming cells if no token is currently available. In our case we use the leaky bucket approach in a specialized way: during steady state each node is allowed to send one message, of length $\tau_i^{TP}$ per TDMA round $$\left(R = \frac{\tau_i^{TP}}{\tau^{round}}\right),$$

B=1). Since B=1 there is no need for an explicit notion of a token. The token can be simulated by $enable_i^{in}$=TRUE if the token is not yet used and setting $enable_i^{in}$=FALSE if the token is not yet generated.

A central guardian has to have the following information to execute a leaky bucket algorithm:

which node is connected to which port; for further discussions we assume without loss of generality that node i is connected to port i the time budget for each node, $\tau_i^{TP} 1 \leq i \leq n$ the TDMA round length, $\tau^{round}$ the required time between two consecutive access attempts, $\tau^{silence}$, (a central guardian can enforce a minimum interval of silence on the shared medium after a transmission, by simply setting $\forall_i$: $enable_i^{in}$=FALSE for the duration of $\tau^{silence}$)

5.2.1 Simple Leaky Bucket

Figure 22:
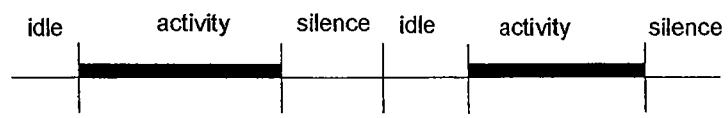
FIG. 22 is alternating activity and silence intervals.

A straight forward strategy for a leaky bucket algorithm is depicted in FIG. 22 and discussed in pseudo-code in FIG. 23. During the idle phase, the central guardian awaits a message on its ports on a first-come first-served basis. Provided that a respective port has not yet used its budget, the respective message is relayed in the activity phase. During the silence phase all traffic is blocked to enforce a minimum time of silence between two consecutive message transmissions.

The algorithm uses the timers $timer^{activity}$, $timer^{silence}$, and one timer per port $timer_{port}^{blocked}$, which are all initialized to 0. Initially, all ports are opened ($\forall_i$: $enable_i^{in}$=TRUE) and the central guardian awaits to detect traffic on any of them; the central guardian is in the idle phase. If traffic is detected (ISR[1] Activity Detected) and the active port is currently not blocked (that means it has not consumed its budget yet) all other ports are closed, idle is set to FALSE, and the active port continues transmission for its specific time budget. We use the timer $timer^{activity}$ to measure this time budget and use the node specific timer $timer_i^{blocked}$ to measure the earliest instant when the node is granted sending permission again. If there are two or more ports active at the same time, the central guardian is allowed to choose any of them. As time proceeds the timers are decreased and eventually are equal 0. When a timer is set to a value >0, we say "the timer elapsed" when it reaches 0 again. When $timer^{activity}$ elapses (ISR $timer^{activity}$ elapsed), all ports are closed for the duration of $\tau^{silence}$. When $timer^{silence}$ elapses (ISR $timer^{silence}$ elapsed), idle is set to TRUE and all ports that have not yet consumed their budget are opened. When $timer_i^{blocked}$ elapses (ISR $timer_i^{blocked}$ elapsed) and there is currently no transmission in progress (idle==TRUE), port i is opened (if some timer $timer_i^{blocked}$ elapses during an activity phase the port will be opened again with the next idle phase).

[1]Interrupt Service Routine

The simple leaky bucket algorithm is not resource efficient, since it uses a dedicated timer per port, but it has the major benefit that it does not require that the central guardians are synchronized to the nodes. This independency is also bought at high costs in fault tolerance: using the simple leaky bucket algorithm with a time-triggered communication protocol, a faulty node will be able to interfere with the transmissions of a number of correct nodes, depending on the slot sizes. In the best case, where all slots are of equal length, a faulty node is able to corrupt two correct messages (provided that each silence gap is smaller than a slot), since in time-triggered communication the send instants cannot (and shall not!) be adjusted dynamically.

Using this simple strategy to cover the babbling idiot failure mode also does not correct temporal SOS failures as discussed in Section 3.3.4. An SOS-faulty sender may start or stop its transmission such that a subset of nodes will classify the transmission as correct while another subset classifies the transmission as faulty. During steady state we require a central guardian that transforms the SOS faulty behavior of a node to a symmetric failure behavior, which means that the following two properties shall be guaranteed:

Property 8 Validity:

If any non-faulty node transmits a message, all non-faulty nodes will accept the transmission.

Property 9 Agreement:

If any non-faulty node accepts a transmission, all non-faulty nodes do so.

These properties require that the central guardians are synchronized to the nodes and that a "slot control" algorithm (Section 5.2.2) is implemented (which is a special form of a leaky bucket algorithm). Additionally to the simple leaky bucket algorithm this slot control algorithm guarantees not only that a node acquires its a priori defined bandwidth only but also controls the temporal "placement" of a node's slot in relation to the other slots. For the slot control algorithm, the central guardian needs the following additional information:

the temporal order of the time budgets of the nodes; without loss of generality we assume that the time budgets, $\tau_i^{TP} 1 \leq i \leq n$, are ordered from 1 to n the precision $\Pi$ of the system 5.2.2 Slot Control The slot control algorithm is depicted in FIG. 24 and discussed in pseudo-code in FIG. 25.

The slot control algorithm simply alternates between activity periods, that are periods in which a node is allowed to send, and silence periods, where all ports are blocked. In contrast to the simple leaky budget algorithm, the activity phases are time-triggered instead of event-triggered with the reception of traffic on an enabled port, which makes the idle phases obsolete.

This alternation of activity and silence phases has to be done coordinated in the central guardians and the nodes. Thus, initially, the central guardians have to execute a startup algorithm of their own. When the startup succeeds the central guardians are synchronized to the nodes, and know the current sender, sender, and the current timing, timer$^{activity}$, timer$^{silence}$.

At the beginning of each activity phase the sender in the next activity phase is determined. For that we assume that the budgets are adjusted according to the TDMA schedule in the linear list *sender_list and the pointer sender defines the current sender by pointing to an entry in the list *sender_list. The next sender is, thus, determined by moving sender to the next entry in *sender_list. The last element in *sender_list points to the first element, that means the next( ) operator allows *sender to cyclically proceeds through the list of entries in *sender_list.

To compensate temporal SOS failures, the durations of activity and silence phases have to be chosen properly [BKS03].

Since the central guardians and the nodes are synchronized with the precision $\Pi$ of the system and the central guardian may have the fastest or the slowest local clock in the system, for the duration $\tau_i^{activity}$ of the activity phase of node i it is required that:

$$\tau_i^{activity} = \tau_i^{TP} + 2*\Pi \quad (5.1)$$

Furthermore, the duration of the silence phase has a lower bound:

$$\tau^{silence} \geq 2*\Pi \quad (5.2)$$

Since the TDMA round length is constant, we get the following relation (given a TDMA round with n slots:

$$\sum_{j=1}^{n} \tau_j^{TP} + n*\tau^{IFG} = \sum_{j=1}^{n} \tau_j^{activity} + n*\tau^{silence} \quad (5.3)$$

This results in a lower bound on the IFG duration, $\tau^{IFG}$:

$$\tau^{IFG} \geq 4*\Pi \quad (5.4)$$

A properly configured slot control mechanism is necessary but not sufficient to ensure Properties 8 and 9. We address further required mechanisms in Section 5.4.3.

5.3 Message Analysis

In principle the central guardian can implement a mechanism to analyze the messages of the protocol that it supervises. Such a mechanism makes it possible to use essentially the same synchronization algorithms that are used in the nodes as well. However, in the fault hypothesis we assume that the failure behavior of a faulty central guardian is passive arbitrary, which means that even a faulty central guardian will not create a valid message. This assumption is of only a probabilistic nature. An analysis algorithm naturally needs information regarding the message structure and its contents. By increasing the information regarding message structure and contents in the central guardian we also increase the probability that the passive arbitrary failure assumption is violated. Still, we can increase the probability that our assumptions hold by:

the usage of CRC checksums in the messages that the central guardian is not able to construct the usage of sequence numbers (global time) that the central guardian does not know An alternative to the analysis of the protocol messages is the usage of a dedicated "hub protocol". The hub protocol uses dedicated messages, so called "sync messages". Examples of the usage of a dedicated hub protocol are given in FIG. 5.7: the hub protocol can specify different types of sync messages depending on their functionality (clock synchronization, integration, download, etc.). These messages can be scheduled at the beginning of each n-th TDMA round, at the beginning of each TDMA round, or at the beginning of each slot, as depicted in FIG. 26 respectively. Furthermore, the different types of sync messages can be sent with different periods. The major benefit of dedicated sync messages is that the message format and even coding technique can be completely different from that used for the messages of the regular protocol and that the central guardian does not need to have information regarding the message format of regular messages and their contents.

5.4 Filtering Methods

A "filtering" mechanism checks incoming messages for their conformance to a priori defined criteria and relays a message only if these criteria are fulfilled. Note that the access control mechanisms discussed in the previous section are special cases of filtering: access control guarantees that only a restricted number of messages of a component is relayed. The messages of a component that exceeds its budget are filtered by the access control mechanisms. In this section we discuss additional filtering mechanisms.

5.4.1 Semantic Filtering

If the central guardian is capable of analyzing regular messages, it can also implement semantic filtering as a natural extension: the central guardian checks the semantics of a message for a priori defined criteria and truncates the message if it finds a mismatch in the received and the expected data flow. By truncating the message, the central guardian transforms a "semantically faulty message" into a "syntactically faulty message". This syntax failure can be consistently recognized by all receiving nodes in the system.

Example: We rigorously have to use the semantic filtering mechanism if startup algorithm S.1 (Section 4.6) is implemented, where we have to filter messages with faulty sender Id or faulty message type. If, e.g., a node sends a valid message with the wrong frame type, say cs-frame instead of i-frame, the central guardian will transform the valid message into a syntactical invalid message, which will not be accepted by any correct receiving node.

Semantic filtering is a powerful mechanism, but there is the same problem as in the message analysis mechanism discussed above: to semantical filter a message, the central guardian has to have information regarding message format and contents.

5.4.2 Temporal Filtering

A way to minimize the required message information in the guardian is to only use the message length as a filtering criterion.

Example: We already introduced the concept of temporal filtering when discussing startup algorithm S.2 (Section 4.7). There, we assigned the different message types different lengths: $d^{cs}=d^{ack}<d^{cu}<d^i$. The central guardian can be configured to relay only messages with length $d^{cs}$ if it is not synchronized yet. When the nodes reach steady state, dedicated sync messages can be used to specify the message lengths the central guardian shall relay from now on, until the next sync messages are received (we will discuss such synchronization mechanisms in the next sections). Hence, it is guaranteed that no cu-frames nor i-frames will pass the central guardian and cause error propagation as long as steady state is not reached (or more precise, as long as the central guardian does not believe that steady state is reached, since a reliable detection mechanism is not possible).

The temporal filtering mechanism is attractive due to the small amount of information needed. However, it has certain limitations:

- it is possible that a faulty node sends a short message while a long message would have been correct, which will be relayed by the central guardian successfully. In principle, the central guardian would be able to increase the length of this message by sending additional bits after the node has stopped transmission. However, we avoid this solution since it may cause problems regarding the passive arbitrary failure mode of the central guardian instances.
- the central guardian cannot classify the message as valid as its contents may be corrupted.

5.4.3 Byzantine Filtering

For completeness, we review the SOS filtering algorithms introduced in [BKS03] for timing SOS control and active value SOS control and introduce a new algorithm for passive value SOS control.

5.4.3.1 Temporal SOS Control

To filter temporal SOS failures we need a well-configured slot control algorithm as discussed in Section 5.2, which guarantees that a node will only send in its assigned sending slot.

However, there is a second type of SOS faulty behavior: a faulty node may start to send late in its sending slot such that its message will be truncated by the central guardian. This truncated message may appear at node A as correct while it appears at node B as incorrect. This SOS failure is also called "cut-off" SOS failure. A simple solution to this problem is an SOS extension to the slot control algorithm that requires each node to start its transmission during a "start-window" at the beginning of the trans-mission phase. If the node does not manage to start its transmission during this duration, the sending privilege is cancelled for the complete slot. The SOS control mechanism is depicted in FIG. 27 and discussed in pseudo-code in FIG. 28.

The algorithm uses an additional counter $timer^{startwindow}$ that is set to $2*\Pi$ at the end of the silence period. When this timer elapses the central guardian checks if there was activity during this $2*\Pi$, that means the central guardian checks if the node started its transmission in time. If no traffic was detected on the sending port, this port is closed as well for the remaining activity period.

Rushby [Rus01] verified that the validity and the agreement properties are met when executing the temporal SOS control mechanisms.

Sivencrona et al. [SPT04] present a new distributed membership protocol that is tolerant to the first type of temporal SOS failures. A node classifies a received message into one of three classes: reject, flagged, or accept, instead of only two classes: incorrect or correct. We have shown by means of exhaustive fault simulation that this type of algorithm takes a complete TDMA round before the decision of the correctness of the message becomes permanent in the system. When using central guardians, this type of SOS failure is solved (more or less) as a "side-effect". Membership services, such as the TTP/C membership service [BP00], guarantee that this decision becomes permanent within the following two slots.

5.4.3.2 Value SOS Control (Reshape Unit)

In [BKS03] we proposed "active reshaping" for value SOS control that actively decodes and encodes the incoming signals. Here we discuss "passive reshaping". Instead of the active process of decoding and encoding, the reshape unit opens time-windows when an edge is allowed to occur and blocks it otherwise. We assume here that the oscillator frequency of the hub is sufficiently higher than those of the nodes. We justify this assumption by the minimum functionality that is implemented in the hub.

The passive reshape unit is schematically depicted in FIG. 29. We assume that the line encoding is based on two logically states LOW and HIGH. Initially Enable/Lock is enabled. The timer Timer enables the latch Latch with respect to the instant of the last state change at Edge_in. Thus, the timer ensures that only edges that are conform to the line-encoding rules propagate to Edge_out.

Figure 30:
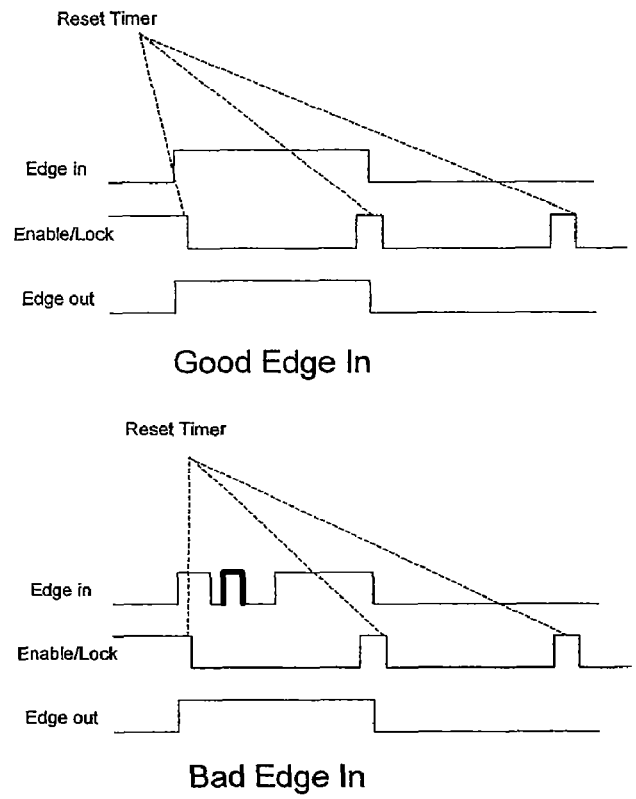

Example: Examples of a correct signal and a faulty signal are depicted in FIG. 30. The correct edges pass the reshaping process, while the faulty edges are filtered.

5.5 Clock Synchronization

Clock synchronization is the process of establishing agreement among an ensemble of local clocks that guarantees that the local clocks in the distributed system deviate only up to a given maximum $\Pi$ once such an upper bound has been established. The central guardian, as part of the distributed system has to perform clock synchronization as well as to execute certain filtering mechanisms, as discussed in the previous sections.

Typically, we can distinguish three phases in a fault-tolerant clock synchronization algorithm [Kop97, p. 61]: in the first phase, each node that participates in clock synchronization acquires information on the local views on the global time of all other nodes. In the second phase each node executes a convergence function based on the received deviation values from the different nodes. In the third phase a node adjusts its local timer that represents the local view on the global time according to the output of the convergence function.

Clock synchronization algorithms can be classified into two categories depending on the first phase of the algorithm: implicit or explicit. Implicit clock synchronization mechanisms use the regular protocol messages, explicit clock synchronization algorithms use dedicated messages. We have already introduced the concept of a hub protocol 5.3 which can be used for explicit clock synchronization.

There exists a significant number of algorithms for phase two, that is the combination and extraction phase of a clock synchronization algorithm. A simple convergence algorithm is the fault-tolerant average algorithm [KO87]. More sophisticated clock synchronization algorithms take the stability of the drift of the node's local clock into account and correct the rate of the clock in advance. Case studies show that a combination of a fault-tolerant average clock synchronization algorithm with a rate master yield an impressive quality of the precision in the system [KAH04].

The adjustment procedure (phase three) can either be implemented as "state correction" or as "rate correction". Using our clock model as defined in Chapter 2, state correaction is a change of the values of one or more of the counters that represent the clock, whereas rate correction is a change in the period of these counters. Rate correction can be done permanently, where the period is changed for the complete resynchronization interval, or temporarily, where the period is only changed for a duration shorter than the resynchronization interval.

5.5.1 Implicit Clock Synchronization

Time-triggered protocols such as TTP/C use the a priori knowledge of the message schedule for implicit clock synchronization. During steady state each node uses the deviation of the expected arrival time from the actual arrival time (corrected by the known propagation delay) as a measure for the deviation of the node's own local clock from the local clock of the message sender. Doing so for each message (or for each message out of an agreed subset of nodes) allows each node to build up a data pool from which an agreed value can be extracted (phase two) which then can be used for clock correction (phase three). The central guardian can execute the same clock synchronization algorithm as any other node.

5.5.2 Explicit Clock Synchronization

Explicit synchronization means that in addition to the regular messages, dedicated synchronization messages (sync messages) are exchanged. As we have discussed before, these messages can differ from the regular protocol messages in various ways.

While it is possible to have a dedicated communication medium solely for the exchange of sync messages, our system model does not provide such dedicated communication channels. Therefore, the explicit synchronization messages have to be taken into account during the design of the bus schedule. The frequency of the transmission of sync messages is directly proportional to the quality of the synchronization, that is the precision $\Pi$. We listed examples of reasonable periods in Section 5.3.

Explicit synchronization messages have to be sent by different sources for the algorithm to be fault-tolerant and, thus, to guarantee that the failure of a single source will not propagate to the component that has become synchronized. Solutions that are based on sequential reception of sync messages are possible but rather complicated. The central guardian is placed at the hubs of a star network and, hence, is able to receive messages of different nodes in parallel. For simplicity of the algorithm we use solutions that are based on this parallel reception of sync messages, taking the additional hardware costs into account. Hence, the internal structure of the central guardian as depicted in FIG. 20 has to provide proper hardware mechanisms to evaluate concurrent sync messages.

We review two clock synchronization algorithms for the central guardian based on explicit synchronization messages that are sent concurrently by a set of nodes next.

Figure 31:
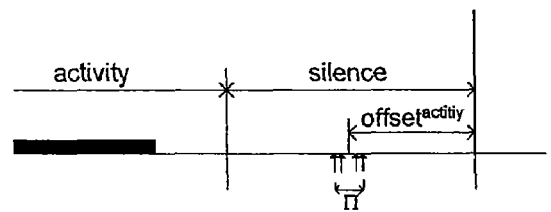
FIG. 31 is receiving instances of the explicit synchronization messages.

Data collection (phase one) of the algorithms is started with the beginning of each silence period, although it is not mandatory that every silence period is used for explicit clock synchronization. If a silence period is not used the data values are discarded. Phase two of the clock synchronization algorithm is started after a sufficient set of data values has been received but will terminate with the start of the activity interval at the latest. If a particular silence period was designed (off line) to be used for synchronization, each correct node (or an a priori specified subset of nodes) will send a sync message offset$^{activity}$ time-units before the activity period of the central guardian starts. FIG. 31 depicts the receive instants of synchronization messages as seen by a central guardian. If there is no faulty sender, all receive instants are within an interval of size $\Pi$. However, we have to tolerate a faulty sender that may send at an arbitrary point in time during the silence period.

The Explicit Parallel Fault-Tolerant (EP-FT) Algorithm: The "Explicit Parallel Fault-Tolerant" algorithm is depicted in pseudo-code in FIG. 32. The algorithm is started at the beginning of each silence period where all ports are opened for reception but closed for relay. During the silence period, the central guardian awaits activity on the ports. If a port becomes active (ISR active$_j$=TRUE), the respective port is closed and values is increased by one.

The algorithm checks if the number of collected values (values) is sufficient for the execution of phase two of the clock synchronization algorithm. Phase two of the clock synchronization algorithm solely consists of this check. If so, the timer timer$^{silence}$, which is used to trigger the beginning of the next activity phase, is set to offset$^{activity}$ [2] (phase three). Hence, the central guardian is closely synchronized to the node that sent the K$^{clock-sync}$-th sync message.

[2]This parameter can be corrected by the execution time of the algorithm, the propagation delays, and additional delays for analysis of the sync message. All these delays are known a priori.

The value of the K$^{clock-sync}$ parameter depends, besides the number of failures that have to be tolerated, also on the semantics of the sync message. If the sync message is semantic-free, that means it holds only the information that it is a sync message, then two sync messages are necessary and sufficient, since the first received sync message may be timely faulty. The second sync message can be used by the central guardian to synchronize on: the message has to be timely correct if a sufficient number of nodes operates in steady state. If the sync message is semantic-full, which means the message carries additional information, as for example the offset$^{activity}$ parameter, the algorithm requires three sync messages for a successful majority voting in the worst case.

A minor disadvantage of this algorithm is the synchronization to one particular node, if K$^{clock-sync}$=2, then the central guardian synchronizes to the second fastest node in the system. The "Explicit Parallel Fault-Tolerant Average" algorithm, discussed next, solves this problem.

The Explicit Parallel Fault-Tolerant Average (EP-FTA): The EP-FTA algorithm is depicted in pseudo-code in FIG. 33. In contrast to the previously discussed algorithm, the central guardian, does not synchronize to one particular node but uses the relative arrival times of the sync messages of a set of nodes and executes a modified fault-tolerant average calculation on this data pool. The first sync message received sets the timer timer$^{cock-sync}$=offset$^{activity}$ and adds offset$^{activity}$ as element to the data pool. All succeeding sync messages add the current value of timer$^{clock\text{-}sync}$ (which is decremented in relation to real time starting with the reception of the first sync message) to the data pool. If the $K^{clock\text{-}sync}$-th sync message is received, the algorithm calculates the correction term $d^{corr.}$ by executing a modified FTA algorithm (mFTA) on the elements in the data pool:

1. remove the k biggest elements from the pool, where k is the number of failures that have to be tolerated
2. calculate the average $d^{corr.}$ of the remaining elements Note that in contrast to the regular FTA algorithm only the k biggest elements are removed (these are the values produced by the fastest nodes). The k smallest values are "implicitly" removed by not adding them to the data pool in the first place.

The timer timer$^{silence}$ is set to the value of the correction term, and the algorithm terminates.

It is clear that the average time-difference between the nodes and the central guardian becomes smaller with the increasing number of explicit synchronization messages used for the average calculation. If it is sufficient to guarantee that the maximum time-difference between the nodes and the central guardian is at most Π. Then, the solution for clock synchronization by simply using the second explicit synchronization message (or respectively the third explicit synchronization message if the messages' contents has to be voted) is acceptable.

5.6 Integration

The central guardian, like a regular node, has to execute an integration algorithm after power-on that signals
 if steady state operation is reached, and if so
 the current slot position in the TDMA schedule, sender, and
 the current timing.

The integration strategy discussed in Section 4.4, that is integration based on a sequence of regular protocol messages and majority voting, can be used by the central guardian as well. However, due to the special placement at the hubs of the star network, the central guardians are also able to implement different integration strategies. We discuss such strategies in this section.

5.6.1 Interlink Integration

The interlink integration strategy is similar to the integration strategy of the nodes: after power-on, the central guardian tries to receive messages from the respective other channel, via the interlink, for a given duration. If it is not able to integrate, the central guardian classifies the current operation mode to be coldstart and executes its coldstart algorithm.

The simplicity of this approach is bought at the price of the obvious interdependency of the central guardians: steady state operation of a sufficient set of nodes can be reached that communicate using a faulty central guardian only, because the second good channel was not powered on yet. It cannot be guaranteed that the good central guardian will integrate successfully, as the faulty central guardian may block message transmission over the interlinks. The good central guardian will, thus, time-out after the given duration and consider coldstart reached. However, as the nodes communicate in steady state, the good central guardian may never become synchronized as it waits for coldstart messages.

We use the interlink integration strategy for startup algorithm S.1. To avoid scenarios as discussed above we have to add the following property:

Property 10 A good node will only send messages if at least one good channel is powered on.

This property ensures that the good central guardian will receive all coldstart signals, and, if a proper coldstart strategy is implemented, whenever a set of nodes reaches steady state operation, the good central guardian will be synchronized to this set of nodes.

5.6.2 Timed Pattern-Matching Integration

In contrast to majority voting and interlink-based solutions, the basic idea of timed pattern-matching integration is the interpretation of the relation of the timing of activity and silence periods on the ports of a guardian without actually decoding the bitstreams that are passed through the central guardian.

Timed pattern matching allows that the central guardian does not need any information of the content of frames but only information about the frames' lengths and relation to each others. If the central guardian finds a sufficiently high number of nodes transmitting according to the predefined pattern, the central guardian concludes that steady state operation is reached.

Since the detection of synchronous operation by the central guardian is a "weaker" mechanism than the mechanism implemented in the nodes (nodes have to check the frames' context), scenarios are possible, where a central guardian considers steady state reached while the nodes do not. To overcome this problem, the guardian has to execute additional tentative rounds where it checks for the number of participating nodes. If during these (this) additional tentative round(s) the set of nodes is sufficient for synchronous operation, the guardian considers synchronous communication reached and synchronization detected is signalled.

Since it is not necessary for the central guardian to semantically analyze the frames' contents, the assumption that a faulty guardian is not able to create valid regular messages is strengthened (as argued in 5.3).

Figure 34:
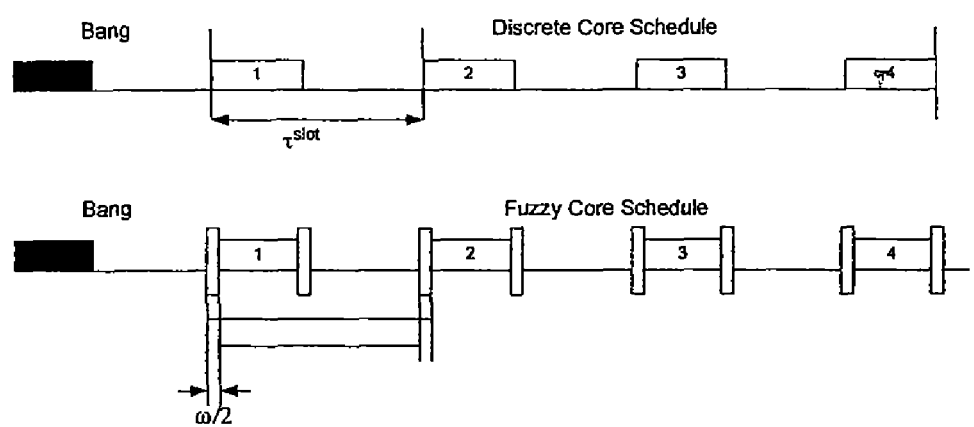
FIG. 34 is pattern matching.

FIG. 34 illustrates the idea of timed-pattern matching. The transmission pattern is defined a priori. Clock drifts, transmission latency, and jitter cause that an observer gets a "fuzzy" picture of this transmission schedule. The central guardian is such an observer.

Example: Let the system consist of four nodes $n_1 \ldots n_4$. Whenever a node is allowed to send and activity is detected on a port for the duration of $\tau^{transmission}$ the following tuple is stored in the guardian:

$$(t_i, \text{port\_ID}_i, t_i + \tau^{round})$$

$t_i$ denotes the start instant when a guardian detects activity on port port_ID$_i$ (is the ID of the port) and $t_i + \tau^{round}$ gives the time, when this entry is removed from the buffer. i is the index of the buffer. Furthermore, whenever a new entry $(t_j, \text{port\_ID}_j, t_j + \tau^{round})$ is created, that is, when a port transmitted for a valid duration of $\tau^{transmission}$, this entry is compared to all existing entries i:

$$\text{slots} = \frac{|t_i - t_j|}{\tau^{slot}} \tag{5.5}$$

$$\omega_1^{measure} = |t_i - t_j|(\text{modulo})\tau^{slot} \tag{5.6}$$

$$\omega_2^{measure} = \tau^{slot} - \omega_1^{measure} \tag{5.7}$$

A synchronized pair is detected if:

$$\vee(\text{port\_ID}_i + \text{slots})(\text{modulo})n = \text{port\_ID}_j \tag{5.8}$$

$$((\text{port\_ID}_i + \text{slots})(\text{modulo})n) + n = \text{port\_ID}_j \tag{5.9}$$

$$\vee \text{slots} = \text{port\_ID}_j \tag{5.10}$$

and $$\vee w_1^{measure} \leq w \tag{5.11}$$

$$w_2^{measure} \leq w \tag{5.12}$$

Equations 5.8 and 5.9 check if there exists another node that has sent in the TDMA round. Equation 5.10 detects if the nodes agree on the offset to the big bang.

If the number of synchronized pairs exceeds a given threshold, the guardian will signal synchronization detected.

5.6.3 Semantic-Full Explicit Parallel Integration

Analogous to explicit parallel synchronization, explicit parallel integration is based on dedicated integration messages (sync messages). The frequency of the sync messages determines the worst case integration time for an integrating central guardian. The semantic-full explicit parallel integration mechanism uses the concept of a fault-tolerant "fireworks byte" as it is used in the TTP/A protocol [EEE+01]: during the IFG periods each node transmits the sender identifiers for the next activity period(s). The central guardian waits for two sync messages with corresponding contents, accepts the list of senders in the sync message as its new schedule information *sender_list, and sets the pointer sender to its first entry. The algorithm is depicted in pseudo-code in FIG. 35.

The algorithm above uses the same set of interrupts as the clock-synchronization algorithm depicted in FIG. 32. Actually, it makes sense to combine both types of sync messages, the explicit integration message with the explicit synchronization messages into a single frame that is transmitted. However, it is not necessary that their frequencies are equal. Furthermore, the operations on the enable$^{in}$ and enable$^{out}$ signals are used in the algorithms only to avoid that a port can contribute more than one data value to the respected algorithm. If both, clock synchronization and integration use sync messages, the enable$^{in}$ and enable$^{out}$ have to be replaced by dedicated signals (bit vectors would do) for each algorithm to avoid race conditions between the algorithms.

Example: A sync message that contains the complete TDMA schedule and the other required configuration data for the central guardian may be sent only every k TDMA rounds, whereas the sync message for clock synchronization is sent each silence period.

The configuration of the frequency of the explicit integration message and the explicit synchronization message can be left to the system integrator of a particular application. However, this configuration has to be done only for the nodes and not for the central guardians. The central guardians will execute their locally stored TDMA schedule cyclically until they receive an integration message. The central guardians then store the information in the integration messages as the new schedule information, and continue to execute this schedule cyclically. Since this schedule update is done during the silence period, race conditions between the slot control algorithm and the explicit integration are avoided a priori.

5.6.4 Semantic-Less Explicit Parallel Integration

Semantic-less explicit parallel integration is a combination of the timed pattern-matching and the semantic-full explicit parallel integration strategies. Here we use dedicated sync messages that carry no explicit information. During each silence period the sender of the next activity period is acquired in the following manner:

we interpret the sum of the sync messages as an error-correcting binary code, where activity corresponds to logical 1 and silence corresponds to logical 0 we a priori assign each sending slot a code word of the binary code; this information is stored in the central guardians we define a priori in which silence periods a particular node has to send the sync messages during each silence period all nodes check, whether they are configured to send in the current silence period or not all nodes that are configured to send sync messages during a particular silence period will send a sync message Example: An example of this algorithm is depicted in FIG. 36.

The circle represents the central guardian with eight ports. Let the current silence period be the silence period before the activity phase of sender 2. In the fault-free case (left part of FIG. 36), only nodes 1, 3, 4, 8 (which equals the binary code word 10110001 that is off-line assigned to port two) will send sync messages, thus indicating that the next sender is node 2.

Figures 35, 36:
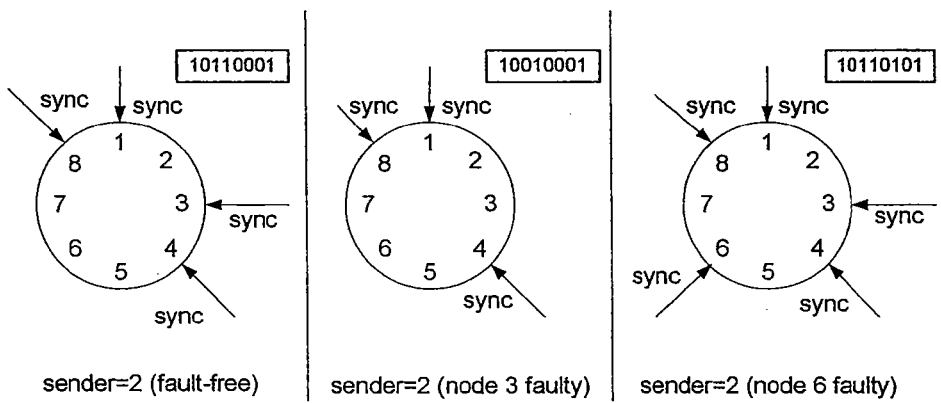
FIG. 35 is the semantic-full explicit parallel integration algorithm.
FIG. 36 is the semantic-less explicit parallel integration (example of eight nodes)

There are two possible failure cases: a node fails to send a sync message (central part of FIG. 36) or an additional (faulty) node sends a sync message (right part of FIG. 36). To tolerate these failures, the binary code has to have a sufficiently long Hamming Distance. The Hamming Distance of a binary code gives the minimum number of bits that have to be changed to transform a valid code-word to a different valid code-word. A Hamming Distance of three is sufficient to tolerate the failure of a single node, that is to correct one bit error in a code word. However, in order to use this approach, we have to violate the minimum configuration requirement of our system model, as there does not exist a binary code of length four with four code words and Hamming Distance three as it follows from the Hamming upper bound [PW81]:

$$n - k \geq \log_q \left[ 1 + \binom{n}{1}(q-1) + \binom{n}{2}(q-1)^2 + \ldots + \binom{n}{t}(q-1)^t \right] \quad (5.13)$$

Our parameter-set consists of the following values:

we have a binary code: q=2 we need to correct one failure: t=1 length of the code words: (n+k)=4 we need two data bits to encode the required four slots: n=2 the remaining bits can be used as control bits: k=2

Solving the equation with this parameter-set shows that there does not exist a (4,2)-block code that is able to correct a single failure. Further analysis shows that a minimum number of six nodes is needed for the implementation of this integration strategy.

5.6.5 Start of TDMA Schedule Signalling

As the TDMA schedule is cyclical, it is sufficient that the central guardian knows when the cycle starts. If the nodes send a sync message in each silence period that precedes a new cycle the central guardian can use this reference signal for integration. This signal can either be semantic-full, that means it carries the complete schedule information (and, hence, this approach is a special case of the semantic-full explicit parallel integration strategy) or can be semantic-less (and, hence, be a special case of the semantic-less explicit parallel integration strategy).

5.7 Coldstart

If a central guardian is not able to integrate for a given duration, it has to assume that there does not exist a sufficient set of nodes in steady state mode. As we discussed in the previous chapter, the nodes execute a coldstart algorithm to establish synchronous communication. This coldstart algorithm itself needs protection by the central guardian in order to terminate successfully in presence of an arbitrary faulty component. The required mechanisms (access control, filtering, etc.) depend on the startup strategy of the nodes.

We found two ways to realize a protection mechanism during coldstart: precise and approximate protection.

5.7.1 Precise Coldstart Protection

A precise coldstart protection algorithm fulfills the following property:

Property 11 A correct central guardian in coldstart phase will relay all coldstart signals of a good node if no contention occurs. In case of a contention, the central guardian is allowed to select any one of the sent coldstart signals to be relayed.

We found a straight forward way to ensure that property by having the central guardian executing the same startup algorithm as each node (with the exception that the central guardian will not send coldstart signals by itself). This approach requires the following mechanisms:

interlink integration: in case of a faulty node that sends messages only on one channel, semantic analysis: the central guardian has to precisely identify, whether a coldstart signal will be accepted by a node or not in order to classify further coldstart attempts (from all nodes) as correct or faulty, and semantic filtering: to avoid a faulty node from continually coldstarting the system.

This approach allows for a compact startup strategy in the nodes as well as in the guardians. However, there are drawbacks (i.e. the required information of a messages' structure) that come with the required mechanisms as discussed earlier.

5.7.2 Approximate Coldstart Protection

The approximate coldstart protection mechanism modifies Property 11 in the following way:

Property 12 A correct central guardian in coldstart phase will fulfill Property 11 within an upper bound in time.

We can achieve Property 12 by applying the simple leaky bucket algorithm introduced in Section 5.2. The budget is set to the duration of the coldstart signal $d^{cs}$. The contention resolving mechanism (see Section 4.5.1) used for the coldstart algorithm is essentially a priority-based algorithm. Hence, to avoid that a faulty node with high (or highest) priority, that is the node with the shortest coldstart period, continually destroys coldstart messages of correct nodes, the blocking phase after consumption of the budget has to be longer than the contention cycle plus one TDMA round, minus the duration of the coldstart signal:

$$\tau^{block} > (\tau^{contention} + \tau^{round} - d^{cs}) \quad (5.14)$$

Example: The application of the approximate coldstart protection mechanism is depicted in FIG. 37, which presents two scenarios.

In both scenarios nodes 1 and 2 are in contention. In the upper scenario node 2 wins the leaky bucket arbitration and is relayed by the central guardian. If this coldstart attempt was unsuccessful, node 1 is first to send a coldstart message again. Since node 1 has not yet used its budget, the central guardian grants write access and relays the message.

In the second scenario, node 1 wins the first arbitration. However, as the coldstart periods are constant, node 1 is, again, first to send the coldstart message again. This time, node 1 has already used its budget and will be blocked, although it may be a correct node.

5.8 Configuration Download

In order to execute protection mechanisms, the central guardian needs configuration data. Traditionally, the process of providing the central guardian this information is called "download" and is usually concerned with the i-state. When using sync messages, as we proposed during several sections in this chapter, the distinction between i-state and h-state becomes more fuzzy: certain parameters that are i-state in the nodes are h-state in the central guardians when the parameters are provided "just in time". Following the terminology we consider it reasonable to distinguish between off-line download and on-line download.

5.8.1 Off-Line Download

Off-line download classifies download mechanisms that are used during implementation and assembly of a particular system. Here we can distinguish between direct programming of a central guardian, for example using a dedicated download port, or remote off-line download mechanism. With the remote approach, the nodes execute a dedicated download protocol to provide the central guardian the necessary configuration parameters.

5.8.2 On-Line Download

On-line download means that the configuration parameters are broadcasted at coldstart and periodically during steady state operation. This form of parameter download requires the guardian to receive and decode dedicated download messages during steady state operation (which can be piggy-backed on regular messages). We have already introduced the concept of on-line download implicitly when discussing the explicit clock synchronization algorithms and the explicit semantic-full parallel integration algorithm.

5.9 Central Guardian $\mathcal{G}$.A

Central guardian $\mathcal{G}$.A was the first central guardian prototype study [BS01] for TTP/C, developed during the European project next TTA. This prototype had the primary objective to keep modifications of the TTP/C protocol at a minimum. Since TTP/C does not specify external synchronization messages, the central guardian used implicit algorithms. A summary of the concepts used for $\mathcal{G}$.A is depicted in FIG. 38.

The startup algorithm of the guardians is depicted in the state-machine in FIG. 39. It consists of seven states: INIT, LISTEN, STARTUP, Silence ROUND, Tentative ROUND, Protected STARTUP, and ACTIVE.

Central guardian $\mathcal{G}$.A starts in INIT state where all communication on its channel is blocked. When its initialization is finished it transits to LISTEN state ((1)→(2)) and listens to the interlink for $2*\tau^{round}$ that is, it tries to integrate to an already running system (interlink integration). If an i-frame is received, the central guardian transits to ACTIVE state ((2)→(7)) and steady state is reached; if a cs-frame is received, it transits to Tentative ROUND state ((1)→(5)) and tries to receive a confirmation of the state carried in the received cs-frame. If an integration was not possible during LISTEN, the central guardian transits to STARTUP state ((2)→(3)). All ports are now opened and the central guardian waits until it receives a valid frame either on one of its ports or on the interlink. If more than one port become active at the same time, the central guardian selects one port non-deterministically. If a cs-frame is received and no logical contention occurred (that is the guardian received either two identical cs-frames—one on one of its ports and the second on the interlink—or only one frame), the central guardian transits to Tentative ROUND state ((3)→(5)). If a contention occurred the central guardian transits to Silence ROUND state ((3)→(4)). In Tentative ROUND state the central guardian operates the remaining TDMA round (the received frame during STARTUP state is considered the first frame of a TDMA round); if during the tentative round a valid i-frame with correct state is received, the startup initiated by the cs-frame sender is confirmed and the central guardian proceeds to ACTIVE state ((5)→(7)). If during the tentative TDMA round no valid i-frame is received the central guardian transits to Protected STARTUP ((5)→(6)). If a central guardian transits to Silence Round state (because a contention was detected) it blocks all communication for the remaining round and transits to Protected STARTUP as well ((4)→(6)) when the round times out. Protected STARTUP state differs from STARTUP state in that here the ports are enabled for one TDMA round according to the coldstart timeouts of the nodes. Thus, in contrast to STARTUP state every node is forced to stay to its timeout pattern (precise coldstart protection). The transitions from Protected STARTUP state to Tentative ROUND state ((6)→(5)) and Silence ROUND state ((6)→(4)) underly the same rules as in STARTUP state. If no transition takes place for a period of one TDMA round the central guardian transits back to STARTUP state ((6)→(3)) and the startup sequence is repeated. Since the central guardian has full knowledge of the attached nodes' parameters (which are specified off-line), it can detect faulty transmissions with respect to protocol operation. If a central guardian detects a faulty node it will block all further attempts of this node to access the communication channel during the startup sequence. Thus, a faulty node cannot affect the startup sequence forever.

The analysis of the central guardian $\mathcal{G}$.A in combination with startup algorithm $\mathcal{S}$.1 is done by means of model checking in Section 6.5.

In additional to this mechanism the central guardian can implement a watchdog routine that restarts the central guardian in INIT state if it was not possible to reach steady state within a given upper bound in time. Such a mechanism can help to tolerate multiple transient failure scenarios (secondary fault hypothesis). We discuss such a recovery mechanism in Chapter 7.

5.10 Central Guardian $\mathcal{G}$.B

Central guardian $\mathcal{G}$.B is an alternative central guardian design that does not use:
  interlink connections,
  semantic analysis of regular protocol messages, and
  semantic filtering Hence, the reasoning about the passive arbitrary failure behavior of the central guardian becomes strengthened. The alternative algorithms used in central guardian $\mathcal{G}$B are listed in FIG. 40.

The startup algorithm is depicted in FIG. 41. It consists of the following states: INIT, LISTEN, STARTUP, TEST, BLOCKED, and SYNC.

Central guardian $\mathcal{G}$.B starts in INIT state where all ports are blocked and it performs internal initialization (if required). After initialization it transits to LISTEN state ((1)→(2)) and then startup algorithm is started. During LISTEN state the central guardian tries to integrate to steady state by receiving a sufficient set of sync messages (explicit semantic-full parallel integration). There are two types of triggers for the transition of LISTEN to STARTUP state ((2)→(3)):

1. time-trigger: the central guardian waits for an a priori defined timeout. If it is not able to integrate during this timeout, it transits to STARTUP. The length of this timeout is given by the maximum period between two "sets" of sync messages, that is, the maximum slot length $\max_i (\tau_i^{slot})$.
2. event-trigger: the central guardian waits until it detects activity on at least three distinct ports. If it is not able to integrate based on these activity patterns, it transits to STARTUP as the central guardian interprets this activity as coldstart attempts. This counting of active ports requires at least four nodes to be configured as coldstart signal senders.

In STARTUP $\mathcal{G}$.B starts the simple leaky bucket algorithm discussed in Section 5.2. If a potential coldstart message has been received on any one of the ports, the central guardian transits to TEST state ((3)→(4)) and checks during the silence phase of the leaky bucket algorithm if a sufficient set of sync messages is received. The sync messages encode the current state of the nodes. Hence, the central guardian can check whether the system currently executes the coldstart or the integration phase. If the central guardian receives sync messages that indicate steady state, it transits to SYNC state ((4)→(6)). If the central guardian receives sync messages that indicate coldstart phase, the central guardian interprets the previous regular message (that was the trigger for the transition from STARTUP to TEST state) as coldstart signal and tries to receive messages on the consecutive ports (that is, according to the a priori specified TDMA round schedule) for one round. If the central guardian continues to receive sync messages in the silence phases preceding the activity phases for this round it transits to SYNC state ((4)→(6)). In SYNC state the central guardian tries to receive a sufficient set of sync messages during the silence phases as in TEST state but grants write permissions according to these sync messages' contents only (during TEST state the central guardians local state has to be taken into account). If somewhen during TEST or SYNC state the central guardian fails to receive a sufficient set of sync messages it transits to BLOCKED state ((6)→(5), (4)→(5)), where communication is blocked for one TDMA round. After this TDMA round expires the central guardian transits back to LISTEN state. The simple leaky bucket algorithm always runs concurrently to the transitions in the state machine, but budgets are used only in LISTEN state ((5)→(2)). Hence, if the startup phase was unsuccessful, e.g., because there was an insufficient set of correct nodes available and a faulty node crashed somewhere during the startup algorithm, the simple leaky bucket algorithm guarantees that the next coldstart attempt of the node that previously sent the potential coldstart signal will not be relayed (approximate coldstart protection).

The dedicated TEST state is necessary to solve the so called "2:2 problem" (see Section 6.6.4.2) where a faulty node and a correct node send corresponding sync messages while two other correct messages send a different pair of corresponding sync messages. Hence, the central guardian is not able to decide which pair of sync messages is correct, and has to have an opinion on the next sender on its own.

The analysis of the central guardian $\mathcal{G}$.B in combination with startup algorithm $\mathcal{S}$.2 is done by means of model checking in Section 6.6.

The central guardian $\mathcal{G}$.B can implement a watchdog timer as well, in order to gain a clean state after a transient upset. However, since $\mathcal{G}$.B refreshes the protocol state frequently during regular operation, this mechanism is of minor importance. The timeout mechanism as recovery mechanism is discussed in Chapter 7.

Chapter 6
Algorithm Assessment

The startup algorithms and the protection algorithms in the central guardians described in the previous chapters are fairly subtle and must cope with many kinds of fault and timing behaviors. Model checking provides a way to explore these behaviors in an automatic way [YTK01], [BFG02], but faces certain difficulties. First, the algorithm involves time in an essential way and the most realistic formal model for the algorithm will be one in which time is treated as a continuous variable. Timed automata [AD94] provide a suitable formalism of this kind, and are mechanized in model checkers such as Kronos [BDM+98] and UPPAAL [LPY97]. Lönn [LP97] considers startup algorithms for TDMA systems similar to TTA and verifies one of them using UPPAAL. However, model checking for timed automata is computationally complex, so that when we add the case/state explosion caused by considering a large number of fault scenarios, the model rapidly becomes computationally infeasible. Our initial experiments did use timed automata and we were unable to consider more than a very few simple kinds of faults.

It is essential to the utility of model checking for exploration and verification of fault-tolerant algorithms that we are able to consider a large number of different kinds of faults—ideally, we would like the fault model to be exhaustive, meaning that we describe every kind of fault we can think of, and let the model checker inject these in all possible variations. Since this is impracticable in a model that uses continuous time, we looked for an abstraction employing discrete time.

Nodes executing the startup algorithm measure time by counting off slots in the TDMA schedule. Although slots have duration and may be offset at different nodes, we can think of them as indivisible units: we do not care by how much the slots at different nodes are offset, just whether they overlap at all (so that a contention can occur). Thus, we can use a discrete notion of time and can model the collective behavior of a cluster of nodes as the synchronous composition of discrete systems. Another way to justify this modeling approach is to think of it as describing the system from the point of view of a central guardian: each discrete instant corresponds to some real time interval at the guardian and all messages that (start to) arrive in that interval are regarded as simultaneous; the behavior of the nodes is driven of (i.e., synchronously composed with) the discretization provided by the central guardian.

We explored this approach in an analysis of the original startup algorithm from [SP02] and found it to work very well. We used the SAL (Symbolic Analysis Laboratory) language and tools from SRI (see sal.csl.sri.com); SAL complements the widely-used PVS verification system by providing more automated forms of analysis for systems that can be specified as transition relations (see [For03] for a description of SAL and a discussion of its relation to other SRI tools). Unlike most other model-checking languages, SAL supports a relatively abstract specification language that includes many of the high-level types and constructs found in PVS, and this allowed the algorithm and its properties to be specified in a convenient and succinct manner.

However, this experiment, which used the explicit-state model checker of SAL, exposed a second difficulty: comprehensive—let alone exhaustive—fault modeling provokes a state explosion problem even in a discrete-time model. Although only a single channel and just a few kinds of faults were considered, model checking required 30 seconds for a 4-node cluster, and over 13 minutes for a five-node cluster. A more efficient explicit-state model checker such as SPIN [Hol97] could possibly have improved these figures, but even the largest of the models considered in these preliminary experiments has only 41,322 reachable states, whereas exhaustive fault modeling for the new algorithm with two channels could generate many billions of reachable states, which far exceeds the reach of any explicit-state model checker.

In the months since those initial experiments were performed, the SAL 2.0 toolset has become available, and this provides several state of the art model checkers, including symbolic (using BDDs), bounded (using a SAT solver), and infinite-bounded (using decision procedures). The SAL symbolic model checker is able to verify the 4- and 5-node examples mentioned above in 0.38 and 0.62 seconds, respectively, on the same machine used for the explicit-state experiments. These two or three orders of magnitude improvement in performance encouraged us to try using model checking during development of the new startup algorithm.

This chapter summarizes the results of our model-checking studies of the startup algorithms in combination with the central guardian protection mechanisms. We start by reviewing common paradigms of our models, as there are: model structure, failure model, diagnosis, and the usage of counter-examples. We then discuss startup algorithm $\mathcal{S}.1$ protected by central guardian $\mathcal{G}$A and startup algorithm $\mathcal{S}.2$ protected by central guardian $\mathcal{G}$.B in detail. For both pairs of algorithms we review representative parts of the source code, as they differ slightly in their modeling approach. We define the correctness lemmas that we are interested to verify, and give the results of the model-checking runs.

Due to space limitations (the source code of the models consists of over thousand lines of code) we only list parts of the models and refer the interested reader to [SRSP03] where the complete source code of the SAL models can be found, together with instructions that will help to recreate the experiments.

6.1 Model Structure

SAL provides a specification language that allows structured specification of the algorithm in modules. We structured our models into the following modules:

node module: executes the startup algorithm ($\mathcal{S}.1$ or $\mathcal{S}.2$)

hub module: executes the relay functionality together with the central guardian protection mechanisms ($\mathcal{G}$.A or $\mathcal{G}$.B)

switch module: this module is used to assign the output variables of the node modules to the input variables of the hub modules and vice versa. This module, essentially, simulates the hard-wiring of the components in the actual system.

interlink module: this module simulates the interlink connections that connect the central guardians. Naturally, this module is only used if interlink connections are used.

diagnosis module: we implement a dedicated module that is used to collect "meta-data" of the execution in the system (see Section 6.3). This module is only a data recorder and does not contribute to the algorithm's execution.

The system model comprises n node modules, each synchronously composed with two central hub modules. At each time step, each node examines the input messages received from the hubs, checks its private state variables, and possibly generates an output message that it sends to the hubs. Each hub examines the messages received from the nodes and the other hub and constructs the single message that will comprise the consistent input presented to the nodes at the next time step.

6.2 Failure Model

In order to perform our fault simulation experiments we need a "fault injector". This fault injector can be realized in several ways, and, indeed, we identified that the placement of the fault injector in the model is a crucial factor for the verification time. Essentially, there are four possibilities for its implementation: at a node module, at a hub module, at the connector modules (that are the switch and the interlink modules), or at a dedicated fault injector module. It is also possible to place the fault injector at different modules to find an optimal solution regarding verification time and space.

1. node module: placing the fault injector at the node module is the most accurate representation of a faulty node. In the final exhaustive fault simulation runs the faulty node module is free to generate faulty messages in every time-step (that is in every slot).

2. hub module: placing the fault injector at the hub module is the most accurate representation of a faulty channel. As we will show in the assessment of $\mathcal{G}$.B($\mathcal{S}.2$), the hub module can also be used for simulating a faulty node, which has a major benefit: as the hub module has the information when messages from a node have to be relayed to the receiving nodes, it can restrict the generation of faulty messages only to these intervals instead of generating faulty messages in each time step. However, using this method places the fault injector and the filtering mechanisms in the same module and the model has to be designed carefully to cover all possible failure behaviors of a faulty node. We discuss this approach also in Section 6.6.2 at the actual SAL model.

3. connector modules: as we use dedicated connector modules as "glue modules" between node and hub modules, we can implement the fault injector routine at this module. Our experiments showed that the simulation of faulty sync messages at this module gives acceptable verification times and verification space bounds.

4. fault injector module: having a dedicated module, solely for fault injection purposes, shows to have the worst performance. All our experiments have been unsuccessful using this approach. We credit this behavior to the increasing number of modules and tried therefore to keep them at a minimum.

Although our strategy for fault simulation showed an impressive performance (as the results in the following sections show), fully exhaustive fault models still posed a challenging prospect, so we developed a modeling "dial" that could inject varying degrees of faults: our idea was to use as high a degree (i.e., as many kinds) of faults as proved feasible in practice.

6.3 Diagnosis

We call the upper bound in time, which starts when a sufficient set of components is powered-on and which ends when steady state is reached, the worst-case startup time, $\tau^{wcsup}$. As this is meta-data, that is information that does not evolve in a particular module in the system but as information of the collective, we use a dedicated diagnosis module, diagnosis, to measure this worst-case startup time. In the following an example of a diagnosis module is depicted. This module changes with respect to the actual algorithm under analysis.

```
[TRUE --> startup_time' = IF (EXISTS (i,j:index): i/=j AND
    (lstates[i]=listen OR lstates[i]=start)
    AND
    (lstates[j]=listen OR lstates[j]=start))
    AND
    NOT(EXISTS (i:index): lstates[i]=active)
    THEN startup_time+1 ELSE startup_time ENDIF;]
```

The module contains one guarded command. An integer variable, startup_time (initialized to 0) that is used to count the startup time is incremented by 1 if there exist two correct nodes that are either in listen or start state, and there does not exist a node in the active state. We define the maximum startup_time as the worst case startup time of the system. The module changes with respect to the required number of nodes and channels that are necessary for a successful startup.

6.4 Counterexamples

The primary function of a model checker is the analysis of a specified model with respect to a given property. As a result of the model-checking procedure, the model checker returns either "verified" or "falsified", depending whether a given property is fulfilled by the model or not. In addition to this boolean output of the model-checking process, model checkers are usually able to construct "counterexamples", if the property is falsified. Let us assume that the model is given in form of a state machine, then such a counterexample is represented by a sequence of states, starting at an initial state and ending at a state where the given property is violated. In particular we found the following benefits of counterexamples during our studies:

debugging information during the design of the fault-tolerant algorithm assessment of the necessity and sufficiency of used startup algorithm and protection mechanisms calculation of worst-case startup times, by creating worst-case startup scenarios 6.5 Assessment of $\mathcal{G}.A(\mathcal{G}1)$ In this section we discuss $\mathcal{G}.A(\mathcal{S}.1)$, which means startup algorithm $\mathcal{S}.1$ protected by central guardian $\mathcal{G}.A$. We first present the significant parts of the actual SAL model, in particular: basic constructs and failure modelling. We then give the correctness lemmas and describe them in SAL notation. Finally, the results of the model-checking experiments are presented and discussed. Here we also discuss the necessity of the big bang mechanism and discuss the worst-case startup time scenarios.

6.5.1 Basic Model

We specify this discrete, synchronous model in the language of SAL as follows. We begin by defining the types over which the state variables will range.

```
startup: CONTEXT =
BEGIN
n: NATURAL = 4;
index: TYPE = [0..n-1];
maxchannels: NATURAL = 2;
channels: TYPE = [0..maxchannels-1];
maxcount: NATURAL = 20*n;
counts: TYPE = [0..maxcount];
```

Here, n is the number of nodes (here assigned the value 4, but we also examine models with 3, 5, and 6 nodes), which are identified by elements of type index. Analogously, maxchannels is the number of channels, which are identified by elements of type channels. The largest timeout considered is maxcount and the values of a timeout counter are given by the type counts.

```
states: TYPE = {init, listen, start, active, faulty, faulty_lock0,
    faulty_lock1, faulty_lock01};
hub_states: TYPE = {hub_init, hub_listen, hub_startup, hub_tentative,
    hub_silence, hub_protected, hub_active};
msgs: TYPE = {quiet,noise,cs_frame,i_frame};
```

The enumerated types states, hub_states, and msgs specify, respectively, the states of the algorithm at a node, the states of the algorithm at a hub, and the kind of messages that can be exchanged via a hub. The states correspond to those in the state-machines of Section 4.6 and Section 5.9, plus additional faulty states that are used in the simulation of faulty components. Each node may output messages with values quiet (meaning no message), noise (meaning a syntactically invalid signal), cs_frame (a cs-frame), or i_frame (an i-frame); the hub will return a message type based on the inputs of the attached nodes.

```
LT_TO:ARRAY index OF NATURAL = [[j:index] 2*n+j];
CS_TO:ARRAY index OF NATURAL = [[j:index] n+j];
```

The unique timeouts for each node are specified as LT_TO (listen timeout) and CS_TO (coldstart timeout), as defined in Section 4.5.1.

It is useful to have a function incslot that calculates the index of the next slot in the TDMA round.

```
incslot(r: index): index = IF r=n−1 THEN 0 ELSE r+1 ENDIF;
```

We specify the input and output variables of an individual node as follows.

```
node[id:index]: MODULE = BEGIN INPUT
    msg_in: ARRAY channels OF msgs,
    time_in: ARRAY channels OF index,
    lock_in: ARRAY channels OF BOOLEAN
OUTPUT
    msg_out: ARRAY channels OF msgs,
    time_out: ARRAY channels OF index,
    state: states,
    counter: counts,
    errorflag: BOOLEAN
```

The msg_in represents the kind of message that the node receives from the hubs; if it is a normal message, then time_in indicates the slot position transmitted in the sender's frame, which equals the current time measured relative to the start of the TDMA round if the sender sends a correct value. We can think of this information as being included in the message, but it is easier to model it as a separate variable. The input variable lock_in is used to make the model more compact and is discussed in Section 6.5.2.

The output variables msg_out, time_out, state, and counter represent, respectively, the message that this node will output to the hub, its estimate of the identity of the node associated with the current slot (i.e., its estimate of time relative to the start of the TDMA round), its state within the algorithm, and the value of its timeout counter. The output variable errorflag is used for diagnosis of the model and has no influence on the protocol execution.

```
LOCAL
    startupdelay: counts,
    big_bang: BOOLEAN
```

Each node has a local variable startupdelay that indicates the maximum duration a node is allowed to stay in init state (simulating the different power-on times of the different nodes). The local variable big_bang is set to TRUE if no big-bang has been received yet, and to FALSE otherwise.

The algorithm is specified by a series of guarded commands. We describe in detail those that apply to a node in the init state, and one transition of a node in listen state, as representative illustrations.

```
[ % Transition: 1.1
    state = init
--> state' = IF NOT faulty_node[id] THEN listen ELSE faulty ENDIF;
    counter' = 1;
    msg_out' = msg_out;
    time_out' = time_out;
```

```
[ ] % Let time advance
    state = init AND counter < startupdelay
--> state' = state;
    counter' = counter+1;
    msg_out' = msg_out;
    time_out' = time_out;
```

Here, the [ character introduces a set of guarded commands, which are separated by the [ ] symbol; the % character introduces a comment. A SAL guarded command is eligible for execution in the current state if its guard (i.e., the part before the - - >arrow) is true. The SAL model checker nondeterministically selects one of the enabled commands for execution at each step; if no commands are eligible, the system is deadlocked. Primed state variables refer to their values in the new state that results from execution of the command, and unprimed to their old (pre-execution) values.

Provided that the counter is less than startupdelay, both commands above are eligible for execution; thus, the node can nondeterministically choose to stay in the init state (incrementing its counter by 1) or to transit to the listen state. If the counter reaches startupdelay, the node must transit either to listen or to faulty state, depending on whether the node simulates a correct node or a faulty one. Hence, the two guarded commands above allow the node to "wake up" and transit to the listen state at any point during the specified period of startupdelay; on entering the listen (or faulty) state, its counter is reset to 1.

We next describe a class of transitions for a node from listen to (cold) start state.

```
[ ] % Transition 2.1
([ ] (k: channels):
    state=listen AND big_bang AND msg_in[k]=cs_frame
        AND (NOT (EXISTS (j:channels): j/=k
                    AND (msg_in[j]=cs_frame OR msg_in[j]=i_frame)
                    AND (time_in[k]/=time_in[j] OR
                    msg_in[k]/=msg_in[j])))
--> state'      = start; counter' = 2;
    msg_out'    = [[j:channels] quiet];
    time_out'   = [[j:channels] 0];
    big_bang'   = FALSE;)
```

This guarded command is a short hand for a set of transitions. It represents one transition for each k, with k=0, 1. The precondition is satisfied, if the node is in listen state, a big_bang has not been received yet by this node, the incoming message on channel k is a cs-frame, and there does not exist a channel different from k (in a dual-channel system, there is only one other channel) where a cs-frame or i-frame is received that has another time_in value than that on channel k. The output and local variables will be set to the appropriate values. The subtly differentiated cases in the precondition were helpful in testing different algorithm designs.

The input/output behavior of a hub is specified as follows.

```
hub [c:channels]:MODULE = BEGIN
INPUT
    msg_in: ARRAY index OF msgs,
    time_in: ARRAY index OF index,
    interlink_msg_in: msgs,
    interlink_time_in: index
```

A hub receives msg_in and time_in as input values from each node, and interlink_msg_in and interlink_time_in from the other channel (a hub also listens to the other channel during startup).

```
OUTPUT
    msg_out: ARRAY index OF msgs,
    time_out: ARRAY index OF index,
    interlink_msg_out: msgs,
    interlink_time_out: index,
    state: hub_states,
    collisions: [0..10],
    lock: ARRAY index OF BOOLEAN
```

A hub has the following outputs: msg_out, the kind of message the hub sends to the nodes; time_out, this variable represents the slot position when a frame is relayed to the other hub; interlink_msg_out and interlink_time_out are the kind of message and slot position a hub sends to the other channel (in a correct hub, these values will be equal to msg_out and time_out). The internal state of a hub is represented by state. We use the variable collisions to count the number of collisions during startup (this variable has no influence on the protocol execution but is used for analysis). lock is an array of boolean variables corresponding to "ports" (the connections from a hub to its nodes). Initially these are set to FALSE; if a hub discovers, by its sending behavior, that a node is faulty, it will set the corresponding boolean to TRUE and will disallow further transmissions from this node.

```
LOCAL
    round_counter1: [0..n+1],
    round_counter2: [0..n+1],
    round_counter_delay: [0..10*n],
    slot_position: index,
    hub_error: BOOLEAN,
    partitioning: ARRAY index OF BOOLEAN,
    send_noise: ARRAY index OF BOOLEAN
```

A hub uses two round_counter variables to count the slots per round, while round_counter_delay is used to count the initial delay in hub_init state (analogous to startupdelay). During the tentative and the synchronized states, slot_position is used to keep track of the current slot position. The variable hub_error is used to model certain errors, while partitioning and send_noise are used to simulate a faulty hub that selects only a subset of nodes to relay a message to or broadcasts noise.

We discuss representative transitions of the hub next.

```
[ ] ([ ] (i: index):
    state = hub_startup AND msg_in'[i] /= quiet AND NOT lock[i]
-->
```

This guarded command again represents a set of transitions. The precondition is satisfied if the hub is in hub_startup state and some node i sends a message with a type other than quiet and the port of the respective node is not locked.

```
msg_out' = [[j:index]
    IF msg_in'[i]=cs_frame AND time_in'[i]=i
        THEN cs_frame ELSE noise ENDIF];
```

-continued

```
time_out' = [[j:index] time_in'[i]];
interlink_msg_out'= msg_out'[0];
interlink_time_out' = time_out'[i];
```

```
state' = IF (msg_out'[i] = cs_frame
        AND ((interlink_msg_in' = cs_frame
                AND interlink_time_in' = time_in'[i])
            OR (interlink_msg_in' /= cs_frame)))
        OR (msg_out'[i] /= cs_frame AND interlink_msg_in' = cs_frame)
    THEN hub_tentative
ELSIF msg_out'[i] = cs_frame AND interlink_msg_in' = cs_frame
        AND interlink_time_in' /= time_in'[i]
    THEN hub_silence
ELSE hub_startup ENDIF;
```

Here we present parts of the postcondition of this transition. The hub performs semantic analysis in that it checks whether the type of msg_in' is a cs-frame with the correct time value. Depending on the semantic analysis it relays either the frame or noise to the nodes and the other channel. The hub's next state is calculated by comparing the incoming message on its own channel and the incoming message of the other channel, as depicted in the second box of the specification.

The node and hub modules are connected using a switch module, that simply connects input variables of the nodes to the respective output variables of the hubs and vice versa. The hubs are interconnected in the same way by an interlink module.

6.5.2 Failure Modelling

For the failure modeling process we use the following parameters:

```
faulty_ID : NATURAL = 0;
mask_ID: NATURAL = 2;
faulty_node: ARRAY index OF BOOLEAN = [[i:index] IF i = faulty_ID
                                            THEN TRUE ELSE FALSE ENDIF];
feedback: BOOLEAN = TRUE;
degree: NATURAL = 6;
```

One behavior of a faulty node is to masquerade as a different node; faulty_ID identifies the node that behaves in this way, and mask_ID is the value the faulty node may send in its frames (in this case node 0 is the faulty node and sends the ID of node 2 in its frames). The array faulty_nodes is used to identify for each node if it is correct or faulty. feedback and degree are introduced in the next section.

Faults vastly increase the statespace that must be explored in model checking and, hence, modeling the behavior of a faulty component is a tricky task. The model simulates time in discrete slot granularity and a faulty node is simulated as one that can send arbitrary messages in each slot. We classify the possible outputs of such a faulty node into the six fault degrees depicted by the (6×6) matrix in FIG. 42. For example, a fault degree of 2 allows a faulty node to broadcast only cs-frames, with the correct semantics, on zero, one, or two channels, while fault degree 6 allows a node to send an arbitrary combination of cs-frames and i-frames with correct or incorrect semantics, noise, or nothing on each channel.

Each of these 36 combinations was explicitly described by guarded commands in the SAL model.

```
[ ] state = faulty AND degree >= 2
-->
msg_out'=[[j:channels] IF j = 0 THEN cs_frame ELSE quiet ENDIF];
time_out' = [[j:channels] IF j = 0 THEN faulty_ID ELSE 0 ENDIF];
state' = IF lock_in[0] AND lock_in[1] AND feedback THEN
faulty_lock01
    ELSIF lock_in[0] AND feedback THEN faulty_lock0
    ELSIF lock_in[1] AND feedback THEN faulty_lock1
    ELSE state ENDIF;
```

Here, one guarded command of a faulty node with fault degree 2 or greater is depicted: such a faulty node is allowed to broadcast a cs-frame on channel 0 and does not send on the second channel. Furthermore, to reduce the statespace, we use "feedback": the lock_in [i] input variables are set by the hub i (corresponding to its lock output variables) if it discovers that the node is faulty (by judging on the node's output behavior). A faulty node will then transmit only quiet on channel i, since the hub will block all messages of the faulty node anyway. To judge its effect, this feedback routine can be turned on and off by setting the feedback parameter to TRUE or FALSE respectively.

Analogous to a faulty node, a faulty hub is simulated by assigning its output variables to arbitrary values, within its fault hypothesis (a faulty hub cannot create correct messages) in each slot.

```
[ ] ([ ] (i: index):
    state=hub_faulty AND msg_in'[i] /= quiet
-->
msg_out' = [[j:index] IF partitioning[j] THEN msg_in'[i]
        ELSE IF send_noise[j] THEN noise ELSE quiet ENDIF
        ENDIF];
    time_out' =[[j:index] time_in'[i]];
    interlink_msg_out' = msg_in'[i];
    interlink_time_out' = time_in'[i]; )
```

This example of a transition by a faulty hub is activated if an attached node sends a message other than quiet to the hub. The faulty hub then is free to select a subset of nodes to which the message is forwarded. The local variable partitioning, an array of boolean variables, creates such a partitioning of the nodes. By specifying no initial value for this variable, the model checker is forced to test every assignment. The faulty hub is allowed to send either noise or quiet to the other nodes, using the similarly uninitialized boolean array send_noise. We call this method implicit failure modeling (in the sense, that it is not necessary to model transitions for each subset explicitly).

6.5.3 Correctness Lemmas

In the following we describe correctness lemmas of the algorithm $\mathcal{G}A(\mathcal{S}.1)$ that correspond to the properties specified in the previous chapters for successful startup in presence of failures. Here, we formulate the lemmas in SAL notation where G denotes the always or □ modality of linear temporal logic (LTL), and F denotes the eventually or ◇ modality.

Lemma 4 Safety: Whenever any two correct nodes are in the ACTIVE state, these nodes will agree on the slot time (Property 2—Safe Startup).

```
safety: LEMMA system |- G (FORALL (i,j:index):
    (lstates[i] = active AND lstates[j] = active) =>
        (node_time_out[i] = node_time_out[j]));
```

Lemma 5 Liveness: All correct nodes will eventually reach the ACTIVE state.

```
liveness: LEMMA system |- F((FORALL (i:index):
    lstates[i] = active OR faulty_node[i]));
```

Lemma 6 Timeliness: All correct nodes will reach the ACTIVE state within a bounded time (Property 1—Timely Startup).

```
timeliness: LEMMA system |- G(startup_time <= @par_startuptime);
```

Lemma 7 Safety 2: Whenever a correct node reaches the ACTIVE state, a correct hub has also reached either the Tentative ROUND or ACTIVE state.

```
safety_2: LEMMA system |- G ((EXISTS (i:index):
    lstates[i] = active) =>
        (hstates[1]=hub_active OR hstates[1]=hub_tentative ));
```

Within our model-checking study additional lemmas were examined to gain confidence in our model. Those lemmas can be found in the source code of the SAL model.

6.5.4 Assessment

In this section we present results from our experiments using model checking in development of $\mathcal{G}.A(\mathcal{S}.1)$. Our experiments were performed on an Intel(R) Xeon™ with a CPU speed of 2.80 GHz and 2 GByte memory. We used the Linux distribution of SAL 2.0.

6.5.4.1 Effectiveness of Statespace Reduction Measures

Our decision to use a discrete model for time was critical to our ability to perform these experiments at all. Although we cannot yet prove the soundness of this abstraction, we gained confidence in it by selectively removing mechanisms from the SAL model of the algorithm and observing that the model checker always detected the expected system failures.

In exploring algorithmic variations, it was crucial for the model checker to deliver results within the human attention span of a few minutes. Our principal "dials" for trading time required against thoroughness of the exploration performed by the model checker were the number of nodes considered (typically from 3 to 6), and the fault degree. The parameter $\delta_{fault}$ selects the fault modes that a faulty node may exhibit. FIG. 43 illustrates the verification times in seconds for three lemmas in a 4-node model with $\delta_{fault}$=1, 3, 5. The results clearly show the increase in verification times with fault degree. A fault degree of 1 is suitable for quick investigation in the inner design loop, while degrees 3 and 5 invite a coffee break.

The feedback mechanism (i.e., forcing failed components to a standard state to reduce the statespace) was ineffective or counterproductive in practice for medium to large models, but for very large models it proved essential. For example, one property was successfully model checked in a 6-node model in 30,352 seconds (about 8.5 hours) with feedback on, but had not terminated after 51 hours with feedback off. We intend to investigate this behavior of the feedback mechanism in future research by analyzing the model checker in detail.

6.5.4.2 Design Exploration: The Big-Bang Mechanism

One area where we performed extensive design exploration was to determine the necessity and effectiveness of the big-bang mechanism. A crucial requirement of the startup algorithm is that it should not establish synchronous operation of a subset of nodes on a faulty hub while the second, correct, channel is available but unsynchronized. In such a case it would be possible for the faulty hub to forward messages only to the synchronous subset but not to the other nodes and hub; other nodes that are not yet synchronized would perform the startup algorithm (since the traffic of the synchronous set is hidden by the faulty hub) and start up independently of the other, already synchronized, nodes thereby establishing a classical clique scenario [SPK03], in which two subsets of nodes are communicating within each subset but not as one coordinated whole. The big-bang mechanism (Section 4.6) is used to prevent such scenarios.

Our model-checking experiments verified the necessity of the big-bang mechanism by producing the following counterexample in its absence for a cluster of 4 nodes:

1. node $n_2$ and $n_3$ start up with one slot difference;
2. after the listen timeouts expire, $n_2$ and $n_3$ send their cs-frames, resulting in a collision;
3. the correct hub forwards the winning node, say $n_2$, on its channel to all nodes and the second channel;
4. the faulty hub forwards the winning node on its channel, $n_3$, only to the correct hub;
5. nodes $n_1$ and $n_4$ receive only one cs-frame (from $n_2$) and synchronize on it, thus reaching ACTIVE state;
6. the correct hub sees a collision, since the faulty hub forwards the other cs-frame to it, and thus will not synchronize to the active set of nodes.

The big-bang mechanism discards the first cs-frame a node receives, since this cs-frame could be part of a collision of two nodes. The model-checking studies showed the necessity and correctness of this mechanism.

There is a class of scenarios similar to the one above that is not directly addressed by the algorithm: this is where nodes start up on a single faulty guardian (believing the other guardian to be unavailable), and only a subset of them achieve synchronous operation. These scenarios are excluded by arranging the power-on sequence so that the guardians are running before the nodes: the algorithm is able to deal with a faulty guardian provided the other guardian is available at the start of its operation.

SAL 2.0 provides both bounded and symbolic model checkers. Bounded model checkers, which are based on propositional satisfiability (SAT) solvers, are specialized for detecting bugs: they explore models only to a specified, bounded depth and can be faster than symbolic model checkers (which effectively explore the entire statespace) when bugs are present that can be detected within the bound. Bounded model checking provides algorithm developers with another analytical "dial": they can explore to increasing depths with a bounded model checker and switch to the "unbounded" depth of a symbolic model checker only when all the "shallow" bugs have been detected and eliminated. In our big-bang experiments, the SAL bounded model checker was sometimes more efficient than the symbolic one at exposing the failing scenarios. For example, it found a violation to the Safety_2 property in a 5-node system at depth 13 in 93 seconds (solving a SAT problem with 405,398 nodes), whereas the symbolic model checker required 127 seconds (for a model with 682 BDD variables).

6.5.4.3 Worst-Case Startup Scenarios

We define the worst-case startup time, $\tau^{wcsup}$, as the maximum duration between 2 or more non-faulty nodes entering the LISTEN or COLDSTART states and 1 or more non-faulty nodes reaching the ACTIVE state.

We explored worst-case startup times by model checking the timeliness property for different values of @par_startup-time, setting it first to some small explicit value (e.g., 12) and increasing it by small steps (e.g., 1) until counterexamples were no longer produced. By exploring different cases and different cluster sizes, we were able to develop an understanding of the worst-case scenarios.

Depending whether the (at most one) faulty component is a node or a hub, we get different worst-case startup times, $\tau_{f.n.}^{wcsup}$ and $\tau_{f.h.}^{wcsup}$. The overall worst-case startup time, $\tau^{wcsup}$ is given by $\tau^{wcsup}=\max(\tau_{f.n.}^{wcsup}, \tau_{f.h.}^{wcsup})$. The model-checking studies showed that $\tau^{wcsup}=\tau_{f.n.}^{wcsup}$.

The counterexamples representing the worst-case startup scenarios, with a faulty node, were of following nature:

1. The 2 nodes with the longest timeouts, $n_{max}$, $n_{max-1}$ start up first, one guardian, $g_1$, is in LISTEN state, the second, $g_2$, in STARTUP state.
2. $n_{max}$, $n_{max-1}$ send cs-frames that would collide, but, however, a faulty node sends noise and wins the arbitration at the guardian (we say that the faulty node hides the collision). As a faulty node will be blocked by a guardian, the faulty sender will be blocked by $g_2$ and therefore will not be able to interfere on this channel anymore. However, since $g_1$ was in LISTEN state it did not receive noise on its own channel (all traffic is denied on its own channel in this state) and the faulty node may still interfere on the channel of $g_1$.
3. $g_1$ transits to STARTUP state and waits for a cs-frame from any of its attached nodes.
4. The (hidden) collision of $n_{max}$, $n_{max-1}$ is resolved due to the unique timeouts mechanism and $n_{max-1}$ will be the first node to send the next cs-frame. However, this time the faulty node sends a cs-frame as well on $g_1$ and consequently causes a collision.
5. $g_1$ and $g_2$ enter SILENCE state followed by Protected STARTUP.
6. Finally, $n_{max-1}$ is able to send a collision-free cs-frame.

The deduced formula for worst-case startup time $\tau^{wcsup}$ (which occurs when there is a faulty node) is given in the following equations.

$$\tau^{wcsup} = \tau_{max-1}^{listen} + 2 * \tau_{max-1}^{coldstart} + \tau^{slot}$$
$$= 3 * \tau^{round} - 2 * \tau^{slot} + 2 * (2 * \tau^{round} - 2 * \tau^{slot}) + \tau^{slot}$$
$$= 7 * \tau^{round} - 5 * \tau^{slot}.$$

This worst-case startup time was deduced from scenarios with a faulty node. Model-checking experiments with a faulty guardian, showed the validity of the formula as an upper bound for the worst case startup time in those scenarios as well (the worst-case startup time with a faulty guardian was deduced analogously from the counterexamples: $\tau^{wcsup}=\tau_{max-1}^{listen}+\tau_{max-1}^{coldstart}+\tau^{slot}$).

6.5.4.4 Automated Verification and Exhaustive Fault Simulation

During exploration of the algorithm we were content to consider modest cluster sizes and fault degrees, but for verification we wanted to examine larger clusters and "exhaustive" modeling of faults. The term exhaustive fault simulation was chosen in analogy to fault injection and with respect to the nomenclature given in [Lap92]. While fault injection means actually to insert faults into physical systems, fault simulation is concerned with modeling faulty behavior in a mathematical model. Exhaustive fault simulation means that all hypothesized fault modes are modeled and all their possible scenarios are examined. In our case, this means model checking our model of the startup algorithm with the fault degree set to 6. A desirable goal is to be able to check all properties for a reasonable-sized cluster (say 5 nodes) overnight (say 12 hours, or 43,200 seconds). In this section we give formulas to estimate the number of scenarios under test for exhaustive fault simulation and report the performance achieved.

Different startup delays: Given a system of n nodes and 2 guardians, where each of the nodes and one of the guardians was allowed to startup at an instant during a period of $\delta_{init}$, the number of scenarios, $|S_{sup}|$, based on these different startup times is given by $|S_{sup}|=(\delta_{init})^{n+1}$.

Worst-case startup scenarios with a faulty node: Given the worst-case startup time of the system $\tau^{wcsup}$ and the fault degree of a faulty node $\delta_{fault}$, the number of scenarios for one particular startup pattern of nodes and hubs, $|S_{f.n.}|$, is given by $|S_{f.n.}|=((\delta_{fault})^2)^{\tau^{wcsup}}$.

Numerical estimates for these parameters are given in FIG. 44.

The SAL symbolic model checker is able to count the number of reachable states in a model. For the model used in the big-bang tests, these numbers were 1,084,122,880 states for 3 nodes, 508,573,786,112 for 4, and 259,220,300,300,290 for 5; these are approximately $2^{27}$, $2^{35}$, and $2^{43}$ states, respectively, in reasonable agreement with Table 44.

FIG. 45 presents the model checker performance for Lemmas 4, 5, and 6 in presence of a faulty node with fault degree $\delta_{fault}=6$ and startup-delay $\delta_{init}=8*\tau^{round}$. The feedback column indicates whether the feedback optimization was turned on or off. FIG. 45 presents the results for Lemma 7 in presence of a faulty hub with startup-delay $\delta_{init}=8*\tau^{round}$. Results are shown for models with 3, 4, and 5 nodes. The eval column indicates if the respective lemma is satisfied.

The cpu time column gives the execution time of the corresponding model-checking run, while the BDD column gives the number of BDD variables for the model (this is equivalent to the number of state bits after eliminating those that are simple combinations of others). 300 or so state bits is usually considered the realm of "industrial" model checking, where skilled tinkering may be needed to obtain a result in reasonable time. Yet all these results were obtained with no special efforts beyond these described.

6.6 Assessment of $\mathcal{G}.B(\mathcal{S}.2)$

In this section we discuss $\mathcal{G}.B(\mathcal{S}.2)$ analogous to $\mathcal{G}.A(\mathcal{S}.1)$ in the previous section. As the $\mathcal{G}.B(\mathcal{S}.2)$ is not able to transform the failure behavior of a faulty node to a detectable failure, and the central guardian executes only approximate coldstart protection, the model-checking studies should rather be seen as simulations of the actual algorithm than as actual formal proofs. However, the model-checking studies generated valuable information to understand the algorithm's nature and were essential for the debugging of the algorithm.

Bounded to a finite processing capability we had to restrict our simulations to a set of four nodes. Also, it was not possible to verify the complete startup algorithm at once, hence we partitioned our formal analysis on particular critical phases of the startup algorithm, as the coldstart phase and the integration phase. This analysis primarily focusses on the robustness of the algorithm to an arbitrary faulty node. However, we also discuss channel failures, although those model-checking runs were not as numerous.

6.6.1 Basic Model

The basic model is similar to the model of $\mathcal{G}.A(\mathcal{S}.1)$, we capture the differences in this section.

```
@par_filename: CONTEXT =
BEGIN
n: NATURAL = 4;
time: TYPE = [0..n];
index: TYPE = [1..n];
```

We used, again, a shell script to produce different models, representing different parameter settings. @par_filename is replaced by the shell script with a file name with respect to this parameter set. Our model consists of four nodes. In contrast to the model of $\mathcal{G}.A(\mathcal{S}.1)$ we could not increase this number due to memory space and verification time restrictions. The nodes are indexed from 1 to n, note that this is different to $\mathcal{G}.A(\mathcal{S}.1)$. The type time represents time in slot granularity. Time 0 is used to indicate an unsynchronized node.

```
maxchannels: NATURAL = 2;
channels: TYPE = [1..maxchannels];
```

Again, the model of G.B(S.2) consists of two channels indexed by channels.

```
maxcount: NATURAL = 11*n;
counts: TYPE = [0..maxcount];
startupdelay: NATURAL = 7*n;
poweron_counts: TYPE =[0..startupdelay];
max_wcsup: TYPE = [0..50*n];
```

We used the type counts for the timing during unsynchronized phases of a component. We use a dedicated type poweron_counts for the maximum startup delay, that is the maximum time before the node has to join the startup algorithm execution.

```
minimum_sync: NATURAL = 2;
```

The minimum_sync constant defines the minimum number of nodes that are required during steady state. However, to reach steady state, that is for a successful coldstart phase, minimum_sync+1 nodes are required.

```
local: NATURAL = 1;
``` local is used as a technical measure: as a node stores its state in it's outgoing variables, which are replicated, we use local to define the output variables of channel 1 to be the local state of a node.

```
coldstarter: ARRAY index OF BOOLEAN = [[j:index]
    IF j=1 OR j=3 OR j=4 THEN TRUE ELSE FALSE ENDIF];
```

We use the boolean vector coldstarter to indicate if a particular node i is allowed to send coldstart messages (coldstarter [i]=TRUE) or not (coldstarter [i]=FALSE). Although all four nodes will participate in the coldstart phase, our experiments restricted the actual number of nodes that are allowed to send coldstart messages to two, three, or four nodes.

```
states: TYPE = {init, virgin,
    cs_coll, cs_send, cs_ack, cs_ack_send, cs_integrate,
    passive, relax,
    sync, sync_send,
    faulty};
```

The states of the startup algorithm in the nodes are enumerated in the type states. During the algorithm design we found more appropriate names for the different states. To avoid confusion we give the relation of the state names in the algorithm as used in Section 4.7 and the names used in the SAL model in FIG. 46. Whenever a node has to send a message, we introduce an additional state in the SAL model to simulate the half-duplex channel, in order that a node that sends a message will not react to its own message. This is different to $\mathcal{G}.A(\mathcal{S}.1)$, where we explicitly checked whether a node was the sender of the message or not. Here, we place the sender in a particular state where it does not react to inputs. Note, also that we did not explicitly model the Cleanup(8) state, which is only significant if the startup algorithm speedup is used. As we simulated only the basic algorithm, we assume a system in steady state when the first tentative round was successful.

```
hub_states: TYPE = {hub_startup, hub_test, hub_blocked, hub_sync};
```

The hub states correspond to the states of $\mathcal{G}.A$ as introduced in 5.10. Here, we did not explicitly model the INIT state and let the central guardian directly start in the hub_startup state which represents both LISTEN and STARTUP state.

```
msgs: TYPE = {quiet, noise, cs_frame, i_frame};
```

The message types are given by msgs.

```
BLOCK_TO: NATURAL = 10*n;
ST_TO: ARRAY index OF NATURAL = [[j:index] 3*n+(j-1)];
```

We use the BLOCK_TO to identify the blocking duration for the simple leaky bucket algorithm. ST_TO is the SAL representation of $\tau^{startup-long}$.

```
node [id:index]: MODULE =
BEGIN
INPUT
    msg_in: ARRAY channels OF msgs,
    time_in: ARRAY channels OF time
```

A node's input variables are msg_in and time_in representing the message type and its contents respectively. In this analysis we did not implement the feedback mechanism as in $\mathcal{G}A(\mathcal{S}1)$.

```
OUTPUT
    msg_out: ARRAY channels OF msgs,
    time_out: ARRAY channels OF time,
    actiontime: ARRAY channels OF BOOLEAN,
    state: states,
    counter: counts
```

A node's output variables consist of msg_out and time_out representing the message type and its contents of a message that is sent. Additionally, the node is able to send a sync message. A sync message is formed by the boolean signal actiontime that is set to TRUE, by the time_out output variable (which is used for both regular and sync messages), and the output state. state is also used for the collection of metadata in the diagnosis module. The output counter is actually used as local variable.

```
LOCAL
    startup_counter: poweron_counts,
    i_frame_counter: ARRAY channels OF time,
    cs_frame_counter: ARRAY channels OF BOOLEAN
```

Furthermore, a node has a set of local counters: startup_counter is used to simulate the power-on delay, i_frame_counter is used to count i-frames, and cs_frame_counter is used to count cs-frames.

We give an example of a transition of a node next:

```
[ ] cs_coll_cs_send:
    state=cs_coll
    AND NOT (EXISTS (j:channels): (msg_in[j]=cs_frame
                         AND time_in[j]=0) OR msg_in[j]=i_frame)
    AND counter=1
    AND coldstarter[id]
-->
```

The guard of the transition cs_coll_cs_send (which is the name of the transition from cs_coll cs_send state is enabled if the node is in the cs_coll state, no valid cs-frame (that is a cs-frame with time 0) and no i-frame is received, the timeout expired, and node id is allowed to send cs-frames (as defined off-line).

```
state'=cs_send;
counter'=n;
i_frame_counter'=[[j:channels] 0];
msg_out'=[[j:channels] cs_frame];
time_out'=[[j:channels] 0];
actiontime'=[[j:channels] FALSE];
```

When the guard evaluates to TRUE, the node takes the transition to cs_send. It resets its local counters and sets its output variables to send a cs-frame in the next time-step. As the model processes time in slot granularity we use one slot to simulate both sync messages and regular protocol messages (which can be interpreted as: the sync message precedes the actual protocol message, when actiontime is set to TRUE).

In the $\mathcal{G}.B(\mathcal{S}.2)$ SAL model we use the ELSE construct in a special way:

```
[ ] ELSE
    -->
        state'=state;
        counter'=IF counter=1 THEN 1 ELSE counter-1 ENDIF;
        i_frame_counter'=[[j:channels] i_frame_counter[j]];
        msg_out'=msg_out;
        time_out'=[[j:channels] IF state=cs_ack OR state=cs_integrate
                OR state=sync OR state=passive
            THEN incslot(time_out[local]) ELSE 0 ENDIF];
actiontime'=actiontime;
```

If no event occurred, which could either be the reception of a message or a timeout that elapsed, the else construct is used to progress time.

The hub module is defined as follows:

```
hub[c:channels]:MODULE =
BEGIN
INPUT
    msg_in: ARRAY index OF msgs,
    time_in: ARRAY index OF time,
    actiontime: ARRAY index OF BOOLEAN,
    lstates: ARRAY index OF states
``` msg_in and time_in form the input variables of regular protocol messages. actiontime, time_in, and lstates form the sync messages.

```
OUTPUT
    msg_out: ARRAY index OF msgs,
    time_out: ARRAY index OF time
``` msg_out and time_out form the regular protocol message that is relayed.

```
LOCAL
    state: hub_states,
    lock: ARRAY index OF BOOLEAN,
    blocked_counter: ARRAY index OF counts,
    starter: time,
    slot_position: time,
    round_counter: [0..n]
```

The hub module has further local variables: state represents the current state of a central guardian, lock is a boolean vector that is set to TRUE for those ports that are currently blocked, blocked_counter are the counters used on a per-port basis for the simple leaky bucket algorithm, starter stores the id of the node that sent the coldstart signal, as seen by the central guardian, slot_position is used during the first tentative round of $S.2$ to determine the next sender in a "2:2" situation (see Section 6.6.4.2), and, finally, round_counter is used as a timeout counter.

Next we give an example of a transition of the central guardian next that represents the transition of the central guardian from hub_startup state to hub_test state:

```
([ ] (port:index):
    state=hub_startup
    AND msg_in'[port]/=quiet
    AND coldstarter[port]
    AND NOT lock[port]
    AND port/=faultyID
-->
```

The guard evaluates to TRUE, if the central guardian is in hub_startup state and a port port becomes active. This port has to be allowed to send a coldstart signal (coldstarter [port]) and it must not be blocked (NOT lock [port]). The additional construct port/=faultyID guarantees that this guard is only activated if the port assigned to a non-faulty node becomes active (see Section 6.6.2 for further explanation).

```
msg_out'=[[i:index] IF msg_in'[port]/=i_frame
        THEN msg_in'[port] ELSE noise ENDIF];
time_out'=[[j:index] IF msg_in'[port]/=i_frame
        THEN time_in'[port] ELSE 0 ENDIF];
state'=hub_test;
slot_position'=1;
starter'=port;
blocked_counter'=[[j:index] IF j=port THEN BLOCK_TO ELSE
        IF blocked_counter[j]>1 THEN blocked_counter[j]-1 ELSE 1
        ENDIF
            ENDIF];
lock'=[[j:index] IF j=port THEN TRUE ELSE IF blocked_counter[j]<=2
            THEN FALSE ELSE lock[j] ENDIF ENDIF];
)
```

If the guard evaluates to TRUE, the output and local variables are set according to the specified commands. Note, here the check msg_in' [port]/=i_frame: this construct represents the temporal filtering mechanism, according to which a central guardian relays only message of cs-frame length. Hence, if a node transmits an i-frame, this frame is truncated and, thus, transformed to noise.

6.6.2 Failure Modelling

The failure modelling in $\mathcal{G}.B(S2)$ is different to the failure modelling in $\mathcal{G}A(S.1)$ with respect to the placement of the fault injector: while in $\mathcal{G}.A(S.1)$ the node module is essentially the fault injector we use the hub module as fault injector for the analysis of $\mathcal{G}.B(S.2)$. This is done by adding additional guarded commands in the hub module, as for example:

```
[ ] state=hub_startup
    AND coldstarter[faultyID]
    AND NOT lock[faultyID]
    -->
```

This guard is enabled, if the central guardian is in hub_startup state, the faulty node is allowed to send a coldstart signal, and the port of the faulty sender is currently not blocked. As it is possible that more than one guard is enabled, it is in particular possible that a guard that represents a message reception of a good node is enabled as well. In that case, the hub module is allowed to choose any one of the enabled guarded commands.

```
msg_out' IN {a: ARRAY index OF msgs |
    (FORALL (k:index): a[k]=noise) OR
    (FORALL (k:index): a[k]=cs_frame)};
time_out' IN {a: ARRAY index OF time |
    (FORALL (k:index): a[k]=0) OR (FORALL (k:index): a[k]=1) OR
    (FORALL (k:index): a[k]=2) OR (FORALL (k:index): a[k]=3) OR
    (FORALL (k:index): a[k]=4)};
```

If the guard representing the faulty node is enabled, the hub module creates a faulty message. Here, the message can be a cs-frame (time=0) or an ack-frame (time>0) or noise. Note, that this construct does not allow the central guardian to transmit different messages to different receivers, as this fault generation simulates a faulty node. A faulty channel is per definition not able to generate faulty messages.

Additionally to the faulty regular messages, the SAL model has to simulate faulty sync messages. We placed the fault injector that generates faulty sync messages at the switch module.

```
faulty_actiontime IN {a: ARRAY channels OF BOOLEAN |
    IF (EXISTS (j:index): j/=faultyID
        AND node_actiontime_out[j][1]=TRUE) THEN
            (a[1]=TRUE OR a[1]=FALSE) AND
            (a[2]=TRUE OR a[2]=FALSE)
    ELSE a[1]=FALSE AND a[2]=FALSE ENDIF};
```

The fault injector only generates a faulty sync message, when there exists at least one other node that sends a sync message, as the guards in the hub module do not react to a single sync message. The generated faulty sync message is, then, forwarded to the hub, while all other sync messages are just relayed from the nodes' output variables.

```
hub_actiontime_in = [[j:channels] [[i:index]
    IF i/=faultyID THEN node_actiontime_out[i][j]
    ELSE faulty_actiontime[j] ENDIF]];
```

The construct allows the fault injector to generate different sync messages on the different channels. A similar construct is implemented for the time value of the sync message.

6.6.3 Correctness Lemmas

In the following we describe correctness lemmas of the algorithm $\mathcal{G}B(\mathcal{S}.2)$.

Lemma 8 Safety:

Whenever any two correct nodes are in the SYNC state, these nodes will agree on the slot time (Property 2—Safe Startup).

```
safety: LEMMA system |- G(FORALL (i,j:index):
    ((lstates[i]=sync ORlstates[i]=sync_send)
        AND (lstates[j]=sync OR lstates[j]=sync_send)) =>
    node_time_out[i]=node_time_out[j]);
```

Lemma 9 Timeliness:

All correct nodes will reach the SYNC state within a bounded time (Property 1—Timely Startup).

```
timeliness: LEMMA system |- G(startup_time<@par_startuptime);
```

Lemma 10 Majority:

In absence of a faulty channel the following holds: whenever a good node reaches SYNC state, there exists a different good node that reaches SYNC state at approximately the same time.

```
minimum_sync: LEMMA system |- G((EXISTS (i:index):
    (lstates[i]=sync OR lstates[i]=sync_send)) =>
    (EXISTS (i,j:index): i/=j
        AND (lstates[i]=sync OR lstates[i]=sync_send)
    AND (lstates[j]=sync OR lstates[j]=sync_send)));
```

The Majority lemma is very valuable, since it guarantees that the good nodes are always in majority in SYNC state:
- faulty node: as there may only exist a single faulty node, the majority lemma guarantees that in the worst case two good nodes reach SYNC state at approximately the same time, which is sufficient for a majority.
- faulty channel: in the single failure hypothesis, a faulty channel implies the correctness of all nodes. Hence, whenever a node reaches SYNC state it is guaranteed that this node is a good node and the majority is guaranteed per se.

Lemma 11 Timeliness (Integration): All correct nodes will reach the SYNC state within a bounded time (Property 3—Timely Integration).

```
timeliness: LEMMA system |- G(integrate_time<3*n);
```

As the integration process becomes more complex, we tested in addition to the startup properties the timely integration property in detail.

6.6.4 Assessment

In this section we present the model checking results of $\mathcal{G}.B(\mathcal{S}.2)$. Again, our experiments were performed on an Intel(R) Xeon™ with a CPU speed of 2.80 GHz and 2 GByte memory. As these experiments were done a year after those for $\mathcal{G}.A(\mathcal{S}.1)$, we were able to use SAL 2.4, which overcomes certain inefficiencies and, hence, allowed the assessment of more complex counterexamples, which was necessary for the analysis of the worst-case startup times. We start this section by reviewing certain interesting failure scenarios that we found during the design of the startup algorithm. These failure scenarios are significantly more complex than those for $\mathcal{G}A(\mathcal{S}.1)$. We then address the problem of a faulty channel and solutions. Finally, we discuss worst-case startup times.

6.6.4.1 Design Exploration: Channel-Independent Frame Counting and Reaction When we started to construct startup algorithm $\mathcal{S}.2$ we did not merge the received messages on the replicated channels in a clean way; in particular after the reception of a message on one channel, the reception process terminated successfully. A simple scenario shows that channel-independent frame counting is necessary: a faulty node sends a cs-frame on only one channel and sends an ack-frame that acknowledges its own cs-frame (such scenarios are possible due to the different power-on times of the central guardians when the central guardian does not provide an appropriate filtering mechanism). Hence, if there participates only one correct node in the coldstart algorithm, the faulty node brings the correct node into steady state, which violates the majority lemma (Lemma 10). To overcome this problem we count the received messages channel independently.

Further testing of the majority lemma (Lemma 10) showed that it becomes falsified in scenarios with a sophisticated faulty node:
1. given a correct cs-frame sender $n_{cs}$, a faulty node $n_{faulty}$, and a correct ack-frame sender $n_{ack}$ 2. due to the approximate coldstart protection mechanism in the central guardians, it is possible that the cs-frame is only relayed on one channel, say channel A while it is blocked on the second channel, say channel B
3. as $n_{ack}$ receives the cs-frame only on channel A it only sets the counter $n_{ack}$(IFC.A)=1
4. now, the faulty node sends its ack-frame only on channel B
5. after this transmission the frame counters of $n_{cs}$ are $n_{cs}$(IFC.A)=1 and $n_{cs}$(IFC.B)=2 (note: the sent cs-frame itself is counted as well); the frame counters of $n_{ack}$ are $n_{ack}$(IFC.A)=1 and $n_{ack}$(IFC.B)=1
6. when $n_{ack}$ reaches its sending slot it transmits an ack-frame on its channels
7. after this transmission, the frame counters of $n_{cs}$ are $n_{cs}$(IFC.A)=2 and $n_{cs}$(IFC.B)=3; the frame counters of $n_{ack}$ are $n_{ack}$(IFC.A)=2 and $n_{ack}$(IFC.B)=2
8. only $n_{cs}$ received a sufficient number of messages ($n_{cs}$(IFC.B)=3) and will proceed, which violates the majority lemma (as the faulty node can "simulate" a good node during the cleanup round, one faulty and one good node may enter steady state)

Hence, an additional mechanism is needed: channel independent reaction. This means that an ack-frame sender only acknowledges the cs-frame on those channels on which it received the cs-frame: if the cs-frame sender is faulty then all ack-frame senders are correct, or, if an ack-frame sender is faulty, then all other ack-frame senders and the cs-frame sender have to be correct, according to the fault hypothesis.

6.6.4.2 Design Exploration: The 2:2 Problem

A node terminates the coldstart phase successfully, if a sufficient sequence of messages has been received and transmitted. The approximate coldstart protection mechanism in combination with the usage of sync messages for the central guardian caused a violation of the majority lemma in presence of a faulty component:

1. given a cs-frame sender $n_{cs}$, a faulty node $n_{faulty}$, and two correct ack-frame senders $n_{ack1}$ and $n_{ack2}$
2. $n_{cs}$ sends a cs-frame which is blocked by both central guardians, due to the approximate coldstart protection; after the cs-frame transmission, $n_{cs}$ enters the first tentative round
3. one slot after $n_{cs}$ sent the cs-frame, the faulty node $n_{faulty}$ sends another cs-frame which is relayed by both central guardians (note: this is not necessarily a faulty action)
4. both ack-frame senders receive this cs-frame and set their frame counters to one
5. we are currently in a system state, where a good node executes a different tentative round scheme than two other good nodes, and one faulty node is present; let us summarize the current system state: all good nodes send sync messages to the central guardians that signal the identity of the next sender. However, as the good nodes execute the tentative round with an offset, the sync messages differ. As long as the faulty node does not send a sync message that corresponds to the sync messages of $n_{cs}$, the central guardians can calculate a majority, which is given by the two ack-frame senders.
6. after $n_{faulty}$ sent the cs-frame, one of the ack-frame senders, say $n_{ack1}$, is first to send an ack-frame which is relayed by the guardians, which causes both ack-frame senders to update their frame counters to 2
7. in the silence phase before the sending slot of the second ack-frame sender $n_{ack2}$, $n_{faulty}$ exhibits its faulty behavior by sending a sync message that corresponds to the sync message sent by $n_{cs}$
8. the central guardian receives, thus, two different pairs of sync messages. Without further knowledge, it may select any one of this pair. Thus, assume that the central guardian selects the fault sync message, which identifies the next sender to be different from $n_{ack2}$.
9. $n_{ack2}$ transmits its ack-frame and updates its frame counters to 3. However, since the guardians selected the wrong sync message these frames are blocked, and hence the first ack-frame sender does not update its frame counters.
10. as a result, $n_{ack2}$ is the only correct node that proceeds to cleanup state and the majority lemma is violated (again: as the faulty node can "simulate" a good node during the cleanup round, one faulty and one good node may enter steady state)

As a solution to the, so called, 2:2 problem we use the opinion of the central guardian during the coldstart phase, which means that the central guardian has to track a complete TDMA round during coldstart.

6.6.4.3 Design Exploration: Channel Failures

The protection mechanisms in central guardian $\mathcal{G}$.2 cause a potential problem in presence of a faulty channel, which is similar to the 2:2 problem sketched above.

1. given a cs-frame sender $n_{cs}$ and two correct ack-frame senders $n_{ack1}$ and $n_{ack2}$
2. the coldstart attempt of $n_{cs}$ is blocked by the good central guardian, due to the approximate coldstart protection mechanism
3. the faulty channel relays the cs-frame to all nodes
4. now the faulty channel exhibits its faulty behavior, such that it relays the ack-frames only to $n_{cs}$
5. consequently, $n_{cs}$ is the only node that transits to the second tentative round (cleanup)

The problem of a faulty channel is twofold: at first, the correct channel has to execute its protection mechanisms while a faulty channel is free to relay any received message to any subset of nodes, and secondly, the sequence of messages that is necessary for successful integration or for a successful coldstart has to be received on one channel (to avoid that a faulty node masks itself as two logical nodes). We see three options to overcome the problem of a faulty channel:

1. Reduction of the protection mechanism: the leaky bucket algorithm in the central guardian will only block a port, if the received message was no coldstart message. This classification of a coldstart message is done, based on the number of sync messages that the central guardian receives after the potentially received coldstart frame.
2. Temporary filtering freedom: if there exists a faulty channel, our fault hypothesis excludes the presence of a faulty node. Hence, if all nodes are correct, there is no need for a central guardian instance that protects the shared medium. It is actually counterproductive, as the protection mechanisms implemented in the central guardian block correct messages, and hence, may extend the startup phase. As we have calculated the worst-case startup time in presence of a faulty component, we can conclude the following fact: if the central guardian has detected that all ports have been active, and the system does not manage to reach steady state within the calculated worst-case startup time, there has to be a faulty channel in the system. If there exists a faulty channel in the system, the correct channel stops its filtering mechanisms and relays every message on a first-come first-serve strategy.
3. Node-Local detection algorithm: The nodes themselves are able to detect the failure of a faulty channel. A node that reached sync phase and has to re-start can classify the channel that it integrated on as faulty.

A current prototype implementation of the central guardian favors the first solution. Additional hardware testing has to be done to confirm this selection. The second point is probably the most general one, as it conquers the problem of a faulty channel at its root.

6.6.4.4 Worst-Case Startup Scenarios

Similar to G.A(S.1) we define the worst-case startup time, $\tau^{wcsup}$, as the maximum duration starting with three or more correct nodes entering i-frame Detection until two or more correct nodes reach Sync state.

We experimented with different numbers of coldstart senders: while all four nodes are members of the core system (which means that all four nodes enter coldstart phase if necessary), only a subset of nodes is allowed to actually send coldstart messages. We tested configurations with two, three, and four coldstarters. For the systems with two and three nodes we were able to create counterexamples that represent the worst-case startup scenarios. For a configuration with four coldstarters the model-checking terminated with a negative answer, but the counterexamples could not be generated due to space limitations. However, the worst-case startup times were approximately the same for the system with three and four coldstarters. It seems reasonable, therefore, that the worst-case startup time scenarios are similar for those configurations. There are several possibilities that cause a coldstart attempt to fail:

insufficient number of nodes in coldstart: when a cs-frame is sent the number of nodes that are in coldstart phase is not sufficient. Hence, the coldstarter will not receive a sufficient number of acknowledgments.

contention: two or more nodes send a cs-frame at approximately the same point in time. Again, the number of nodes that are needed for acknowledgment is insufficient, as a node either sends a cs-frame or an ack-frame.

guardian blocking: as a result of the approximate coldstart protection, it is possible that the coldstart attempt of a correct node will be blocked.

error-propagation: it is possible, although only for a restricted time, that a faulty node masks a good coldstart attempt of a correct node. This is done by a faulty node that sends shortly before the good node traffic on the channels and wins the leaky bucket arbitration at the central guardian.

The worst-case startup scenarios with three and four coldstarters were of the following nature (the worst-case startup scenarios for two coldstarters were significantly lower):

1. insufficient number of nodes in coldstart
2. error-propagation F
3. contention
4. guardian blocking
5. error-propagation
6. successful coldstart The first coldstart attempt is unsuccessful, as there are not enough nodes in coldstart phase to acknowledge the cs-frame. The second coldstart approach is unsuccessful due to a faulty node that wins the leaky bucket arbitration. The next coldstart approach is unsuccessful due to a contention of coldstarting nodes. Note, that this is a first synchronization of the nodes: although the coldstart attempt is not successful, the contention resolving property of the coldstart algorithm leads to a successful coldstart later. The coldstart attempt after the contention is, again, unsuccessful due to a faulty node. Finally, the next coldstart attempt is successful, as the contention resolving has been started two contention cycles earlier.

6.6.4.5 Automated Verification and Exhaustive Fault Simulation

The results of the exhaustive failure simulation studies are depicted in FIG. 47. In the upper part of the figure the first column represents the nodes that are configured as coldstarters, that are nodes that are allowed to send a coldstart message. The second column defines the identifier of the faulty node. The next three columns list the model-checking results for the Safety lemma and the last three columns list the results for the Majority lemma. The lower part of the figure presents the model-checking results for lemma Timeliness. The first two columns represent the set of coldstarters and the id of the faulty node respectively. The third column presents the calculated worst-case startup times in slot-granularity. We found the maximum worst-case startup time in a configuration with three coldstarters and the faulty node having the shortest timeout. In this configuration we got a worst-case startup timeout of 155 slots, which is approximately 38 TDMA rounds or 6 contention cycles. The last three columns present the model-checker performance, as for the previous properties. These three lemmas were extensively studied as they seem to be the most critical. The Timeliness (Integration) property has been tested in several configurations. We found that the worst case integration time is lower than three TDMA rounds.

6.7 Limitations of Our Method

The used verification method for the assessment of the startup algorithms and their protection mechanisms have some limitations.

1. Real-World Abstraction: the model-building process is an abstraction process and, hence, information of the real system is lost in the model. We already justified our model of time in the beginning of this chapter.
2. System Size: we are currently only able to verify systems with a limited number of nodes and channels. However, as we introduced the notion of a core system, it is possible that only a subset of nodes performs the startup algorithm anyway.
3. Synchronous Simulation: by using a fixed upper bound on the startup delay of a node, $\delta_{init}$, we modelled our algorithms in a fully synchronous system, instead of the eventually synchronous system that we specified as our system model. Our system has only bounded memory space, hence, the set of states the system can be in is finite. Let this set be denoted as $\mathcal{U}$ (for universe). The set of states that can be reached due to different (unknown) startup delays is given by the proper subset $\mathcal{A} \subset \mathcal{U}$. Using a fully synchronous model causes that we only analyze a subset of states $\mathcal{S} \subseteq \mathcal{A}$. By increasing $\delta_{init}$ we get:

$$\lim_{\delta_{init} \to \kappa^{simulate}} \mathcal{S} = \mathcal{A} \qquad (6.1)$$

That means by gradually increasing the startup delay until some $K^{simulate}$ we cover complete $\mathcal{A}$. Hence, we tried to configure $\delta_{init}$ as high as possible to get the best coverage of $\mathcal{A}$.

Chapter 7
Recovery Mechanisms

The Time-Triggered Architecture is a generic solution for safety-critical real-time systems that provides real-time and fault-tolerance services. The real-time issues are addressed by the generation and maintenance of a global sparse timebase. The fault-tolerance capabilities are listed in the fault hypothesis: the primary fault hypothesis of the TTA claims to tolerate either the arbitrary failure of any one of its nodes or the passively arbitrary failure of any one of its communication channels.

This primary fault hypothesis, however, is not strong enough for the class of applications that have to tolerate transient upsets of multiple, possibly all, components in the system. An example of such an application is the flight control system in a jet: this system has to recover after a transient upset that may be caused e.g. by lightning.

Dijkstra introduced the concept of "self-stabilization" to computer science [Dij74]. Self-stabilization is defined by two properties, [Sch93], namely closure and convergence. Basically, self-stabilization says that a system either stays in a legitimate state (closure), that is, a state that fulfills some given properties, and, if the system is placed in a defined illegitimate state, the system will transit to a legitimate state within a bounded number of steps (convergence).

This concept almost perfectly meets the requirements of the resilience after transient upsets: as long as no such transient upset occurs, the system will operate in a safe mode (closure). If, however, a transient upset destroys the system's synchronization and consistent data basis, a proper mechanism shall guarantee that the system reaches a safe system state, after the cause of the transient upset disappears. In this work this rather informal description of self-stabilization is sufficient. A formal approach to self-stabilization and fault-tolerance in general using the concepts of detectors and correctors is given in [AK98].

A transient upset may bring the system into any reachable state, where the set of reachable states is directly given by the dynamic data structures used for the algorithms' execution. An off-line partitioning of this state space is reasonable: depending on the type of the unsafe system state, different algorithms can be executed, and/or more than one algorithm can be executed in sequence to reach a safe system state. FIG. 48 describes this idea:

The core of the figure represents the safe system states. Safe system states also include the states with faulty components that can be compensated by fault masking techniques. The outmost ring encloses the set of reachable states due to a transient upset. The partitioning of the reachable states is done with respect to the degree of state disruption, that is, the fraction of variables that are affected[1]. The partitioning is depicted as level 1 to level n, numbered from inside outwards and is only schematic since it depends on the actual system. The solid arrows represent transient upsets that force the system into an unsafe state, the farther outside the more seriously the system is affected. The fault in scenario b therefore is more severe than the fault in scenario a. The dotted arrows represent the execution of correction algorithms that lead the system back to the safe state. The execution of these algorithms is triggered by an integrated diagnosis task of the system (whose data basis can be corrupted as well). Different algorithms can lead from one level to the next safer (lower in number) level, or an algorithm may enable a transition from one level to another by skipping one or more intermediate levels. Thus a set of algorithms, that can be seen self-stabilizing themselves, is executed subsequently to achieve self-stabilization towards a safe system state.

[1] By doing so we implicitly define also a hierarchy on the variables.

Example: Given an algorithm, $\alpha$, that guarantees a transition from level k to level k−1, and a second algorithm, $\beta$, that guarantees a transition from level k−1 to level k−2. The integrated diagnosis task triggers the execution of $\alpha$ and $\beta$ when the respective level is reached. Hence, the algorithms will be executed consecutively and the system transits from level k to level k−2.

Real world systems cannot guarantee absolute safety, and it is up to the system's architect to decide on the degree (level) of malfunction that has to be tolerated. Thus, there is always a non-zero probability that the system is as affected as scenario c suggests, where the system transits to a state from which a recovery cannot be guaranteed. Such states, however, are not reachable due to a transient upset.

The self-stabilization concept is a well known research subject and broad documentation is available. Schneider [Sch93] amongst others provide insights to the concept of self-stabilization in a very intuitive way. Rushby addresses the self-stabilizing property of the membership and clique avoidance algorithm in [Rus02].

7.1 Partitioning of Reachable States

In FIG. 49 we sketch the self-stabilizing mechanisms (with 3 levels of non-safety) used in the TTA in analogy to FIG. 48.

Definition 9 Safe state:
there exists only one clique with more than one node and the number of operating nodes is sufficient.

Consequently, the definition of the unsafe states in the system is given by the negotiation of the definition above:

Definition 10 Unsafe state:
there exist multiple cliques with more than one node in the system or
the number of operating nodes is insufficient.

The safe system states, according to Definition 9, form the core states. Note that these states also include system states with failures that can be masked. The first level of non-safety, denoted integration possible, describes a system operation where the number of operating nodes is not sufficient but the not-operating nodes are able to integrate (this includes also the scenario where no nodes are operating synchronously, e.g., before startup). The second level of non-safety, denoted multiple cliques (benign), describes the benign cliques scenarios, that is multiple cliques are established, but all nodes have a synchronized time-base. The third level of non-safety, denoted multiple cliques (malign), expresses the malign cliques scenario, that is, multiple cliques are established that are not even timely synchronized. In the following, we outline recovery strategies after transient upsets. The corresponding six scenarios are depicted by dashed lines in FIG. 49. The actual algorithms that have to be executed are discussed in the next sections.

Scenario a: The fault caused a number of nodes to shut down. Depending on the number of nodes that were affected either the restarting nodes are able to re-integrate, or the startup algorithm will be executed.

Scenario b: The fault caused the system to establish multiple benign cliques. By executing the clique avoidance algorithm it is ensured that exactly one clique will survive and all other cliques will shut down (transition from level 2 to safe). The number of nodes within the surviving clique is sufficient to bring the system into a safe state (that means that solely the shut down of the nodes in minority cliques brings the system back into a safe state).

Scenario c: Multiple benign cliques are established. After executing the clique avoidance algorithm, either all nodes reset and the startup algorithm will be executed, or exactly one clique survives. The number of nodes forming the surviving clique, however, is not sufficient. Since the nodes in minority cliques restart, with the re-integration of these nodes, a sufficient number of nodes will be present to bring the system into a safe state.

Scenario d: The fault caused the system to establish malign clique scenarios. A solution for this scenario is the clique resolving algorithm, an extension to the TTA that is discussed in the next section. Similar to the clique avoidance algorithm, the clique resolving algorithm ensures that at most one clique will survive. In this scenario a dominant clique exists and by executing the clique resolving algorithm the system will transit into a safe system state. The number of nodes in the dominant clique is sufficient for a safe system state.

Scenario e: Multiple malign cliques are established after some fault. After execution of the clique resolving algorithm, if no dominant clique exists, all nodes will find themselves in a minority clique and restart. If a dominant clique exists, all nodes in the minority cliques will restart as well. Similar to Scenario c, the nodes in the dominant clique are not sufficient to bring the system into a safe state. However, after the re-integration of nodes, the system will transit into a safe system state again.

Scenario f: Once the fault has damaged the system to a certain degree, there is no guaranteed transition back to a safe system operation. In the TTA, for example, it is not guaranteed that the system will reach a safe system state if two or more components are permanently faulty.

The consequences of benign cliques (Scenarios b,c) are already under research and the self-stabilization property of the clique avoidance algorithm for these benign cliques scenarios is shown in [Rus02].

Malign Cliques (Scenarios d,e) cannot be resolved with the conventional faul-tolerance mechanisms used in the TTA. Therefore, we propose an extension to the clique avoidance algorithm that we call clique resolving algorithm.

7.2 Failure Detection

The TTA provides an integrated diagnosis service that is based on the periodic message transmission of a node. If a node fails to transmit a message, this failure will be recorded by each node in the membership vector, where each node will set the respective bit of a node, if it successfully received a message during the last TDMA round and clear the bit if not. For the clique avoidance mechanism the integrated diagnosis service also maintains the two counters $accept_i$ and $reject_i$. Due to the periodic nature of this service, its data-base is refreshed each TDMA round. Currently, two mechanisms are specified that operate on this integrated diagnosis service: communication system blackout detection and clique avoidance which are triggered when a node's sending slot is reached.

Communication System Blackout: The node checks for the number of nodes from which it has received messages during the last round. If the node has not received any valid message, the node has lost synchronization and restarts.

Clique Avoidance Algorithm: During normal system operation the counters $accept_i$ and $reject_i$ of a respective node i are used to decide whether node i is allowed to send in its sending slot, or not. If a node receives a correct frame, that is a frame that has the same h-state as the receiver[2], the $accept_i$ counter is increased and the bit of the respective sending node in the slot is set in the membership vector. If an incorrect frame is received, the $reject_i$ counter is increased and the respective bit of the sending node in the membership vector is cleared. If no frame is received within a slot, no counter is increased and the bit of the respective node for the slot is cleared.

[2]This state is either explicitly carried in the frame or implicitly encoded in the CRC of a frame.

When a node reaches its sending slot, the node compares the two counters and is only allowed to transmit, if $accept_i > reject_i$. After the comparison, the node sets $reject_i = 0$ and $accept_i = 1$. This description is sufficient for our conclusions, a detailed description of the algorithm can be found in [BP00].

It is assumed, and even formally analyzed that during normal system operation, within the primary fault hypothesis of the TTA, the clique avoidance algorithm will resolve benign clique scenarios within a bounded number of steps [Pfe00]. The clique avoidance algorithm works correctly for benign cliques, however, this algorithm may fail in certain scenarios of malign cliques: the clique avoidance algorithm is based on the relation of the size of two or more cliques, hence nodes in different cliques have to count the participants in other cliques. In the malign clique scenarios, this assumption is not always true.

The solution to handle also malign cliques, hence, is not only to decide on basis of the difference between the number of nodes within the respective cliques, and thus to rely on the two counters, $accept_i$ and $reject_i$, but also to decide on basis of the actual absolute number of nodes within the node's clique in relation to the overall number of nodes in the system.

Clique Resolving Algorithm: The node detects the system misbehavior if it does not find enough communicating nodes in the system after the local restart timeout, $\tau^{restart}$ expires. The algorithm, a simple watchdog algorithm, is presented in FIG. 50.

During protocol execution we use a timer to identify a faulty system state. This timer starts at 0 and is increased with real-time. At the beginning of each slot, each node first checks whether the timer reached the restart timeout. If so, the node has detected the system misbehavior, if not, the cross sum over the membership vector is calculated identifying how many nodes are currently within the node's clique. If this sum is greater than or equal to the threshold $\phi$ then the respective node considers the system state as correct and resets the timer. The length of the restart timeout is given by the worst case integration time $\tau^{WCI}$ (see Section 7.3). We will discuss the threshold next.

Consider a system of n nodes, and let the nodes form cliques of arbitrary size. Let $c_i$ denote a clique i. $|c_i|$ denotes the size of clique i. The number of cliques, k, is between 1 (all nodes operate in one clique) and n (no two nodes operate together). Let k be the number of cliques in the given system.

Property 13 Since a faulty node may act in each clique as a correct node (Lemma 1, Section 3.3), the number of logical nodes, $N = \sum_{i=1}^{k} |c_i|$, is bounded by:

$$n \leq N \leq (n + (k-1)) \quad (7.1)$$

Discussion: The lower bound is given by the number of nodes in the system, n. The upper bound follows from Lemma 1 which defines that a faulty node may operate as a correct node in each clique, that is, in 1 clique and in all (k−1) other cliques. ∎

If a faulty node does not participate in multiple cliques, we have to consider the two biggest cliques to determine a threshold that forms a dominant clique. In the worst case, a node forms a clique by its own. The sum of the nodes in the 2 biggest cliques is given by the overall number of nodes in the system minus one node per remaining clique (which are all cliques that are not the two biggest): n−(k−2). The threshold to determine a dominant clique in the this case is given therefore by:

$$\phi_{fault-free} = \left\lceil \frac{n - (k-2) + 1}{2} \right\rceil \quad (7.2)$$

Property 14 Threshold:

With the proposed clique resolving algorithm, FIG. 50, unsafe system states according to Definition 10 can be detected, if the threshold is at least $$\phi = \lceil \frac{n}{2} \rceil + 1,$$

where n is the number of nodes in the system.

Discussion: Property 14 follows from Equation 7.2. Due to the faulty node we have to substitute the number of nodes, n, for the upper bound on the logical nodes in the system (Property 13). That is:

$$\phi = \lceil \frac{(n + (k-1)) - (k-2) + 1}{2} \rceil = \lceil \frac{n}{2} \rceil + 1 \quad (7.3)$$

7.3 Failure Correction

In the previous section we discussed the mechanism for detecting the disruption of synchronization. In this section we discuss the startup strategy as restart method.

7.3.1 System Restart

The startup strategy can be used for system restart as well. However, care has to be taken such that the assumptions, under which the startup algorithm works, are met. A startup algorithm will most likely have h-state for the execution itself. Hence, a transient upset can disrupt this information as well. It is, thus, important to design a mechanism that guarantees that all components (nodes and central guardians) will refresh their state periodically. This refreshment can be done either implicitly by the progress of the algorithm or explicitly by the implementation of a watchdog timer. The TTA simple startup algorithm uses a failure detection mechanism in the central guardians for the detection of faulty nodes, which are then blocked forever. However, this mechanism is only relevant for bus topologies and simple adjustments of the node and guardian startup algorithms allow to avoid this explicit failure detection and blocking. This startup algorithm will then implicitly update its state periodically.

The clique resolving algorithm uses a restart timeout for the detection of a malign cliques scenario. An immediate restart of a node after detection of an insufficient number of nodes in the membership vector can lead to a recurrent restart of the system, since the system may be starting up currently and other nodes are just about to integrate. Hence, setting the restart timeout equal to the worst case integration timeout, $\tau^{restart} = \tau^{WCI}$, guarantees that a node listens for a sufficiently long duration before the restart is triggered.

It is important to highlight that the initiation of a system restart is not done by consensus of all (or a set of) nodes, by sending appropriate messages as for example proposed in [AG94], but it is a local decision of each node, to restart or not and is performed simply by a node's decision to stop sending. This decision is done depending on how many correct communicating nodes the respective node detects within its clique. Thus, the possibility of a faulty node to restart the system continually is excluded.

The proposed recovery algorithm is not restricted to fail-safe applications, but can also be used in fail-operational systems. Depending on the application, the system recovery time can be tolerated. In [HT98], Heiner and Thurner state that a steering system in automobile applications can tolerate a system down-time of up to 50 ms; this is enough for executing the recovery algorithm in a typical TTA configuration.

7.3.2 Correction if a Dominant Clique Exists

All nodes in minority cliques detect the system misbehavior when executing the clique resolving algorithm (Section 7.2). When a node finds itself in a minority clique it simply starts the startup algorithm. All such nodes will receive frames from the dominant clique and, thus, will integrate into the dominant clique.

Property 15 A node that suffered from a transient failure will integrate within a bounded duration.

Discussion: Since the protocol state is broadcasted with every frame, a node is able to adjust itself to this state. The integration on faulty states can be regulated by central guardians that destroy frames with invalid protocol state or by a majority voting algorithm in the node. Using the first option allows integrating on the first message received, since it would have been destroyed if incorrect. The second solution requires the node to receive a sequence of messages that correspond to their state information. Consequences if the state is not broadcasted with each frame are discussed in Section 7.5. ∎

7.3.3 Correction if a Dominant Clique does not Exist

If no dominant clique exists, all nodes are in minority cliques. Therefore all nodes execute the startup algorithm and the scenario behaves identical to the initial startup of the system.

7.3.4 Overhead of Clique Resolving

Since the proposed clique resolving algorithm uses already existing data structures in the TTA, the overhead of this extension is quite small and only consists of a timer in each node and guardian. Furthermore, the algorithm introduces only a constant calculation overhead that consists of the comparison of the timer to the given restart timeout and the calculation of the cross sum of the membership vector.

7.4 Central Guardian Limitation

The TTA uses guardians to mask a certain class of failures. Here we show, why central guardians in a dual-channel system cannot be used instead of a clique correction algorithm.

Property 16 In a dual channel TTA system the guardians cannot be used to correct multiple clique scenarios under the primary and secondary fault hypothesis.

a) Failure-Free Case: Using the guardians instead of the nodes to execute the clique resolving algorithm is possible in scenarios where no permanently faulty component has to be considered.

After some fault there are two cliques established where one clique is protected by one guardian and the other one by the second guardian respectively. Assume that the proposed clique resolving algorithm is executed at the guardian. If the guardian finds less nodes in its clique than the threshold $\phi$ for the duration of the startup timeout, it simply blocks communication on its channel for one TDMA round. Consequently, after one TDMA round the nodes in the guardian's clique will shut down and restart. The guardian also starts to integrate after one TDMA round.

b) Failure Case: Since recovery must be possible despite one faulty component it must be assumed that the guardian itself is faulty. Thus, it is possible that multiple cliques are established, where a faulty guardian protects more than one clique (following Lemma 2, Section 3.3). Since this guardian is faulty it cannot be guaranteed that it executes the clique resolving algorithm, and blocks communication of the minority clique(s). Thus, it cannot be ensured that cliques scenarios are resolved and, consequently, multiple cliques may run forever. ∎

The correction algorithm can be done if the number of central guardians, and therefore channels, is sufficient. A node can then count the number of channels from which it receives a message. If this number of channels is equal to or beyond a given threshold, the node assumes a sufficient number of central guardians within its clique and thus accepts correct operation to be a fact. If the number of frames is below the threshold, a node will shut down and reintegrate (accepting a frame only if it is received on a number of channels equal to or higher than the threshold). The calculation of the sufficient number of central guardians, as well as the calculation of the threshold is analogous to Section 7.2 (letting n be the number of central guardians): following from $$\phi = \lceil \frac{n}{2} \rceil + 1,$$

four central guardians are necessary and sufficient to tolerate one faulty central guardian. From an economical point of view this approach does not seem rational.

7.5 Extensions

We discuss proper extensions and variations of the clique resolving algorithm in this section.

7.5.1 Scalability

TTA systems are usually designed for future extensions by creating communication schedules with unassigned slots. With this approach, there is no need to change the nodes' configuration in the cluster when adding additional computation nodes. Our presented algorithm, FIG. 50, for detection of malign cliques needs a priori knowledge of the number of nodes in the cluster to decide whether a sufficient number of nodes is within a node's clique or not. On a first glance it appears that this information must be updated in each node when the system is extended, thus contradicting composability. However, there is no need for adjusting each node's parameters when extending the system, if the relation of slots in the system to the number of nodes in the system stays to following rule:

Property 17 The number of nodes in the system must be within the interval $[\phi+1, n]$, where n is the number of slots in the system.

Discussion: Given a cluster with n slots, and let $k \leq n$ slots be assigned to nodes. Consequently there are n–k slots free to be assigned to nodes for future extensions. According to the presented algorithm in FIG. 50, there must be at least $$\lceil \frac{n}{2} \rceil + 1$$

correct nodes in a cluster to detect malign clique scenarios. Thus, the number of nodes in the cluster must be within the interval $$[\lceil \frac{n}{2} \rceil + 2, n].$$

■

Note: Of course the probability that one clique will be dominant after a transient fault of multiple nodes decreases with the decreasing number of nodes in the system. However, this trade-off between liveness and safety is fundamental and it is up to the system architect to decide on the relation of slots and nodes in the system.

7.5.2 Synchronization Frame Sender

Figures 51, 52:
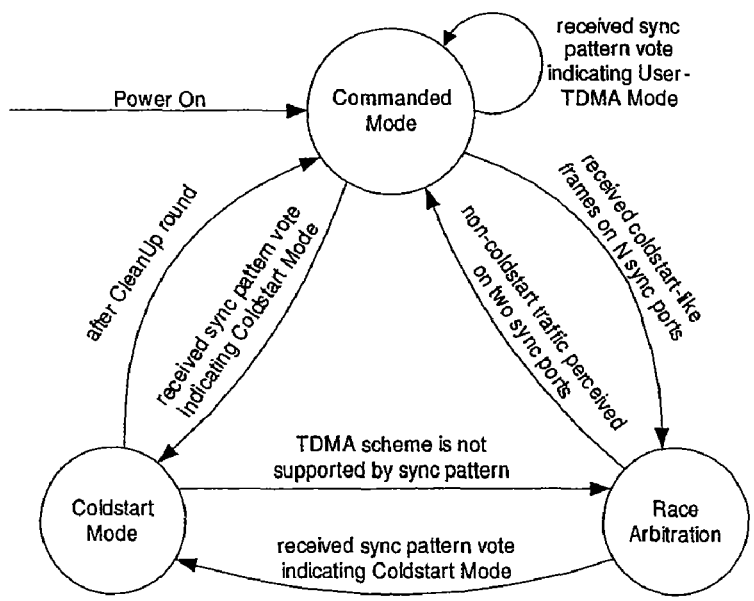
FIG. 51 is an extension of the clique resolving algorithm to test for a set of nodes.
FIG. 52 is the Guardian principle.

If not all frames can be used for other nodes to integrate, dedicated synchronization frame senders have to be implemented. Consequently, the clique resolving algorithm has to be extended to check on a specific set of nodes, that is, a subset of those dedicated synchronization frame senders, in a node's clique. Since in the membership vector each bit is related to a specific node in the system this check can be executed easily and the timer will not be reset if the number of these synchronization frame senders is not sufficient in size. The extended algorithm is presented in FIG. 51.

The number of required synchronization frame senders depends on the functionality of the central guardian. If the central guardian is allowed to filter invalid messages, two synchronization senders are sufficient. If such mechanisms are not implemented at least three nodes have to be configured as synchronization message senders to allow fault-tolerant voting.

7.5.3 Architecture Extension

The arguments from Section 7.5.2 can simply be extended to an arbitrary subset of nodes. That is, if a specific subset of nodes is necessary for a safe system state, the check on this set of nodes can be done analogously.

7.5.4 Extension to the Fault Hypothesis

If the system is designed to tolerate additional $\mathcal{F}_{max}>1$ nodes to become fail-silent, Property 17 can be adjusted accordingly:

Property 18 If a TTA system is designed to tolerate additional $\mathcal{F}_{max}$ fail-silent nodes, the number of nodes within the system must be within the interval $[\phi+1+\mathcal{F}_{max}, n]$, where n is the number of slots in the system.

Discussion: Property 18 follows from Property 17, because fail-silent nodes can be seen as slots that are not assigned to a node yet and thus are not in the cluster from a logical point of view. ■

Chapter 8
Conclusion

This thesis discussed one core problem of time-triggered communication, namely the problem of initial synchronization of the local clocks of the components in the system. We discussed the general strategy to solve this problem and gave two examples for an implementation of a startup algorithm. After the successful completion of the startup algorithm the system is in a steady state where the communication protocol guarantees a temporal deterministic communication channel. Such a communication channel provides a time-triggered broadcast that inherently gives the required properties of atomic broadcast and, hence, makes additional multi-round algorithms for consensus unnecessary.

We discussed the usage of central guardians to protect the shared communication medium from an arbitrarily faulty node. A central guardian has to provide at least a leaky bucket algorithm to restrict the bandwidth each node is allowed to use. This filtering capability can be extended in a number of ways. We presented temporal or semantic filtering. In order to establish an agreement and validity property in the system, the central guardian also has to execute a Byzantine filtering algorithm. Such an algorithm is implicitly given for the temporal domain, if the leaky bucket algorithm is correctly parameterized. An additional mechanism has to be implemented to transform a Byzantine failure in the value domain to a symmetric failure. We also discussed an algorithm for that purpose. Many of the higher-level filtering mechanisms require a close synchronization of the central guardian to the nodes. We, therefore, presented algorithms for the initial synchronization as well as for the ongoing clock synchronization for the central guardian.

We used modern model-checking techniques to formally analyze the properties of two particular startup algorithms in presence of a faulty component. We introduced the method of exhaustive fault simulation: we are not restricted to focus on particular scenarios that have to be simulated, but leave the output variables of a faulty component free to take any value according to the fault hypothesis and have the model checker verify the algorithm in all possible scenarios. Using this procedure we were able to determine worst-case startup times for these two startup algorithms. These times showed that the simple algorithm design has a significant shorter worst-case startup time than the complex startup algorithm design.

To increase the protocol resilience after transient upsets we introduced a new clique resolving algorithm that detects the absence of a dominant clique, that is a sufficient set of nods operating synchronously, and triggers system restart. Based on the assessment of the presented startup algorithms we were able to parameterize the restart timeout properly.

Outlook

The results of this thesis can be extended in various ways:

Changes in the minimum configuration: we found an impossibility result for the reliable detection of the establishment of steady state. One way to circumvent this result is the usage of additional nodes and channels. As we discussed in Chapter 4, increasing the number of components in the system allows us to implement an event-trigger that is signalled when a sufficient set of components enters steady state. This event-trigger can be used as reliable steady state detection.

Changes in the communication topology: the startup algorithms presented in this thesis can be executed in a bus topology as well if a contention detection mechanism is implemented, e.g. noise on both channels is interpreted as a contention. However, as we do not have the possibility of a central guardian in such an environment, future work has to discuss a new design of local guardians that achieve a similar coverage of the faulty behavior of a node.

Changes in the fault hypothesis: our primary fault hypothesis claims to tolerate a passive arbitrarily faulty channel. This is a restriction on the failure behavior of a channel that requires strict justifications as we did in Chapter 5. By increasing the number of channels we can relax the primary fault hypothesis such that an arbitrarily faulty channel can be tolerated. Future research will analyze the usability of the proposed algorithms in such an environment.

Performance optimizations of the startup algorithm: the prime quality metric for the startup algorithm, besides its correctness, is the worst-case startup time, that is the worst-case time a set of correct components needs to establish steady state. We showed that this worst-case startup time may become relatively long in terms of TDMA rounds, especially in the second algorithm that we proposed. Further research may address a reduction of this worst-case startup time.

Experimenting with novel formal techniques: Our verification method has a certain limitations as we discussed in Chapter 6. Novel formal techniques may address these limitations. Bounded model checking for example is a promising research field that allows us to model time in a more realistic way. First analysis of a simple startup algorithm [DS04] shows the applicability of such methods.

Verification of the startup using theorem proving: the probably most accurate model can be built and verified by using theorem proving with for example PVS. Core algorithms of the TTA, such as the membership protocol or the clock-synchronization algorithm have been formally studied by the usage of PVS. Recent formal analysis is concerned with the fault masking capabilities of the central guardians in the TTA [PvH04]. A further analysis of the startup algorithms using this approach would be very valuable.

We hope that this thesis provided the reader an insight to the startup problem and strategies for its solution and we highly encourage further research in this area, preferable in some of the above mentioned fields. We are confident that time-triggered communication strategies will continue in their success in industrial applications.

REFERENCES

[ABST03] A. Ademaj, G. Bauer, H. Sivencrona, and J. Torin. Evaluation of fault handling of the time-triggered architecture with bus and star topology. In *Proc. of International Conference on Dependable Systems and Networks (DSN 2003), San Francisco*, June 2003.

[AD94] R. Alur and D. L. Dill. A theory of timed automata. *Theoretical Computer Science*, 126(2):183-235, 1994.

[AEE03] AEEC. *ARINC PROJECT PAPER 664, AIRCRAFT DATA NETWORKS, PART7, AFDX NETWORK (DRAFT)*. AERONAUTIC RADIO, INC., 2551 Riva Road, Annapolis, Md. 21401-7465, November 2003.

[AG94] A. Arora and M. Gouda. Distributed Reset. In *IEEE Transaction on Computers*, pages 1026-1038. IEEE, September 1994.

[AK98] A. Arora and S. S. Kulkarni. Detectors and Correctors: A Theory of Fault-Tolerance Components. In *Proc. of the 18th International Conference on Distributed Computing Systems*. IEEE, 1998.

[ALRL04] A. Avižienis, J. C. Laprie, B. Randell, and C. Landwehr. Basic Concepts and Taxonomy of Dependable and Secure Computing. *IEEE Transactions on Dependable and Secure Computing*, 1(1):11-33, January-March 2004.

[BDM93] M. Barborak, A. Dahbura, and M. Malek. The consensus problem in fault-tolerant computing. *ACM Comput. Surv.*, 25(2):171-220, 1993.

[BDM+98] M. Bozga, C. Daws, O. Maler, A. Olivero, S. Tripakis, and S. Yovine. Kronos: A model-checking tool for real-time systems. In A. J. Hu and M. Y. Vardi, editors, *Proc. 10th International Conference on Computer Aided Verification, Vancouver, Canada*, volume 1427, pages 546-550. Springer-Verlag, 1998.

[BFG02] C. Bernardeschi, A. Fantechi, and St. Gnesi. Model checking fault tolerant systems. *Software Testing, Verification and Reliability*, 12:251-275, December 2002.

[BFJ+00] G. Bauer, T. Frenning, A. K. Jonsson, H. Kopetz, and Ch. Temple. A centralized approach for avoiding the babbling-idiot failure in the time-triggered architecture. *ICDSN 2000, New York, N.Y., USA*, June 2000.

[BKS02] G. Bauer, H. Kopetz, and W. Steiner. Byzantine fault containment in ttp/c. *Proceedings of the 2002 Intl. Workshop on Real-Time LANs in the Internet Age (RTLIA 2002)*, pages 13-16, June 2002.

[BKS03] G. Bauer, H. Kopetz, and W. Steiner. The central guardian approach to enforce fault isolation in a time-triggered system. In *Proc. of 6th International Symposium on Autonomous Decentralized Systems (ISADS 2003)*, pages 37-44, Pisa, Italy, April 2003.

[BP00] G. Bauer and M. Paulitsch. An Investigation of Membership and Clique Avoidance in TTP/C. *19th IEEE Symposium on Reliable Distributed Systems*, 16-18 Oct. 2000, Nürnberg, Germany, October 2000.

[Bro97] M. Broy. Interactive and reactive systems: States, observations, experiments, input, output, nondeterminism, compositionality, and all that. In *Foundations of Computer*

*Science: Potential-Theory-Cognition*, volume 1337 of *Lecture Notes in Computer Science*, page 279. Springer-Verlag Heidelberg, 1997.

[BS01] Günther Bauer and Wilfried Steiner. Smart bus guardian design guidelines. Research Report 20/2001, Technische Universität Wien, Institut für Technische Informatik, Treitlstr. 1-3/182-1, 1040 Vienna, Austria, 2001.

[CAN92] CAN. Controller area network can, an in-vehicle serial communication protocol. In *SAE Handbook 1992*, pages 20.341-20.355. SAE Press, 1992.

[CF97] F. Cristian and C. Fetzer. The timed asynchronous system model, 1997.

[CGP99] E. M. Clarke, O. Grumberg, and D. A. Peled. *Model Checking*. MIT Press, 1999.

[CHT96] T. D. Chandra, V. Hadzilacos, and S. Toueg. The weakest failure detector for solving consensus. *J. ACM*, 43(4):685-722, 1996.

[CLS04] V. Claesson, H. Lönn, and N. Suri. An efficient tdma start-up and restart synchronization approach for distributed embedded systems. *IEEE Transactions on Parallel and Distributed Systems*, 15(7), July 2004.

[CT96] T. D. Chandra and S. Toueg. Unreliable failure detectors for reliable distributed systems. *J. ACM*, 43(2):225-267, 1996.

[DHSZ03] K. Driscoll, B. Hall, H. Sivencrona, and P. Zumsteg. Byzantine fault tolerance, from theory to reality. In *Computer Safety, Reliability, and Security*, volume 2788 of *Lecture Notes in Computer Science*, pages 235-248. Springer-Verlag, Vienna, Heidelberg, October 2003.

[Dij74] E. W. Dijkstra. Self-stabilizing Systems in Spite of Distributed Control. *Communications of the ACM*, 17(11): 643-644, 1974.

[DS04] Bruno Dutertre and Maria Sorea. Modeling and Verification of a Fault-Tolerant Real-time Startup Protocol using Calendar Automata. In *Proc. of the Joint Conference Formal Modelling and Analysis of Timed Systems* (FORMATS), *Formal Techniques in Real-Time and Fault-Tolerant Systems* (FTRTFT), Lecture Notes in Computer Science. Springer-Verlag, September 2004.

[EEE+01] St. Eberle, Ch. Ebner, W. Elmenreich, G. Färber, P. Ghner, W. Haidinger, M. Holzmann, R. Huber, R. Schlatterbeck, H. Kopetz, and A. Stothert. Specification of the ttp/a protocol. Research Report 61/2001, Technische Universität Wien, Institut für Technische Informatik, Treitlstr. 1-3/182-1, 1040 Vienna, Austria, 2001.

[ESU04] R. Ekwall, A. Schiper, and P. Urban. Token-based atomic broadcast using unreliable failure detectors. In *Proc. of 23rd International Symposium on Reliable Distributed Systems* (SRDS 2004), pages 52-65, Brasil, Florianopolis, October 2004.

[FLP85] Michael J. Fischer, Nancy A. Lynch, and Michael S. Paterson. Impossibility of distributed consensus with one faulty process. *J. ACM*, 32(2):374-382, 1985.

[For03] Formal Methods Program. Formal methods roadmap: PVS, ICS, and SAL. Technical Report SRI-CSL-03-05, csl, mp, October 2003. Available at http://fm.csl.sri.com/doc/roadmap03.

[HD93] H. Hoyme and K. Driscoll. Safebus™. *IEEE Aerospace and Electronics Systems Magazine*, 8(3):34-39, March 1993.

[Hoa69] C. A. R. Hoare. An axiomatic basis for computer programming. *Commun. ACM*, 12(10):576-580, 1969.

[Hol97] Gerard J. Holzmann. The model checker SPIN. *Software Engineering*, 23(5):279-295, 1997.

[HT94] Vassos Hadzilacos and Sam Toueg. A modular approach to fault-tolerant broadcasts and related problems. Technical Report TR94-1425, 1994.

[HT98] G. Heiner and T. Thurner. Time-Triggered Architecture for Safety-Related Distributed Real-Time Systems in Transportation Systems. In *Proceedings of the 28th Annual Symposium on Fault-Tolerant Computing, FTCS*, pages 402-407. IEEE, June 1998.

[IEE85] IEEE, INC. *Standard IEEE 802.3 Local Area networks—Carrier Sense Multiple Access With Collision Detection*, 1985.

[IEE90] IEEE, INC. *Standard IEEE 802.4—Information processing systems—Local Area networks—Part 4: Token-passing bus access method and physical layer specifications*, 1990.

[Jen04] E. Douglas Jensen. Timeliness in Mesosynchronous Systems. *The 7th IEEE International Symposium on Object-Oriented Real-time Distributed Computing (ISORC 2004)*, May 2004.

[KAH04] Hermann Kopetz, Astrit Ademaj, and Alexander Hanzlik. Clock-state and clock-rate correction in fault-tolerant distributed systems. Research Report September 2004, Technische Universität Wien, Institut für Technische Informatik, Treitlstr. 1-3/182-1, 1040 Vienna, Austria, 2004.

[KB03] Hermann Kopetz and Günther Bauer. The time-triggered architecture. *Proceedings of the IEEE*, 91(1):112-126, January 2003.

[KC87] Lindsay Kleeman and Antonio Cantoni. Metastable behavior in digital systems. *IEEE Design & Test of Computers*, pages 4-19, December 1987.

[KO87] H. Kopetz and W. Ochsenreiter. Clock Synchronization in Distributed Real-Time Systems. *IEEE Transactions on Computers*, C-36(8):933-940, 1987.

[KO02] Hermann Kopetz and Roman Obermaisser. Temporal composability. *IEE's Computing And Control Engineering Journal*, January 2002.

[Kop] H. Kopetz. On the fault hypothesis for a safety-critical real-time system. *to be published in Springer Lecture Notes on Computer Science*.

[Kop97] H. Kopetz. *Real-Time Systems*. Kluwer Academic Publishers, 1997.

[Kop98] H. Kopetz. The Time-Triggered (TT) Model of Computation. In *Proceedings 19th IEEE Real-Time System Symposium*, pages 168-177, 1998.

[Kop02] H. Kopetz. TTP/C Protocol—Version 1.0. TTTech Computertechnik AG, Vienna, Austria, July 2002. Available at http://www.ttpforum.org.

[Kop03] Hermann Kopetz. On the determinism of communication systems. Research Report 48/2003, Technische Universität Wien, Institut für Technische Informatik, Treitlstr. 1-3/182-1, 1040 Vienna, Austria, 2003.

[KPJ+01] Hermann Kopetz, Michael Paulitsch, Cliff Jones, Marc-Olivier Killijian, Eric Marsden, Nick Moffat, David Powell, Brian Randell, Alexander Romanovsky, and Robert Stroud. Revised version of dsos conceptual model. Project Deliverable for DSoS (Dependable Systems of Systems), Research Report 35/2001, Technische Universität Wien, Institut für Technische Informatik, Treitlstr. 1-3/182-1, 1040 Vienna, Austria, 2001.

[Krü97] A. Krüger. *Interface Design for Time-Triggered Real-Time System Architectures*. PhD thesis, Technische Universität Wien, Institut für Technische Informatik, Treitlstr. 3/3/182-1, 1040 Vienna, Austria, 1997.

[KS03] Hermann Kopetz and Neeraj Suri. Compositional design of rt systems: A conceptual basis for specification of linking interfaces. *6th IEEE International Symposium on Object-Oriented Real-Time Computing* (ISORC03), May 14-16, 2003, *Hokkaido, Japan*, May. 2003.

[LA98] Z. H. Liang and M. M. Ali. A modified leaky bucket policing mechanism. *Proc. of the IEEE Canadian Conference on Electrical and Computer Engineering*, Vol. 1:345-348, May 1998.

[Lap92] J. C. Laprie. *Dependability: Basic Concepts and Terminology*. Springer-Verlag, 1992.

[LL84] Jennifer Lundelius and Nancy Lynch. An upper and lower bound for clock synchronization. *Information and Control*, 62:190-204, 1984.

[LMK04] E. Latronico, P. Miner, and P. Koopman. Quantifying the reliability of proven spider group membership service guarantees. *The International Conference on Dependable Systems and Networks* (DSN 2004), June 2004.

[LMS85] L. Lamport and P. M. Melliar-Smith. Synchronizing clocks in the presence of faults. *Journal of the ACM*, 32(1):52-78, January 1985.

[Lön99] H. Lönn. Initial synchronization of TDMA communication in distributed real-time systems. In *19th IEEE Int. Conf. on Distributed Computing Systems*, pages 370-379, Gothenburg, Sweden, 1999.

[LP97] Henrik Lönn and Paul Pettersson. Formal verification of a TDMA protocol start-up mechanism. In *Pacific Rim International Symposium on Fault-Tolerant Systems (PRFTS '97)*, pages 235-242, Taipei, Taiwan, December 1997. IEEE.

[LPY97] K. G. Larsen, P. Pettersson, and W. Yi. UPPAAL in a nutshell. *Int. Journal on Software Tools for Technology Transfer*, 1(1-2):134-152, October 1997.

[LSP82] Leslie Lamport, Robert Shostak, and Marshall Pease. The Byzantine Generals problem. *ACM Transactions on Programming Languages and Systems*, 4(3):382-401, July 1982.

[Lyn96] Nancy Lynch. *Distributed Algorithms*. Morgan Kaufmann Publishers, 1996.

[MGPM04] P. Miner, A. Geser, L. Pike, and J. Maddalon. A unified fault-tolerance protocol. In Yassine Lakhnech and Sergio Yovine, editors, *Formal Techniques, Modeling and Analysis of Timed and Fault-Tolerant Systems*, volume 3253 of *Lecture Notes in Computer Science*, pages 167-182. Springer-Verlag, 2004.

[MHB+01] R. Mores, G. Hay, R. Belschner, J. Berwanger, C. Ebner, S. Fluher, E. Fuchs, B. Hedenetz, W. Kuffner, A. Krger, P. Lohrmann, D. Millinger, M. Peller, J. Ruh, A. Schedl, and M. Sprachmann. Flexray the communication system for advanced automotive control systems. *In Proceedings of SAE 2001 World Congress*, 2001.

[Min89] S. E Minzer. Broadband isdn and asynchronous transfer mode (atm). *IEEE Communications Magazine*, 27(9):17-24, September 1989.

[MKK04] J. Morris, D. Kroening, and P. Koopman. Fault tolerance tradeoffs in moving from decentralized to centralized embedded systems. *The International Conference on Dependable Systems and Networks* (DSN 2004), June 2004.

[MT89] M. D. Mesarovic and Y. Takahara. *Abstract Systems Theory*. Springer-Verlag, 1989.

[Nor96] E. Normand. Single Event Upset at Ground Level. *IEEE Transactions on Nuclear Science*, 43:2742-2750, 1996.

[O'G94] T. J. O'Gorman. The Effect of Cosmic Rays on the Soft Error Rate of a DRAM at Ground Level. *IEEE Transactions on Electron Devices*, 41:553-557, 1994.

[Pet02] Philipp Peti. The concepts behind time, state, component, and interface—a literature survey. Research Report 53/2002, Technische Universität Wien, Institut für Technische Informatik, Treitlstr. 1-3/182-1, 1040 Vienna, Austria, 2002.

[Pfe00] H. Pfeifer. Formal Verification of the TTP Group Membership Algorithm. In Tommaso Bolognesi and Diego Latella, editors, *Formal Methods for Distributed System Development Proceedings of FORTE XIII/PSTV XX 2000*, pages 3-18, Pisa, Italy, October 2000. Kluwer Academic Publishers.

[PM98] B. Pauli and A. Meyna. Reliability of Electronic Control Units in Motor Vehicles. *SAE Technical Paper Series*, February 1998.

[Pow92] David Powell. Failure mode assumptions and assumption coverage. In Dhiraj K. Pradhan, editor, *Proceedings of the 22nd Annual International Symposium on Fault-Tolerant Computing (FTCS '92)*, pages 386-395, Boston, Mass., 1992. IEEE Computer Society Press.

[PSL80] M. Pease, R. Shostak, and L. Lamport. Reaching agreement in the presence of faults. *Journal of the Association for Computing Machinery*, Vol. 27:228-234, 1980.

[PSvH99] Holger Pfeifer, Detlef Schwier, and Friedrich W. von Henke. Formal verification for time-triggered clock synchronization. In Charles B. Weinstock and John Rushby, editors, *Dependable Computing for Critical Applications-7*, volume 12 of *Dependable Computing and Fault Tolerant Systems*, pages 207-226, San Jose, Calif., January 1999. IEEE Computer Society.

[PvH04] H. Pfeifer and Friedrich W. von Henke. Modular formal analysis of the central guardian in the time-triggered architecture. In Maritta Heisel, Peter Liggesmeyer, and Stefan Wittmann, editors, *Proc. of the 23rd International Conference on Computer Safety, Reliability, and Security (SAFECOMP)*, volume 3219 of *Lecture Notes in Computer Science*, pages 240-253, Potsdam, Germany, September 2004. Springer-Verlag.

[PW81] W. W. Peterson and E. J. Weldon. *Error-Correcting Codes*. The MIT Press, 1981.

[RFA02] M. Rodriguez, J. C. Fabre, and J. Arlat. Wrapping real-time systems from temporal logic specifications. In *Dependable Computing EDCC-4: 4th European Dependable Computing Conference*, volume 2485 of *Lecture Notes in Computer Science*, pages 253-270. Springer-Verlag, Vienna, Heidelberg, October 2002.

[Rus99] John Rushby. Systematic formal verification for fault-tolerant time-triggered algorithms. *IEEE Transactions on Software Engineering*, 25(5):651-660, September 1999.

[Rus01] John Rushby. Formal verification of transmission window timing for the time-triggered architecture. Technical report, March 2001.

[Rus02] John Rushby. An Overview of Formal Verification for the Time-Triggered Architecture. In Werner Damm and Ernst-Rüdiger Olderog, editors, *Formal Techniques in Real-Time and Fault-Tolerant Systems*, volume 2469 of *Lecture Notes in Computer Science*, pages 83-105, Oldenburg, Germany, September 2002. Springer-Verlag.

[Sch93] M. Schneider. Self-stabilization. *ACM Computing Surveys (CSUR)*, 25(1):4567, 1993.

[SP02] W. Steiner and M. Paulitsch. The transition from asynchronous to synchronous system operation: An approach for distributed fault-tolerant systems. In *Proceedings of ICDCS*, Vienna, Austria, July 2002. IEEE.

[SPK03] Wilfried Steiner, Michael Paulitsch, and Hermann Kopetz. Multiple failure correction in the time-triggered architecture. *Proc. of 9th Workshop on Object-oriented Real-time Dependable Systems (WORDS 2003f)*, October 2003.

[SPT04] H. Sivencrona, M. Persson, and J. Torin. A Membership Agreement Algorithm Detecting and Tolerating Asymmetric Timing Faults. *IFIP World Computer Congress (DIPES)*, August 2004.

[SRSP03] Wilfried Steiner, John Rushby, Maria Sorea, and Holger Pfeifer. SAL model of a TTA startup algorithm. Research Report 52/2003, Technische Universität Wien, Institut für Technische Informatik, Treitlstr. 1-3/182-1, 1040 Vienna, Austria, 2003.

[Ste01] Wilfried Steiner. Start-up of ttp/c: Analysis and simulation. Master's thesis, Technische Universität Wien, Institut für Technische Informatik, Treitlstr. 3/3/182-1, 1040 Vienna, Austria, 2001.

[Tem98] C. Temple. Avoiding the Babbling-Idiot Failure in a Time-Triggered Communication System. In *Proceedings of 28th Annual International Symposium on Fault-Tolerant Computing*, pages 218-227, June 1998.

[Tem99] Christopher Temple. *Enforcing Error Containment in Distributed Time-Triggered Systems: The Bus Guardian Approach*. PhD thesis, Technische Universität Wien, Institut für Technische Informatik, Treitlstr. 3/3/182-1, 1040 Vienna, Austria, 1999.

[VC02] Paulo Verssimo and Antnio Casimiro. The timely computing base model and architecture. *IEEE Trans. Comput.*, 51(8):916-930, 2002.

[VR01] Paulo Verissimo and Luis Rodrigues. *Distributed Systems for System Architects*. Kluwer Academic Publishers, 2001.

[Wel96] Chris Wellheuser. Metastability performance of clocked fifos: First-in, first-out technology. Technical Report SCZA004A, Advanced System Logic-Semiconductor Group, Texas Instruments, March 1996.

[WWS99] J. Wilde, W. Wondrak, and W. Senske. Reliability Requirements for Microtechnologies used in Automotive applications. In *Proceedings of the Congress for Microsystems and Precision Engineering, MicroEngineering 99*, Stuttgart, Germany, October 1999. Stuttgarter Messe-und Kongress-gesellschaft GmbH.

[YTK01] T. Yokogawa, T. Tsuchiya, and T. Kikuno. Automatic verification of fault tolerance using model checking. In *Proc. of 2001 Pacific Rim International Symposium on Dependable Computing*, page 95, Seoul, Korea, December 2001.

The invention claimed is:

1. A method for start-up of a network, the network comprising a number of nodes, which are connected via channels, and wherein the nodes are able to exchange information in the form of messages via said channels,
wherein
the transition of a synchronizing node from its initial phase to a synchronized phase is separated in a so-called integration phase and a so-called cold-start phase, wherein the integration phase and the cold-start phase are executed in sequence in the same node,
and wherein
a) the synchronizing node in the integration phase is listening to messages being sent from nodes in the synchronized phase and wherein the synchronizing node reacts to an integration message (i-frame), which is instructing a node to change into the synchronized phase, only if said integration message is a valid message,
and wherein
b) said node in integration phase is capable of receiving a sequence of i-frames,
and wherein
c) a synchronizing node, in the case that integration of said synchronizing node to a set of already synchronized nodes was not successful after a specifiable period, changes into the cold-start phase, in which a cold-start procedure of the node is executed,
and wherein
d) in the cold-start phase said node does not react to integration messages (i-frames) of a node in the synchronized phase,
and wherein
e) in the cold-start phase said node is capable of triggering a transition back to the integration phase when an i-frame is received or after a number of unsuccessful coldstart attempts,
and wherein
f) in the cold-start phase said node is capable of counting the number of messages received per TDMA round.

2. The method according to claim 1, wherein the synchronizing node in the integration phase is further listening to messages being sent from nodes that are about to terminate the cold-start phase in a cleanup state, wherein such a so-called clean-up message (cu-frame) instructs a node to restart its integration phase, and wherein the synchronizing node only reacts to a clean-up message if said clean-up message is a valid message.

3. The method according to claim 1, wherein in that the communication in the network is based on TDMA rounds.

4. The method according to claim 3, wherein a guardian is provided, which guarantees that only a specifiable number of integration and/or clean-up messages of a node may be propagated in a specifiable period of time.

5. The method according to claim 4, wherein the specifiable period of time is equal to one TDMA round.

6. The method according to claim 4, wherein the specifiable number of invalid integration and/or clean-up messages is equal to one.

7. The method according to claim 3, wherein a dedicated TDMA round layout comprising only of a limited number of slots and/or different slot lengths during the cold-start phase is used.

8. The method according to claim 1, wherein a node in the integration phase itself verifies if a integration message and/or a clean-up message is valid.

9. The method according to claim 1, wherein at least one guardian is provided in the network, which guardian blocks the propagation of invalid integration and/or clean-up messages.

10. The method according to claim 1, wherein the integration phase and the cold-start phase are executed sequentially.

11. A node for a network, wherein the network comprises a number of such nodes, which nodes are connected via channels, and wherein the nodes are able to exchange information in the form of messages via said channels, wherein the node comprises means for carrying out the steps of a method according to claim 1.

12. A network comprising a number of nodes according to claim 11, wherein the nodes are connected via channels, and wherein the nodes are able to exchange information in the form of messages via said channels.

* * * * *